(12) United States Patent
Ito

(10) Patent No.: US 10,313,547 B2
(45) Date of Patent: Jun. 4, 2019

(54) DATA PROCESSING APPARATUS, DATA PROCESSING METHOD, AND STORAGE MEDIUM

(71) Applicant: CANON KABUSHIKI KAISHA, Tokyo (JP)

(72) Inventor: Tadayuki Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 15/162,362

(22) Filed: May 23, 2016

(65) Prior Publication Data

US 2016/0352952 A1 Dec. 1, 2016

(30) Foreign Application Priority Data

May 29, 2015 (JP) .................. 2015-110206
May 29, 2015 (JP) .................. 2015-110208

(51) Int. Cl.
*H04N 1/00* (2006.01)
*H04N 1/04* (2006.01)
*H04N 1/36* (2006.01)

(52) U.S. Cl.
CPC ........ *H04N 1/00965* (2013.01); *H04N 1/04* (2013.01); *H04N 1/36* (2013.01); *H04N 2201/0081* (2013.01)

(58) Field of Classification Search
CPC ........ H04N 1/00965; H04N 1/04; H04N 1/36; H04N 2201/0081
See application file for complete search history.

(56) References Cited

U.S. PATENT DOCUMENTS

| 7,916,975 | B2* | 3/2011 | Tone ............... H04N 1/32358 358/468 |
| 9,569,703 | B2* | 2/2017 | Ito .................. G06K 15/181 |
| 2010/0309511 | A1* | 12/2010 | Ito .................. H04N 1/00965 358/1.15 |
| 2014/0043343 | A1* | 2/2014 | Iwai ................ G06T 1/60 345/502 |

FOREIGN PATENT DOCUMENTS

| JP | 2006-139606 A | 6/2006 |
| JP | 2010-282429 A | 12/2010 |
| JP | 2011-101093 A | 5/2011 |

* cited by examiner

*Primary Examiner* — Kent Yip
(74) *Attorney, Agent, or Firm* — Canon USA, Inc., IP Division

(57) ABSTRACT

A data processing apparatus includes an input unit to read out data of a first area of image data from an external memory, sequentially interpret commands included in a command list, and transmit the data of the first area to an image processing unit according to the command, and an output unit to receive data obtained by performing a image processing on the data of the first area and write the received data in the external memory, whereon, based on a control signal, the input unit controls readout of a following command to a command indicating suspension from the external memory and continuation, etc., of transmission of the data of a second area, and based on a control signal, the output unit controls, in a case that the command indicating suspension is received, continuation, etc., of writing of the data of the second area to the external memory.

18 Claims, 28 Drawing Sheets

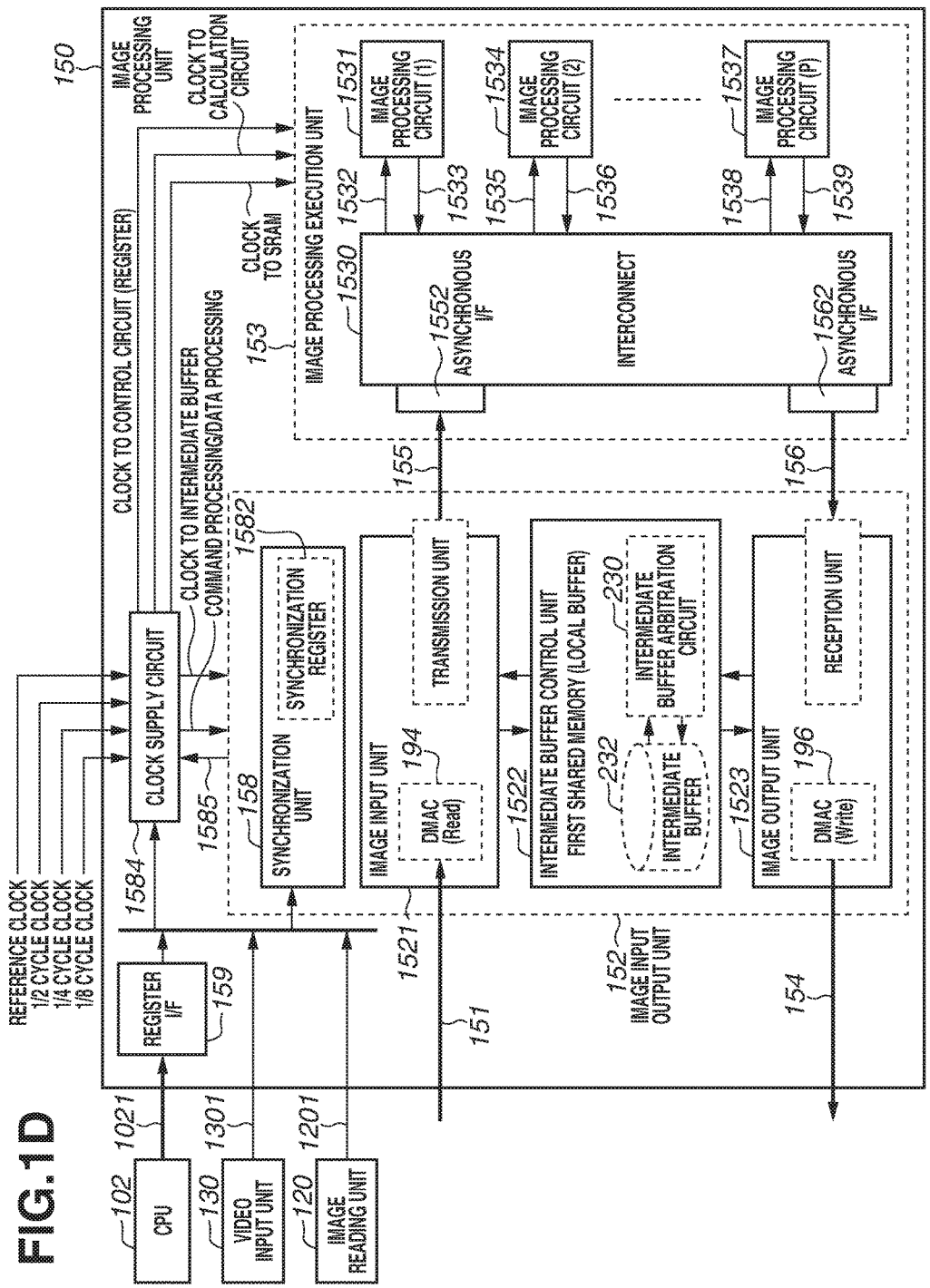

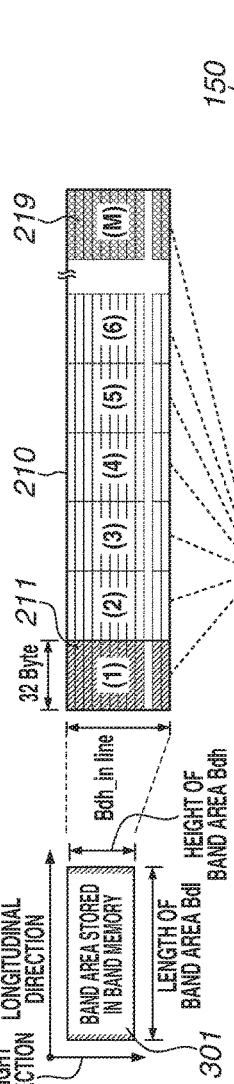
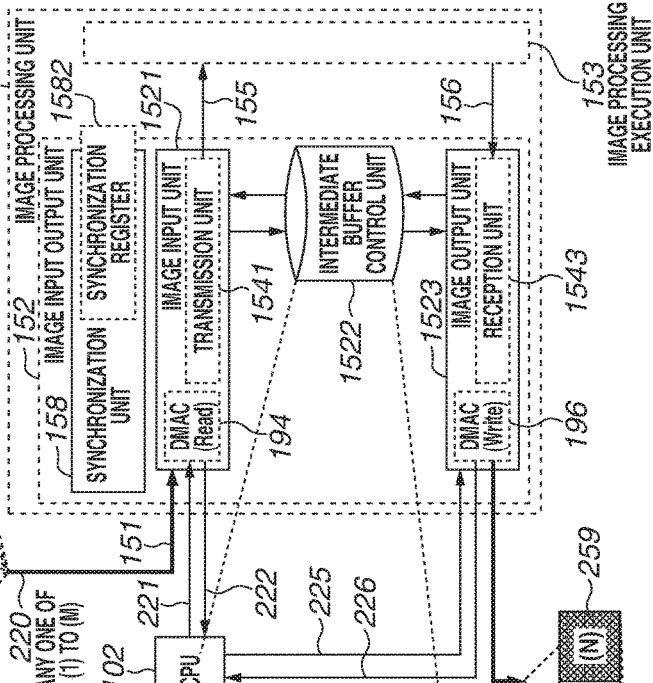
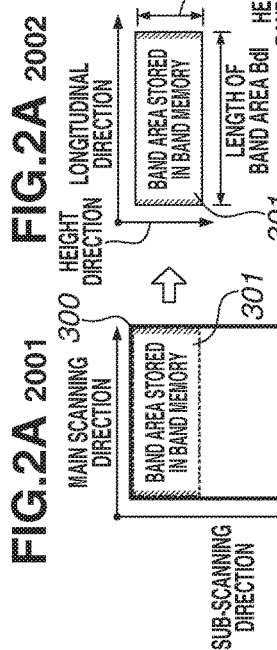
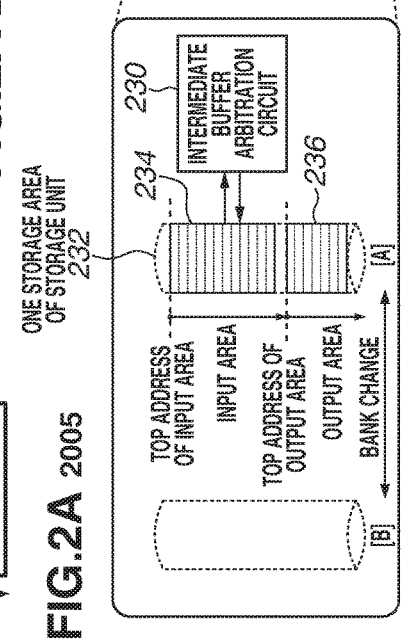
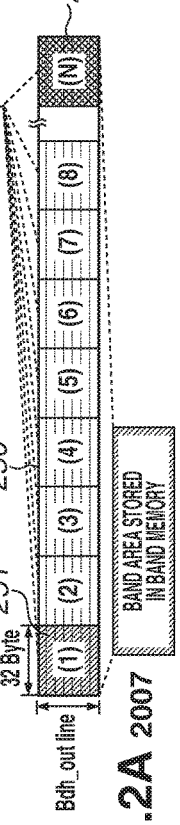

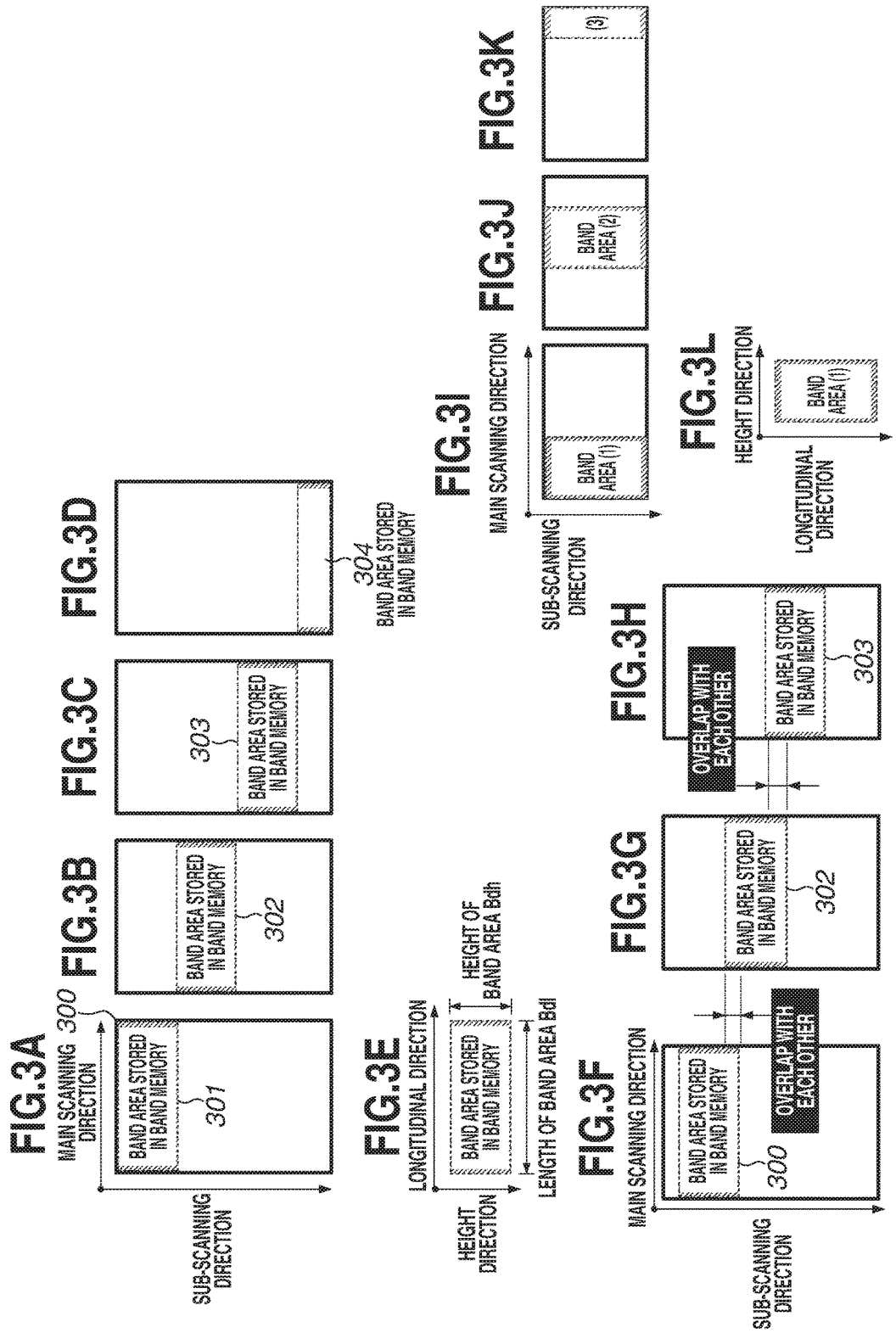

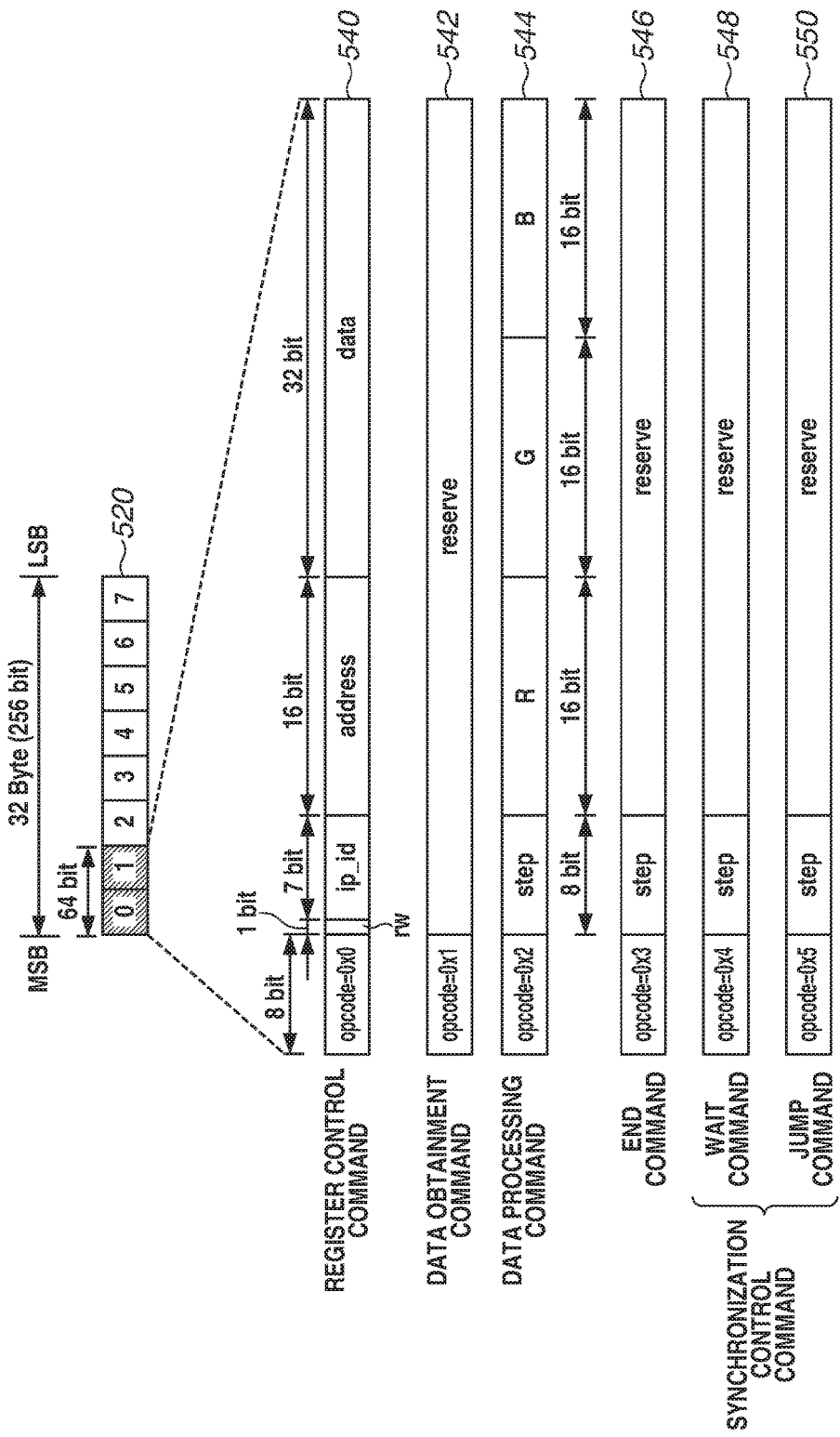

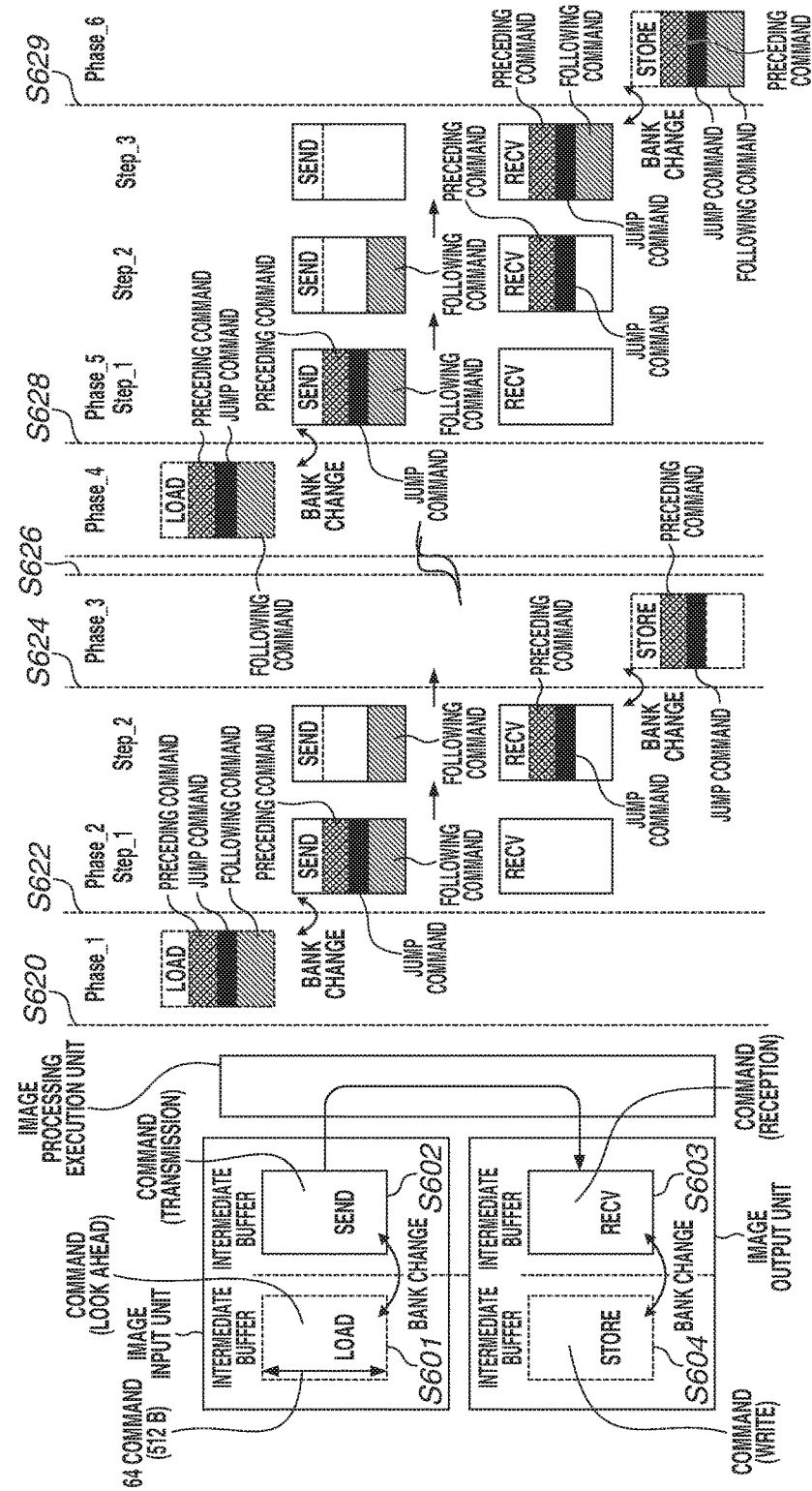

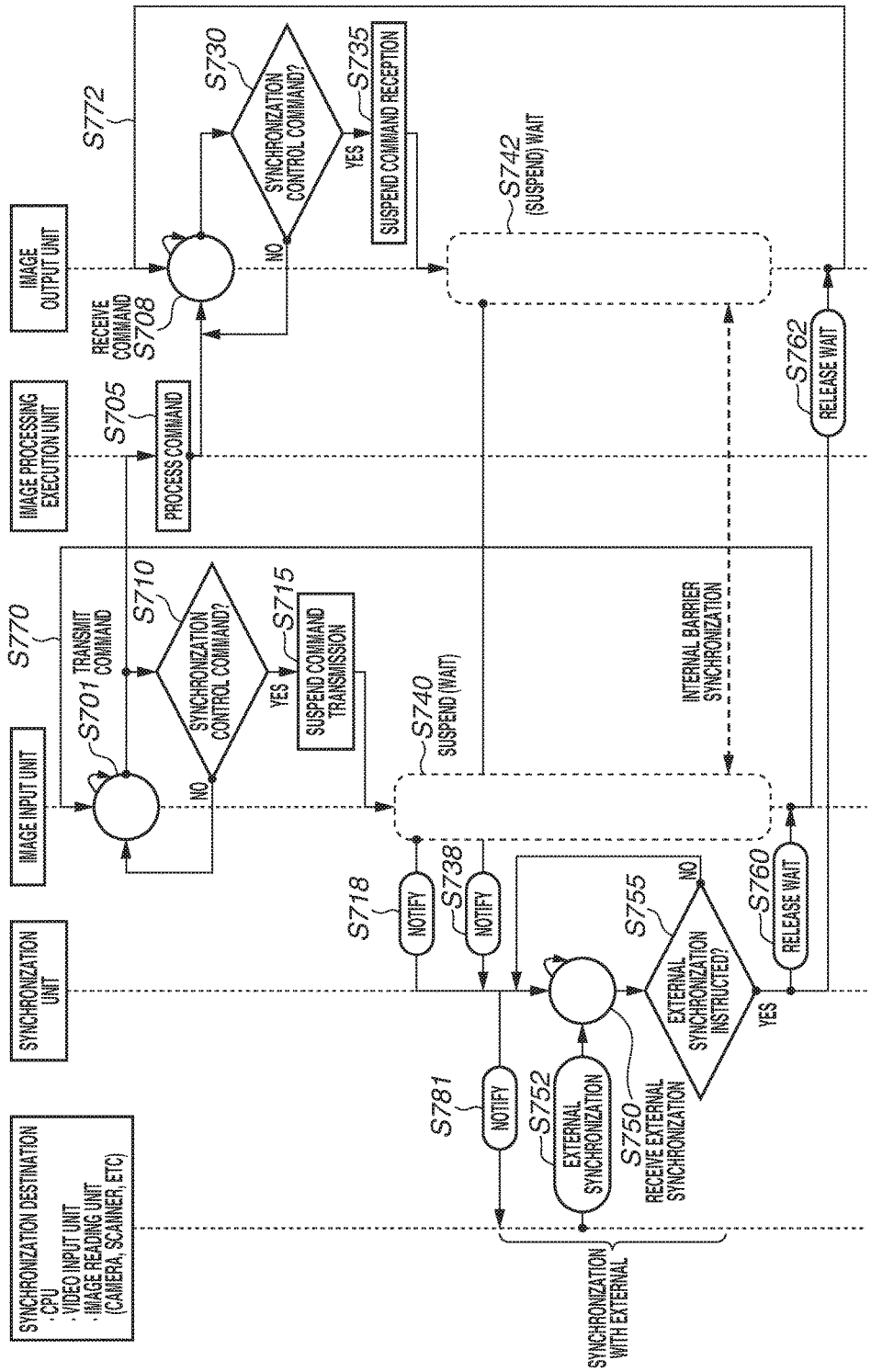

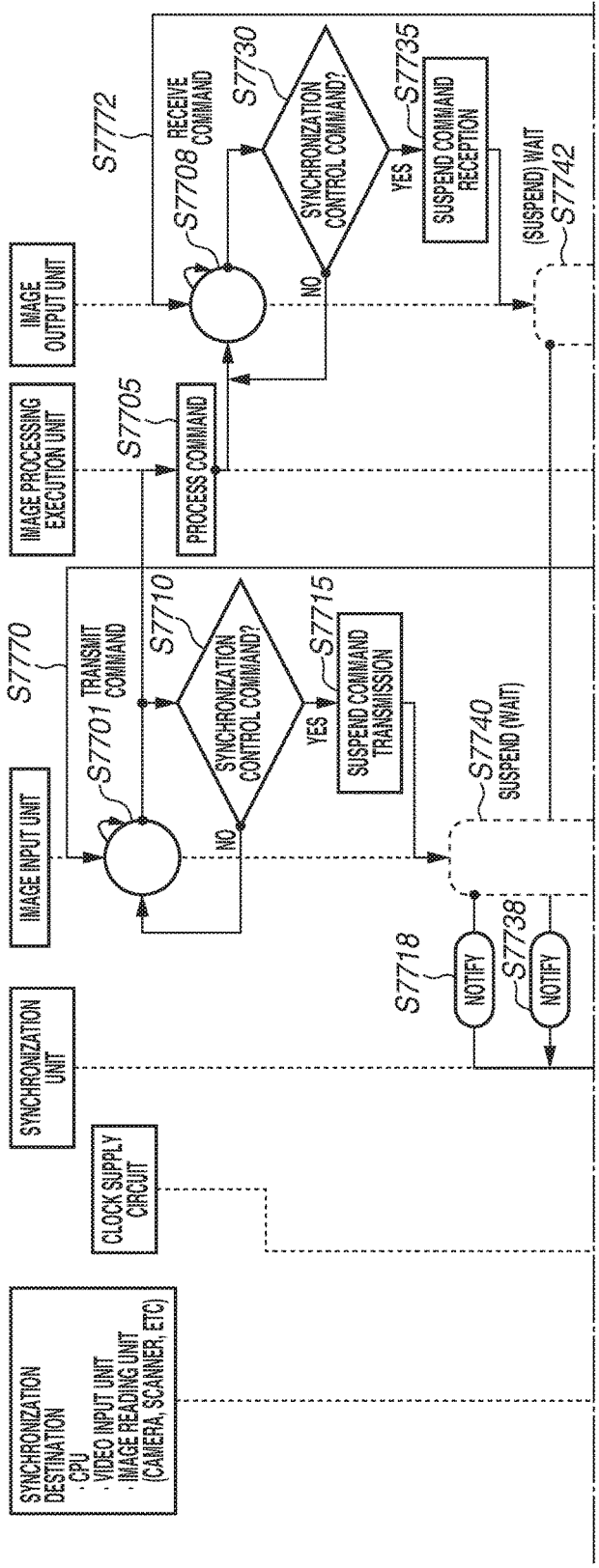

EXAMPLE OF COMMAND OUTPUT FROM IMAGE PROCESSING
INPUT UNIT TO IMAGE PROCESSING EXECUTION UNIT

READ RESULT OF REGISTER AND PROCESSED IMAGE DATA
WRITTEN FROM IMAGE PROCESSING OUTPUT UNIT TO MEMORY

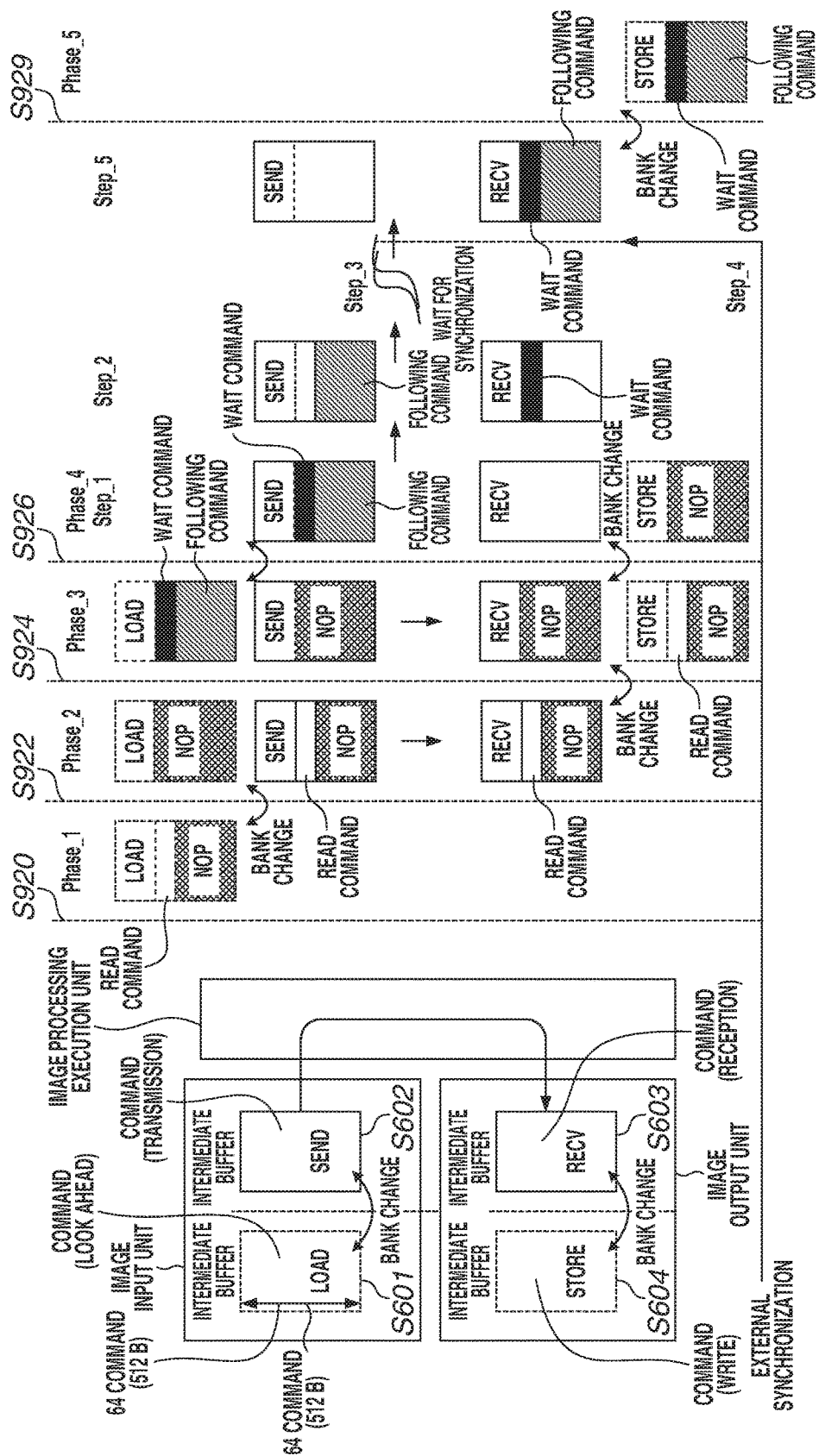

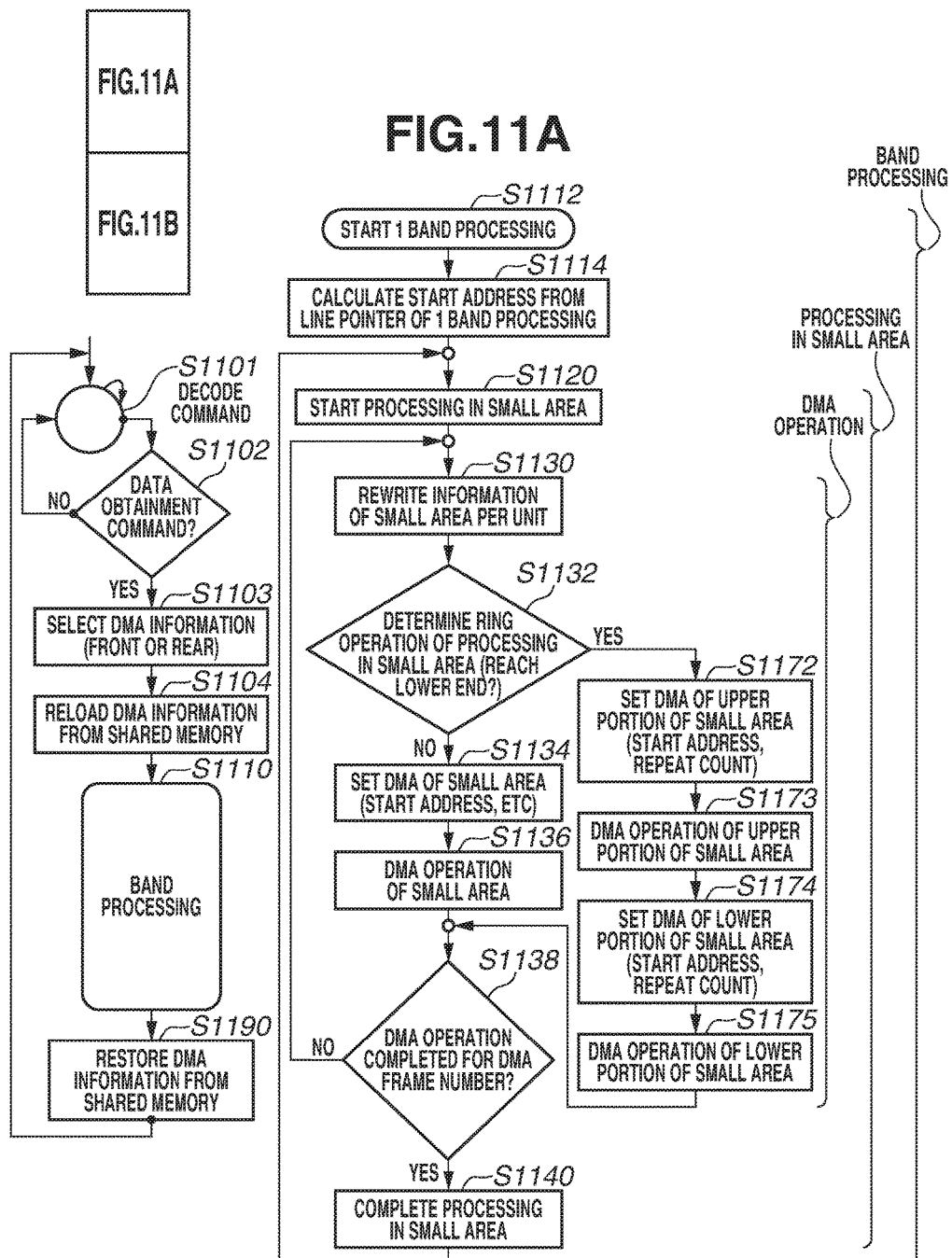

DATA PROCESSING APPARATUS, DATA PROCESSING METHOD, AND STORAGE MEDIUM

BACKGROUND OF THE INVENTION

Field of the Invention

One disclosed aspect of the embodiments relates to a data processing apparatus, a data processing method, and a program for transferring image data before and after image processing.

Description of the Related Art

Generally, when image data formed by image forming processing is output, local (neighborhood) image processing such as spatial filtering is performed. In the local image processing, a predetermined calculation is performed on a spatial filter area including a pixel as a processing target (hereinbelow, referred to as a processing object pixel) using all or most of pixels in the spatial filter area.

Japanese Patent Application Laid-Open No. 2006-139606 describes a technique for performing such local image processing as parallel distributed processing. According to the technique, an image is subjected to region segmentation (one-dimensional segmentation) with respect to a sub-scanning direction, and image processing is performed on the segmented area sequentially or in a parallel distributed manner. A method for processing an image for each one-dimensional segmented area as described above is referred to as band processing.

Generally, in the band processing, each band area is designed to partially overlap with each other at a boundary with an adjacent area so that the local image processing is performed between the band areas without a gap. According to Japanese Patent Application Laid-Open No. 2006-139606, when the local image processing is performed on a band area, a pixel is scanned one by one in a height direction of the band area, so that a delay memory capacity for storing pixels necessary for the local image processing is defined by a height size of the band area. Accordingly, reduction of the delay memory is realized in Japanese Patent Application Laid-Open No. 2006-139606.

In addition, there is tile processing for processing an image by performing two-dimensional region segmentation and others, and methods for segmenting an image into partial images and performing processing sequentially or in a parallel distributed manner are collectively referred to as region segmentation methods.

As described above, the region segmentation processing for performing the sequential processing or the parallel distributed processing by segmenting an image into partial images has various advantages, such as speeding up by the parallel distributed processing and reduction of the delay memory.

One of the above-described local image processing is resolution conversion processing for converting an input image into an image of a desired size by enlarging or reducing the image. According to the resolution conversion processing, the number of input pixels is largely different from the number of output pixels after processing, therefore it is difficult to implement the processing as hardware compared to other local image processing in which the number of pixels is not changed in input and output. As described above, using the region segmentation processing has various advantages, however, when the image processing such as the resolution conversion is realized by the region segmentation processing, it becomes more difficult to implement the processing as hardware.

For example, assuming that image data on a sheet surface or the like is segmented into areas (for example, bands), and the resolution conversion (arbitrary scaling) is performed on each of the segmented image areas. When a magnification (variable magnification) of the resolution conversion is an integer, a converted image area is also an integer multiple, and it is not necessary to consider a pixel of which a size is less than one pixel and below a decimal point, in other words, a phase shift by the resolution conversion. On the other hand, when the magnification (variable magnification) is not an integer, a pixel of which a size is below a decimal point may be generated in an image area after the resolution conversion depending on a size of an input image area. However, when the processed image area data is written into an external storage device (a global buffer), a pixel less than one pixel cannot be written. Needless to say, it is necessary to "round" the pixel less than one pixel using a method for writing the relevant pixel as one pixel, a method for not writing by ignoring it, or the like so that the number of pixels becomes an integer.

As described above, when a pixel less than one pixel generated by the image processing is rounded, a setting value of a direct memory access (DMA) function used for transfer of image data is varied in each segmented area. Thus, the same setting value cannot be continuously used. For example, setting values such as a "top address" and a "repeat count" necessary when image data is transferred using the DMA function are required to be calculated in consideration of a series of image processing contents for each segmented area. Conventionally, in such a case, setting values of the DMA function corresponding to a series of image processing contents for each segmented area are first calculated by firmware operating on a central processing unit (CPU). Subsequently, the CPU sequentially sets the setting values calculated for each segmented area and sequentially operates an image processing unit.

For example, when the image processing on front and rear surfaces of a sheet is realized by time division multiplex processing by a single image processing apparatus as in the case of simultaneous two-sided scanning, image data pieces of the front and rear surfaces are necessary to be segmented into areas (for example, bands) and processed alternately. In such usage, for the setting value of the above-described DMA function, it is necessary to calculate a setting value of a front area and a setting value of a rear area alternately.

Generally, an image processing apparatus is constituted of various units such as a CPU for controlling the entire apparatus, an external storage device for storing a pixel as a processing target, a direct memory access controller (DMAC) for transferring an image in a unit of processing, and an image processing unit for executing image processing. These units operate simultaneously and/or in cooperation with each other and thus realize desired image processing at desired speed. When image data of an image processing target is input to the image processing apparatus, the image data of a part of the processing target is sequentially read from the external storage device and temporarily stored in an input local buffer in the image processing unit, and the image processing is executed. Further, when processed image data is output, a part of the image data after the image processing is temporarily stored in an output local buffer in the image processing unit and sequentially written into the external storage device. As described above, the image processing apparatus transfers image data to each other between the external storage device via the input/ output local buffers and realizes simultaneous operations of the units and linkage operations between the units in the apparatus.

The CPU needs to control the DMAC in a unit of a partial image while cooperating (synchronizing) with another device and input the partial image to the image processing unit. For example, when a scanner device performs image segmentation on an A4 size sheet with a resolution of 600 dpi (6600 pixels in a vertical direction) at a band area having a height of 16 pixels, a number of the band areas will be 412. In other words, the CPU needs to perform the DMAC control for 412 times per page. In addition, similar control is necessary for the output from the image processing unit, and the control time by the CPU will be 824 times. As the number of segmenting times becomes larger, a control load on the CPU becomes heavier, and overhead such as a delay in communication for cooperating (synchronizing) with another device and a delay in an interrupt becomes larger. Accordingly, it becomes difficult to realize speeding up (real-time characteristic) of the image processing apparatus.

In order to address such issues, it is necessary to reduce overhead caused by cooperation (synchronization) with another device conventionally performed by the CPU and a processing load of the control on the DMAC. For example, according to Japanese Patent Application Laid-Open No. 2010-282429, the image processing unit reads out a command list from an external memory and realizes autonomous DMAC control using the command list without intervention of the CPU. On the other hand, according to Japanese Patent Application Laid-Open No. 2011-101093, a command list for starting the image processing unit while cooperating (synchronizing) with another device is introduced, and reduction of overhead for cooperation (synchronization) is realized by starting the DMAC.

Japanese Patent Application Laid-Open No. 2011-101093 is also similar, the DMAC and the image processing unit are separated in the general image processing apparatus. Further, synchronization between the image processing unit (an image input output unit and an image processing execution unit) and external devices (the CPU, the scanner, and the video input device) is realized via the DMAC with completion of DMA transfer as a starting point. Thus, it is necessary to start the DMAC for each control point (a synchronization point) with the external devices (the CPU, the scanner, and the video input device). Needless to say, the control point (the synchronization point) is located according to a transfer amount (a unit of transfer) of the DMAC.

On the other hand, the image processing unit (the image input output unit and the image processing execution unit) is operated according to an image processing data flow. In this regard, the control points (the synchronization points) of task switching, barrier synchronization, and the like by the image processing execution unit according to the image processing data flow do not always coincide with the control point (the synchronization point) of the above-described transfer completion of the DMAC. Thus, in order to appropriately perform synchronization between the external devices (the CPU and scanner) and the image processing unit (the image input output unit and the image processing execution unit), the transfer amount of the DMAC is segmented into a smaller size. Further, it is necessary to make it easily to adjust the control point (the synchronization point) of the DMA transfer completion to the control point (the synchronization point) of the task switching and the barrier synchronization of the image processing However, when a unit of DMA transfer is made smaller, DMA transfer efficiency is decreased. In addition, the external device (the CPU) controls the DMAC for each control point (the synchronization point) of the DMA transfer completion. Accordingly, an issue arises such that a control load on the external device (the CPU) is increased because the number of the above-described control points (the synchronization points) is increased.

Especially, in the usage like the simultaneous two-sided scanning, an installation position of a scanner sensor with respect to a sheet surface is different between the front and rear surfaces of the sheet, and a reading start position of the image processing is different between the front and rear surfaces. The same manner is applied when designation of a reading range is different between the front and rear surfaces of the sheet. Further, if an image format (a dot sequential system, a frame sequential system, or the number of colors) for performing the image processing is different between the front and rear surfaces of the sheet, it is to be understood that the image processing needs to be executed on the front and rear surfaces of the sheet using respectively appropriate setting values. In order to realize the image processing on the front and rear surfaces in a time division multiplexed manner by a single image processing apparatus with respect to these purposes, it is necessary to alternately switch the image processing for each segmented area on the front and rear surfaces. On the other hand, as in the case of the above-described arbitrary scaling, the setting value of the DMA function used for transfer of the image data is varied in each segmented area, and the same setting value cannot be continuously used. Therefore, it is further difficult to solve the two issues at the same time.

The image processing unit operates a series of image processing for each band while synchronizing with external devices (the CPU, the scanner device, a print device, and the like) every time performing the image processing on one band area. At that time, the image processing unit is in a wait state from when an external synchronization signal is input from the external device until when the image processing on a next band area is started. However, during the wait state, a clock is input to the image processing execution unit, and the image processing execution unit consumes needless electricity. When the external device is a hardware device such as a scanner, a wait time between the bands is too short for the firmware to intervene. Therefore, when a clock is stopped by intervention of the firmware, control overhead is generated, and a processing time of the image processing (in whole) is delayed. On the other hand, if the band areas are processed 412 times in one page of an A4 size sheet and, an automatic document feeder (ADF) scanner is continuously operated for 50 pages, the wait states are generated more than 20000 times, and needless power consumption thereof is large in total.

The above-described conventional techniques have no descriptions of clock control in the wait state which is too short for the firmware to intervene between the band area subjected to the image processing and a next band area.

As described above, when the setting value of the DMA function for each segmented area is calculated by the firmware, processing by the CPU is required for each segmented area, so that a plurality of segmented areas cannot be continuously processed in the image processing unit.

In addition, when operations of a plurality of units are controlled by controlling data transfer to a global buffer via a local buffer, and if the number of pixels of input and output images varies for each segmented area as in the case of the resolution conversion processing, the data transfer cannot be uniformly defined. Therefore, for example, the number of output pixels is calculated by the firmware for each segmented area, and the image processing unit is started by changing the setting of the DMAC for each band by the firmware. Further, when the image processing for one band is completed, the image processing unit needs to notify the CPU of completion of the processing using an interrupt and the like to synchronize with the CPU. The CPU takes time for, for example, a few millisecond to receive the interrupt, search for an interrupt factor, and return to a next operation. Accordingly, the CPU is in a state in which a certain load is always applied thereon for controlling and synchronizing (meeting) with the image processing unit and is not released during the image processing. Therefore, there are issues such as a delay is required for a simultaneous operation of each unit in the apparatus, and a linkage operation between the units cannot be continuously executed.

SUMMARY OF THE INVENTION

A disclosed aspect of the embodiments is directed to the provision of a data processing apparatus which realizes a control/synchronization method capable of flexibly setting a control point (a synchronization point) for executing a complicated data flow for realizing advanced image processing. The disclosure is further directed to the provision of a data processing method.

According to an aspect of the disclosure, a data processing apparatus includes an input unit configured to read out data of a first area of image data to be subjected to image processing from an external memory, sequentially interpret a plurality of commands included in a command list obtained from the external memory, and transmit the data of the first area to an image processing unit according to the command, and an output unit configured to receive data obtained by performing the image processing on the data of the first area from the image processing unit and write the received data in the external memory according to the command, wherein, based on a control signal indicating that data of a second area following to the data of the first area can be read out from the external memory, the input unit controls readout of a following command to a command indicating suspension from the external memory and continuation, suspension, or restart of transmission of the data of the second area, and based on a control signal indicating that the data of the second area following to the data of the first area can be read out from the external memory, the output unit controls, in a case that the command indicating suspension is received, continuation, suspension, or restart of writing of the data of the second area to the external memory.

A disclosed aspect of the embodiments is directed to the provision of the data processing apparatus which can improve efficiency of data transfer when the number of pixels varies before and after the image processing. The disclosure is further directed to the provision of a data processing method. The disclosure is directed to improvement of efficiency of data transfer, for example, when a setting of a segmented area to be processed is switched between data obtained from a front surface of a sheet and data obtained from a rear surface of the sheet as in the case of two-sided scanning.

According to an aspect of the disclosure, a data processing apparatus includes an input unit configured to read out data of a first area of image data to be subjected to image processing from an external memory and transmit the data of the first area to an image processing unit, an output unit configured to receive data obtained by performing the image processing on the data of the first area from the image processing unit and write the received data in the external memory, and a storage unit configured to store DMA information for reading out from and writing to the external memory, wherein the input unit and the output unit obtain the DMA information from a storage area of the storage unit in response to a command instructing execution of image processing, execute the image processing, and restore DMA information updated after processing of the image processing in the storage area, and the DMA information is switched according to whether the image data is data of a front surface or data of a rear surface of a sheet.

Further features of the disclosure will become apparent from the following description of exemplary embodiments with reference to the attached drawings.

BRIEF DESCRIPTION OF THE DRAWINGS

FIG. 1D is a block diagram illustrating the entire configuration of the data processing apparatus and a third configuration example of the image processing unit.

FIGS. 2A 2001 to 2A 2007 illustrate operation examples according to input and output of image data in the first configuration example. FIGS. 2B 2001 to 2B 2007 illustrate operation examples according to input and output of image data in the second configuration example.

FIGS. 3A to 3L illustrate examples of operations of band processing.

FIG. 5B illustrates an example of a data configuration of a command.

FIG. 6B illustrates a synchronization operation of a Jump command.

FIG. 7A illustrates an example of a sequence of the data processing apparatus.

FIG. 9B illustrates a synchronization operation between a read command and a wait command.

DESCRIPTION OF THE EMBODIMENTS

Various exemplary embodiments of the disclosure will be described in detail below with reference to the attached drawings.

Configuration of Apparatus

Figure 1A:
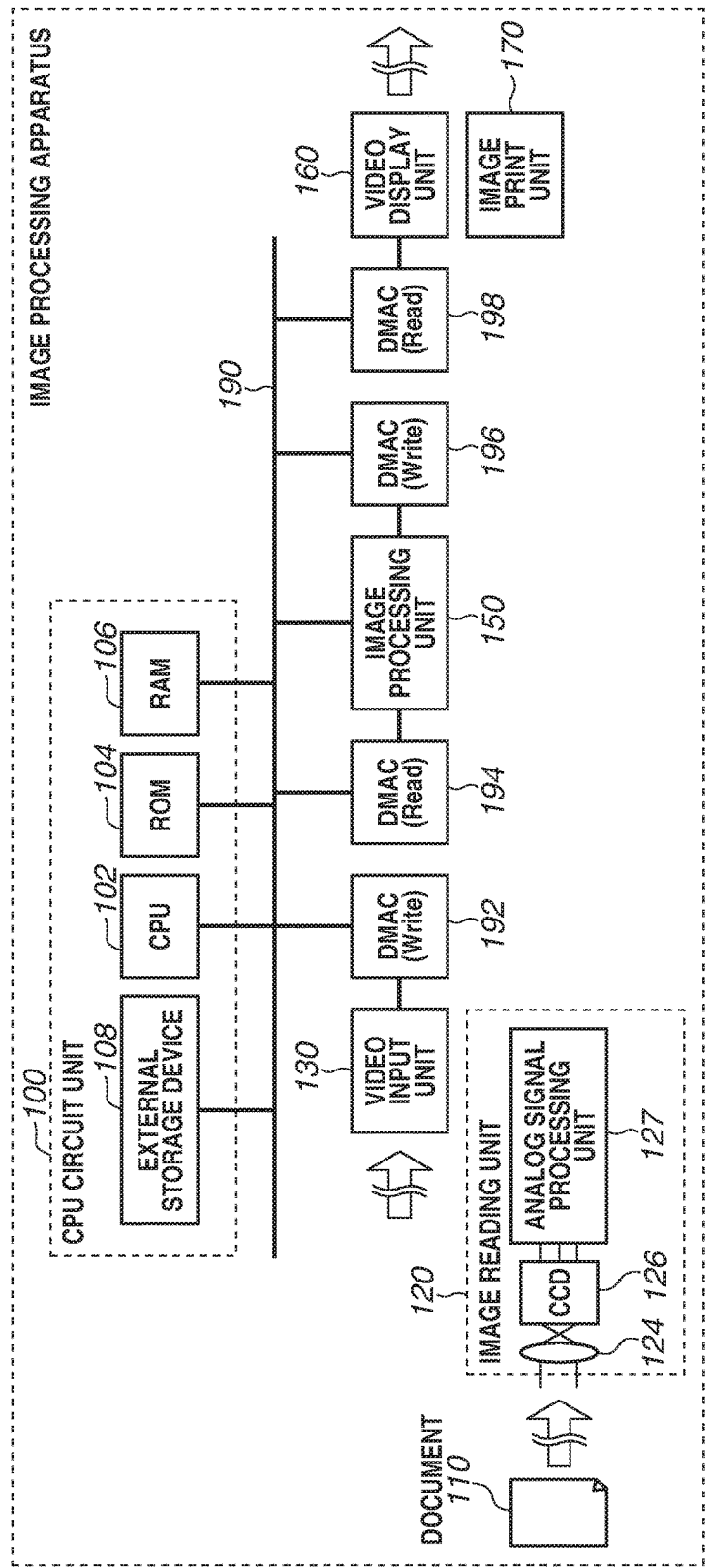
FIG. 1A is a block diagram illustrating an entire configuration of a data processing apparatus and a configuration example of an image processing unit.

FIG. 1A is a block diagram illustrating an example of an entire configuration of a data processing apparatus (also referred to as an image processing apparatus or a computer) according to a first exemplary embodiment. As illustrated in FIG. 1A, the image processing apparatus according to the present exemplary embodiment includes a CPU circuit unit 100, an image reading unit 120, a video input unit 130, an image processing unit 150, a video display unit 160, an image print unit 170, and the like. An outline of operations by the configuration is described below.

The image reading unit 120 includes a lens 124, a charge coupled device (CCD) sensor 126, an analog signal processing unit 127, and the like. More specifically, image information of a document 110 is formed on the CCD sensor 126 via the lens 124, and the image information is converted into analog electrical signals of red (R), green (G), and blue (B) by the CCD sensor 126. The image information converted into the analog electrical signal is input to the analog signal processing unit 127, subjected to correction for each R, G, B color, and then subjected to analog/digital conversion (A/D conversion), so that a digitized full color digital image signal (a pixel value) is generated. The generated digital image signal is input to the video input unit 130 and then input to a DMAC 192.

Operations of the DMAC 192 are set by a CPU 102 in advance, and the input digital image signal is stored in a RAM 106 and an external storage device 108 in the CPU circuit unit 100 via a shared bus 190. Hereinbelow, data in which digital image signals of a plurality of pixels are assembled to form a piece of image is referred to as image data. According to the present exemplary embodiment, the digital image signal is stored in the RAM 106 and the like in an image data format. When the image processing is performed, the CPU 102 or an image input output unit 152 described below starts and causes a DMAC 194 to read out the image data stored in the RAM 106 and the like and to input the digital image signal corresponding to a processing object pixel to the image processing unit 150.

The image processing unit 150 is, for example, an image data processing apparatus which performs correction of individual differences of reading elements in a sensor device such as a scanner and color correction such as input gamma correction on the input digital image signal to generate image data. A DMAC 196 stores the image data which is subjected to the above-described image processing to the RAM 106 and the external storage device 108. The DMAC 196 is controlled as described below. For example, the CPU 102 or the image input output unit 152 described below sets an operation of the DMAC 196 in advance, and the CPU 102 starts the DMAC 196. The operation of the DMAC 196 is set, for example, to write the processed image data to the RAM 106. As described above, the image processing unit 150 performs, on the input digital image signal, the image processing for printing an image such as input color correction processing, spatial filtering, color space conversion, density correction processing, and the halftone processing.

After generating printable image data, the CPU 102 causes the DMAC 196 to store the generated image data in the RAM 106 and the like.

A DMAC 198 reads out the image data subjected to the image processing stored in the RAM 106 and outputs the image data to the image print unit 170. The image print unit 170 is, for example, a printer. Settings of the DMAC 198 is performed by, for example, the CPU 102. The image print unit 170 includes a print output unit (not illustrated) adopting an inkjet head, a thermal head, and the like and records an image on a recording sheet based on the digital image signal of the input image data.

The example in which the image data of the document 110 read by the image reading unit 120 is printed by the image print unit 170 is described here, however, the disclosure is not limited to this example. For example, the video input unit 130, the video display unit 160, and the like may be used to perform predetermined image (video) processing on an input video, and the processed video may be displayed on a video display apparatus (not illustrated) such as a display.

The CPU circuit unit 100 includes the CPU 102 for controlling calculation, a read-only memory (ROM) 104 for storing fixed data and a program, the RAM 106 used for temporarily storing data and loading a program, the external storage device 108, and the like. The CPU circuit unit 100 controls the image reading unit 120, the image processing unit 150, the image print unit 170, and the like and comprehensively controls a sequence of the image processing apparatus according to the present exemplary embodiment. The external storage device 108 is a storage medium such as a disk for storing a parameter, a program, and correction data used by the image processing apparatus according to the present exemplary embodiment. Data, a program, and the like in the RAM 106 may be loaded from the external storage device 108. According to the present exemplary embodiment, data transfer to the image processing unit 150 is performed via the DMACs 194 and 196, however, a storage destination of the transferred data is not limited to the RAM 106 and may be the external storage device 108. The storage destinations of the transferred data secured in the RAM 106 and the external storage device 108 are collectively referred to as global buffers.

Figure 1B:
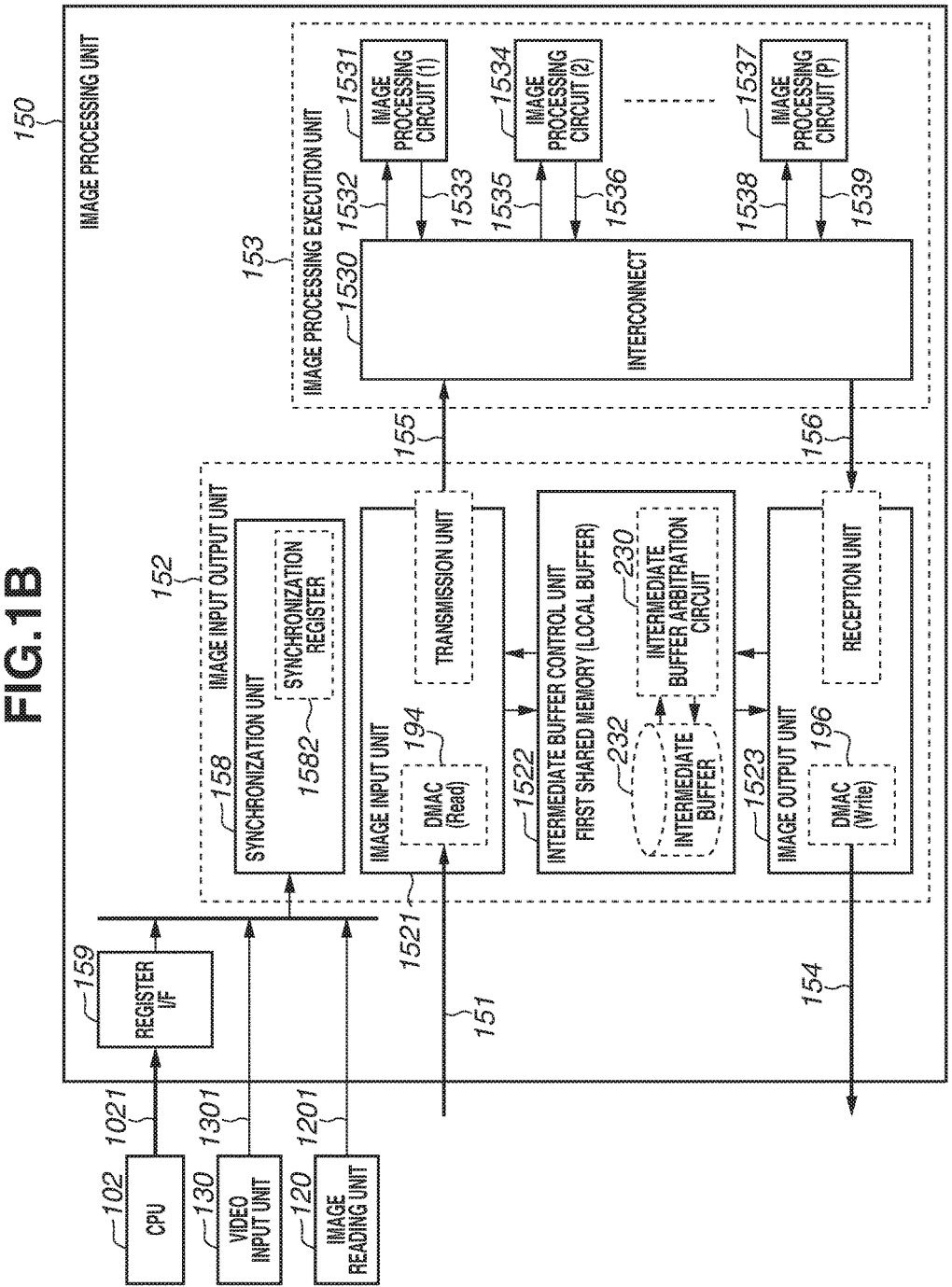
FIG. 1B is a block diagram illustrating the entire configuration of the data processing apparatus and a first configuration example of the image processing unit.

Next, a detail configuration and an operation of the image processing unit 150 for performing the image processing on image data are described with reference to FIG. 1B. In FIG. 1B, for facilitating the understanding, the DMAC 194 for reading out the image data from the global buffer and the DMAC 196 writing the image data thereto are illustrated to be respectively included in an image input unit 1521 and an image output unit 1523 of the image processing unit 150.

First, the CPU 102 or the image input unit 1521 starts the DMAC 194, and the DMAC 194 reads out the image data from the global buffer. A structure of the image data is described below. The read out image data is input to the image input output unit 152 of the image processing unit 150 via an input port 151. In the image input output unit 152, upon obtaining the input image data, the image input unit 1521 stores the obtained image data in a temporary storage unit (an intermediate buffer 232) included in an intermediate buffer control unit 1522. The image input unit 1521 generates a pixel value while reading out the image data temporarily stored in the intermediate buffer and inputs the pixel value as an input pixel value 155 to an image processing execution unit 153. The temporary storage unit (the intermediate buffer 232) included in the intermediate buffer control unit 1522 may be collectively referred to as a local buffer in contrast to the global buffer described above.

The image processing execution unit 153 executes the predetermined image processing on the input pixel value 155 and output an output pixel value 156 obtained as a result of the image processing to the image input output unit 152. Processing performed by the image processing execution unit 153 is described in detail below. The input pixel value 155 and the output pixel value 156 are one or more pixel values, and a plurality of pixel values may be input as the input pixel value 155, and one pixel value may be output as the output pixel value 156 thereto.

In the image input output unit 152, the image output unit 1523 generates output image data from the processed output pixel value 156 and stores the output image data in a storage unit (the intermediate buffer 232) in the intermediate buffer control unit 1522. The image output unit 1523 reads out the processed image data temporarily stored in the intermediate buffer 232 and outputs the processed image data as the output image data from the DMAC 196 via an output port 154. The DMAC 196 is already started by the CPU 102 as described above and writes the received output image data to the RAM 106.

As described above, the image processing unit 150 performs the processing in such a manner that the image input output unit 152 obtains the image data via the DMAC 194, and the image processing execution unit 153 executes data processing with respect to the image data. Further, the image input output unit 152 outputs the image data after the data processing via the DMAC 196. In other words, the image processing unit 150 assumes a role to perform the data processing on image data included in the image processing apparatus and return the processed image data to the image processing apparatus. The image input output unit 152 also serves as a data input output control device for controlling input and output of data.

The above-described intermediate buffer is a storage area (a local buffer) shared by the image input unit 1521 and the image output unit 1523 and constituted of a shared memory (a first shared memory unit).

Next, the image processing execution unit 153 of the image processing unit 150 is described in detail. The image processing execution unit 153 is constituted of P pieces of image processing circuits, namely an image processing circuit (1) 1531 to an image processing circuit (P) 1537 and an interconnect 1530. The P pieces of the image processing circuits and the interconnect 1530 are connected with each other via ports, such as input ports 1532, 1535, . . . , and 1538 and output ports 1533, 1536, . . . , and 1539. Each of the image processing circuits performs one image processing respectively. The image processing is, for example, any one of input color correction processing, color space conversion, density correction processing, halftone processing, spatial filtering, resolution conversion, trimming processing, end portion extension processing, interlace to progressive (IP) conversion, and chroma upsampling. Each image processing circuit may be realized by hardware such as a pipeline circuit and by a processor and a program (software). Further, each image processing circuit receives the input pixel value 155 from a corresponding input port, performs processing thereon, and outputs the processed output pixel value 156 from a corresponding output port.

The interconnect 1530 is realized by a connection unit such as a crossbar and a ring bus and can arbitrarily switch connection destinations of the input port and the output port. Therefore, the CPU 102 sets designation of connection destinations of these ports, and thus the interconnect 1530 can, for example, change an execution order of the P pieces of the image processing circuits or bypass a part of processing. As described above, the image processing execution unit 153 realizes desired image processing by selecting and combining various types of processing according to an application.

In addition, the CPU 102 can input data of the above-described intermediate buffer (the local buffer, the first shared memory) to any of a plurality of image processing circuits via the interconnect 1530 and output processing result data of any of the plurality of image processing circuits to the intermediate buffer. Therefore, it means that the intermediate buffer (the local buffer, the first shared memory unit) is shared by a plurality of image processing circuits via the interconnect 1530.

Band Processing

Hereinbelow, band processing for processing each band area obtained by one-dimensionally segmenting image data is described as a region segmentation method of image data according to the present exemplary embodiment.

The band processing according to the present exemplary embodiment is described below with reference to FIGS. 3A to 3S. In the band processing, as illustrated in FIG. 3A, a piece of image data 300 is segmented into band-shaped band areas 301 to 304, and the image processing is sequentially performed on each of the band areas. The band area is obtained by segmenting the image data in a main scanning direction or a sub-scanning direction, so that a length of the band area and a length of the image data coincide with each other in either of the main scanning direction and the sub-scanning direction. In the example in FIG. 3A, the image data is segmented in the sub-scanning direction, and the image data and the band area have the same length in the main scanning direction and have the different lengths in the sub-scanning direction. Hereinbelow, the segmented slender area is referred to as a band area, a storage area in which the band area is expanded is referred to as a band memory, and an action for segmenting image data is referred to as band segmentation. The band memory only has to be secured in an appropriate storage area on the system, however, for simplifying the description here, the band memory is secured as a storage area (global buffer) in the RAM 106.

Hereinbelow, as illustrated in FIG. 3B, a coordinate system of the image data (the main scanning direction—the sub-scanning direction) is defined by a coordinate system of a longitudinal direction and a height direction (a band area coordinate system), and the band area is expressed by length by height. A length of the band area, in other words, a size of a side in the longitudinal direction of the band area is any value of a length in the main scanning direction of the image data or a length in the sub-scanning direction thereof. Further, a height of the band area, in other words, a size of a side of the band area in the height direction is an arbitrary value. In the example in FIG. 3A, the longitudinal direction is the main scanning direction, and the height direction is the sub-scanning direction. In contrast, when the image data is segmented in the main scanning direction as illustrated in FIG. 3D, the longitudinal direction becomes the sub-scanning direction, and the height direction becomes the main scanning direction as illustrated in FIG. 3E. The band segmentation as illustrated in FIG. 3D may be performed, for example, when a size of the image data in the main scanning direction is larger than a size in the sub-scanning direction.

In the band processing illustrated FIG. 3A, first, the first band area 301 is expanded on the band memory on the RAM 106, and the image processing is performed. Next, the second band area 302 is overwritten and expanded on the band memory on the RAM 106 on which the first band area 301 is expanded, and the image processing is performed. Further, the third band area 303 is overwritten and expanded on the band memory on the RAM 106 on which the second band area 302 is expanded, and the image processing is performed. Finally, the fourth band area 304 is overwritten and expanded on the band memory on the RAM 106 on which the third band area 303 is expanded, and the image processing is performed. As can be seen from FIG. 3A, lengths of the band areas 301 to 304 are the same, but heights thereof are not necessarily the same. Therefore, the height of the band memory is determined according to a band area (the band areas 301 to 303 in FIG. 3A) of which a size of a side in the height direction is the largest.

In the band processing according to the present exemplary embodiment, in order to perform local (neighborhood) image processing such as spatial filtering without a gap between each of the band areas, each band area is set to partially overlap with each other at a boundary with an adjacent area as illustrated in FIGS. 3F to 3H.

Further, as illustrated in FIGS. 31 to 3K, for example, when the image data is segmented in the main scanning direction, the longitudinal direction becomes the sub-scanning direction, and the height direction becomes the main scanning direction as illustrated in FIG. 3L. The band segmentation as illustrated in FIGS. 31 to 3K may be performed, for example, when a size of the image data in the main scanning direction is larger than a size in the sub-scanning direction.

Image Data Structure

An image data structure according to the present exemplary embodiment is described in detail below. According to the present exemplary embodiment, the image data is temporarily stored in the storage area (the global buffer) in the RAM 106 as described above. Generally, the RAM 106 as the main memory is often constituted of an inexpensive dynamic random access memory (DRAM). Therefore, when the image data is read and written via the DMAC as the present exemplary embodiment, it is desirable that the image data is handled in units of that the DRAM can read and write without deteriorating its performance.

Figure 4A:
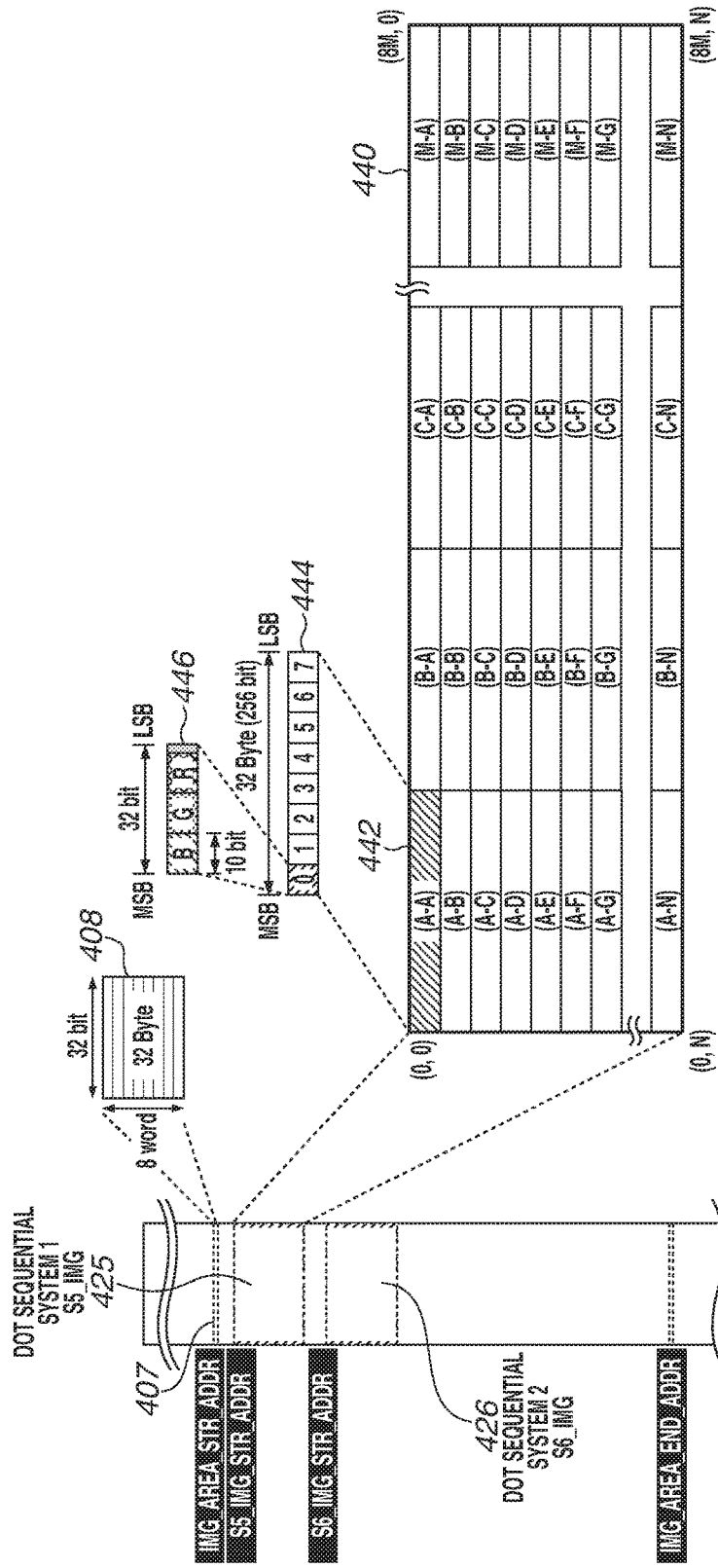
FIG. 4A illustrates a storage method of image data and an example of a data structure.

FIG. 4A illustrates a storage example of image data in the RAM 106 constituted of the DRAM and a data structure example of the image data. In the example in FIG. 4A, data areas (areas from IMG_AREA_STR_ADDR to IMG_AREA_END_ADDR) are secured on the RAM 106 (the DRAM), and various image data pieces necessary for the image processing are stored therein. FIG. 4A illustrates a storage example of image data in a dot sequential system in which two types of image data, namely S5_IMG 425 and S6_IMG 426 are stored in the data area of the RAM 106. In this example, a smallest unit of image data capacity to be stored is set to 32 bytes, i.e., 32 bits*8 words, as shown in a portion 408 so that the image data can be read and written without deteriorating the performance of the DRAM. In other words, storage capacities of the image data pieces S5_IMG 425 and S6_IMG 426 are integer multiples of 32 bytes.

Next, the image data structure is described in detail. Image data 440 (e.g., S5_IMG 425) has a pixel value of each color component red (R), green (G), and blue (B) in the dot sequential system. The image data 440 includes area data in a unit of 32 bytes, and in each area (for example, an area 442), a plurality of pieces of pixel values (8 pieces in this example) are packed as shown in a portion 444. Thus, the image data 440 has a size of 8M*N pixels. Further, in each of 8 pieces of the pixel values included in the portion 444, 10-bit R, G, and B values are packed as shown in a portion 446. Remaining 2 bits in the portion 446 is invalid data in which data is not stored so as to make access to the DRAM easier. FIG. 4A illustrates the example in which the smallest unit of the image data is defined as 32 bytes including 1 pixel in the vertical direction and 8 pixels in the horizontal direction as the data area 442, however, it is needless to say that the smallest unit is not limited to this example, and the smallest unit may be set as, for example, 2 pixels in the vertical direction and 4 pixels in the horizontal direction.

Command List and Data Structure of Command

A command list and a data structure of a command according to the present exemplary embodiment are described in detail below with reference to FIGS. 5A and 5B. According to the present exemplary embodiment, the command list (the display list) and the command are temporarily stored in the storage area (the global buffer) in the RAM 106 as described above.

Figure 5A:
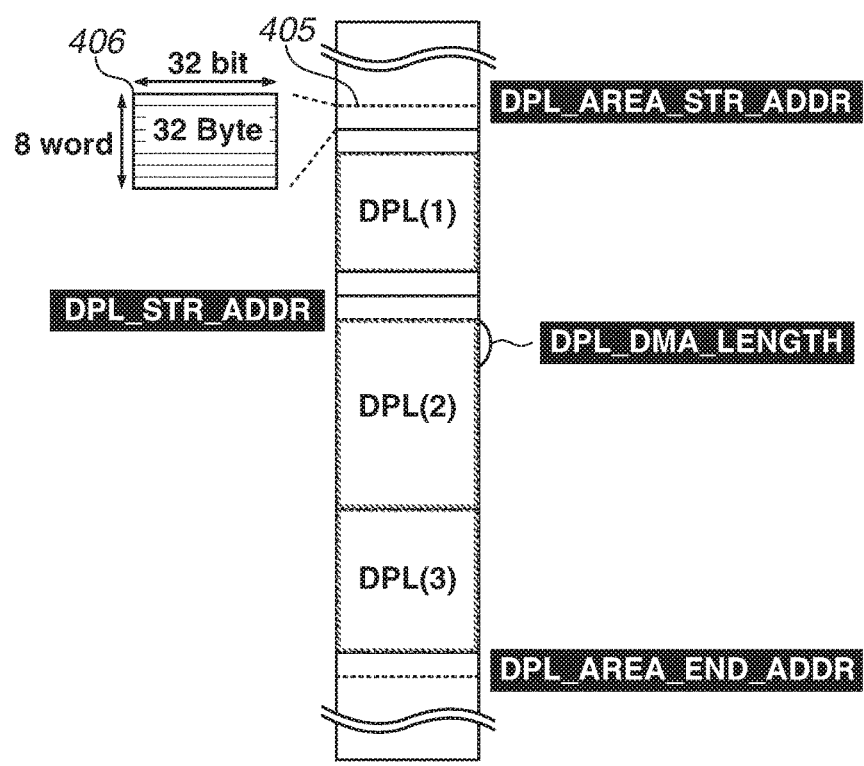
FIG. 5A illustrates a storage example of a command list (a display list) to a random access memory (RAM).

Areas from DPL_AREA_STR_ADDR to DPL_AREA_END_ADDR in FIG. 5A are areas for storing various rendering commands necessary for the image processing. The example in FIG. 5A illustrates a state in which three types of command lists (display lists) DPL (1) to DPL (3) are stored in this area. The smallest unit of data capacity to be each stored is set to 32 bytes, i.e., 32 bits*8 words as shown in a portion 406 so as to be able to access data without deteriorating the performance of the DRAM. Needless to say, storage capacities of the command lists (display lists) DPL (1) to DPL (3) are integer multiples of 32 bytes. The CPU 102 selects the command list (the display list) to be used from the DPL (1) to the DPL (3) according to a selected application and a user operation and executes different image processing.

An example of the data configuration of the command included in the command list (the display list) stored in the RAM 106 as the main memory is described in detail with reference to FIG. 5B. According to the present exemplary embodiment, the command included in the command list (the display list) has a 64 bit length, and four commands are stored in data 520 in a unit of 32 bytes.

As the commands included in the command list (the display list), there are at least five types of commands, namely a register control command 540, a data obtainment command 542, an end command 546, a wait command 548, and a Jump command 550. A data processing command 544 is a command generated by the image input unit 1521 and transmitted to the image processing execution unit 153 (which is described in detail below). Each command is identified by an opcode in upper 8 bits, and usage of lower 56 bits is different in each command. These commands function in the image processing unit 150 illustrated in FIG. 1A. Hereinbelow, an operation of each command is described with reference to FIG. 1B which is a configuration example of the image processing unit 150.

First, each command included in the command list (the display list) functions in various image processing circuits (the image input unit 1521, the image processing circuit (1) 1531, the image processing circuit (2) 1534 to the image processing circuit (P) 1537, and the image output unit 1523) in the image processing unit 150. The image processing circuit (1) 1531 and the image processing circuit (2) 1534 to the image processing circuit (P) 1537 are connected by the interconnect 1530. Each command passes through each image processing circuit in order along a connection order set to the interconnect 1530. For example, each command passes through in the order from the image input unit 1521, the image processing circuit (1) 1531, the image processing circuit (2) 1534 to the image processing circuit (P) 1537, to the image output unit 1523. Internal information of each command may be rewritten by each image processing circuit, however, the command itself is not deleted in the middle.

The register control command 540 is a command for reading and writing a value with respect to a register of various image processing circuits in the image processing unit 150 and serves as a register read command when 1-bit information "rw" is "0" and as a register write command when the 1-bit information "rw" is 7-bit circuit identification information "ip_id" is information for distinguishing and identifying the above-described various image processing circuits. For example, assuming that the circuit identification information "ip_id" of the image input unit 1521 is "0", that of the image processing circuit (1) 1531 is "1", that of the image processing circuit (2) 1534 is "2", that of the image processing circuit (P) 1537 is "P", and that of the image output unit 1523 is "P+1 (=30)". Further, 16-bit information "address" is information indicating an address of the register owned by each of the above-described various image processing circuits. For example, a register control command including information "rw=1, ip_id=1, address=0*0, data=0*F" is described. The register control command is referred to as a register write command for convenience sake since the command performs a write operation. The register write command is ignored in the image input unit 1521 since the circuit identification information "ip_id" is different and input to the image processing circuit (1) 1531 passing through the interconnect 1530. In the image processing circuit (1) 1531, the circuit identification information "ip_id" is the same, so that the register write command is valid, and "data=0*F" is written into a register in an address of "address=0*0" in the image processing circuit (1) 1531. The image processing circuit (1) 1531 does not delete the register write command and input the relevant command as it is to the next image processing circuit (2) 1534 via the interconnect 1530. The register write command is ignored by the circuits subsequent to the image processing circuit (2) 1534 since the circuit identification information "ip_id" is different, and the register write command is finally ignored and deleted by the image output unit 1523. Next, a register control command including information "rw=0, ip_id=2, address=0*4, data=0*0" is described. The register control command is referred to as a register read command for convenience sake since the command performs a read operation. As with the above-described register write command, the register read command is ignored except for the image processing circuit (2) 1534 of which circuit identification information is "ip_id=2". The register read command is valid in the image processing circuit (2) 1534 which includes the same circuit identification information "ip_id". A register value in an address of "address=0*4" is read out, and the "data" area of the register read command is replaced with the read value. Then, the register read command is transmitted to the following image processing circuit via the interconnect 1530. In the image output unit 1523, unlike in the case of the above-described register write command, only "data" is extracted, or the register read command itself is output (stored) in a memory area to which the CPU 102 can access.

The data obtainment command 542 is a command for controlling operations of the image input unit 1521 and the image output unit 1523. The image input unit 1521 receives the data obtainment command and obtains digital image data and correction data from the main memory by starting the DMAC (Read) 194 according to a register value set in advance by the above-described register control command. A register value set to the DMAC in advance includes, for example, a readout start address and the number of readout times set by the register control command. Next, the image input unit 1521 transmits the data obtainment command to the image processing circuit (1) 1531, the image processing circuit (2) 1534 to the image processing circuit (P) 1537, and the image output unit 1523 via the interconnect 1530. As described above, the data obtainment command is transmitted to the downstream, and accordingly, for example, when operations of register control and below-described data processing are switched in a time division manner, switching control can be easily realized. The image input unit 1521 converts the digital image data and the correction data obtained using the DMAC 194 into a format of the data processing command 544. Subsequently, the image input unit 1521 transmits the data processing command 544 to the image processing circuit (1) 1531, the image processing circuit (2) 1534 to the image processing circuit (P) 1537, and the image output unit 1523.

The image output unit 1523 receives the data obtainment command, extracts information from an RGB area of a subsequent data processing command, and performs predetermined packing and conversion to data in a unit of 32 bytes. Subsequently, the image output unit 1523 starts the DMAC (Write) 196 according to a register value set in advance by the register control command to write the processed digital image data in a unit of 32 bytes to the RAM 106.

The data processing command 544 is a command for executing the image processing using the image processing circuit (1) 1531 and the image processing circuit (2) 1534 to the image processing circuit (P) 1537. In the image processing circuit (1) 1531 and the image processing circuit (2) 1534 to the image processing circuit (P) 1537, predetermined register values are set in advance by the above-described register write command before executing the image processing. The data processing command 544 includes 8-bit data processing identification information "step". The data processing identification information "step" for identifying the data processing command to be processed is set in the image processing circuit (1) 1531 and the image processing circuit (2) 1534 to the image processing circuit (P) 1537. Each image processing circuit performs the image processing only on the input data processing command of which the data processing identification information "step" is the same as the data processing identification information of its own and ignores other data processing commands. Each image processing circuit extracts image data in each 16-bit RGB area in the data processing command, performs the predetermined image processing, stores a processing result in each 16-bit RGB area in the data processing command, and transmits the processing result to the subsequent image processing circuit via an internal bus. Each of the image processing circuit (1) 1531 and the image processing circuit (2) 1534 to the image processing circuit (P) 1537 performs a series of the image processing, so that parallel processing is performed in a pipeline manner. The end command 546 is a command indicating an end of the display list, and the image output unit 1523 receives the end command and then outputs an end interrupt to the CPU 102.

Next, a relationship between operations of the image processing unit 150 and the command list (the display list) is described in further detail below with reference to FIG. 1B and FIGS. 8A, 8B, and 8C. The read image (digital image data) read by the above-described image reading unit 120 and the correction data are stored in the RAM 106 as described in FIGS. 4A and 4B. First, the CPU 102 creates the command list (the display list) as illustrated in FIG. 8A in order to perform the image processing on the digital image data stored in the RAM 106. Then, the CPU 102 writes the created command list (the display list) in the display list storage area DPL (2) in the RAM 106 illustrated in FIG. 5A. Next, the CPU 102 sets the top address DPL_STR_ADDR of the command list (the display list) and a continuous transfer amount DPL_DMA_LENGTH via a dedicated bus 221 for controlling the image processing unit 150 in FIG. 2A. Further, the CPU 102 writes "0*1" to a register (Kick register) for starting a readout operation of the command list (the display list) via the dedicated bus 221. Subsequently, the CPU 102 is released until the end interrupt of the image processing is input from the image output unit 1523.

The image input unit 1521 performs setting and starting of the DMAC (Read) 194 and thus obtains the command list (the display list) by the direct memory access. More specifically, the image input unit 1521 uses the DMAC 194 to read out the command list (the display list) of continuous DPL_DMA_LENGTH (for example, 512 bytes) regarding the address DPL_STR_ADDR of the RAM 106 as the top address. Upon receiving the input from the DMAC 194, the image input unit 1521 once stores the read out command list (the display list) in the intermediate buffer 232 in the intermediate buffer control unit 1522 of the image input output unit 152. The image input unit 1521 retrieves and analyzes the command one by one from the top of the command list (the display list) stored in the intermediate buffer 232. When the retrieved command is the register control command and the circuit identification information "ip_id" is "0", the image input unit 1521 processes the relevant register control command and then transmits the processed command to the subsequent image processing circuit. When the retrieved command is the register control command and the circuit identification information "ip_id" is not "0", the image input unit 1521 transmits the relevant register control command to the subsequent image processing circuit without performing any processing thereon. In the subsequent image processing circuit (1) 1531 to image processing circuit (P) 1537, processing (register write and register read) corresponding to the register control command is performed according to the circuit identification information "ip_id". After the image output unit 1523 performs the similar register setting processing, only the read out register value described in the register read command is written into the RAM 106 using the DMAC (Write) 196.

Command list (display list) examples 550, 552, and 554 in FIG. 8A are the register write commands (rw=1). In other words, the register write commands for setting register values of the image input unit 1521, the image processing circuit (1) 1531 to the image processing circuit (P) 1537, and the image output unit 1523 when performing the image processing are described in the beginning of the command list (the display list). When the desired register settings are completed by the register write command in the all circuits, the data obtainment command 556 is obtained by the image input unit 1521. When the analyzed command is data obtainment command, the image input unit 1521 transmits the relevant command as it is to the subsequent image processing circuit (1) 1531. In this regard, the image input unit 1521 saves the address of the intermediate buffer 232 in which the data obtainment command 556 is stored in an internal temporary register and suspends the display list analysis. Further, the image input unit 1521 performs setting and starting of the DMAC (Read) 194 according to the previously set register value and obtains the image data by the direct memory access. In other words, the DMAC 194 reads out the digital image data from the top address S0_IMG_STR_ADDR of the RAM 106 for a predetermined continuous number and a predetermined repeat count, which are described below.

Figure 8A:
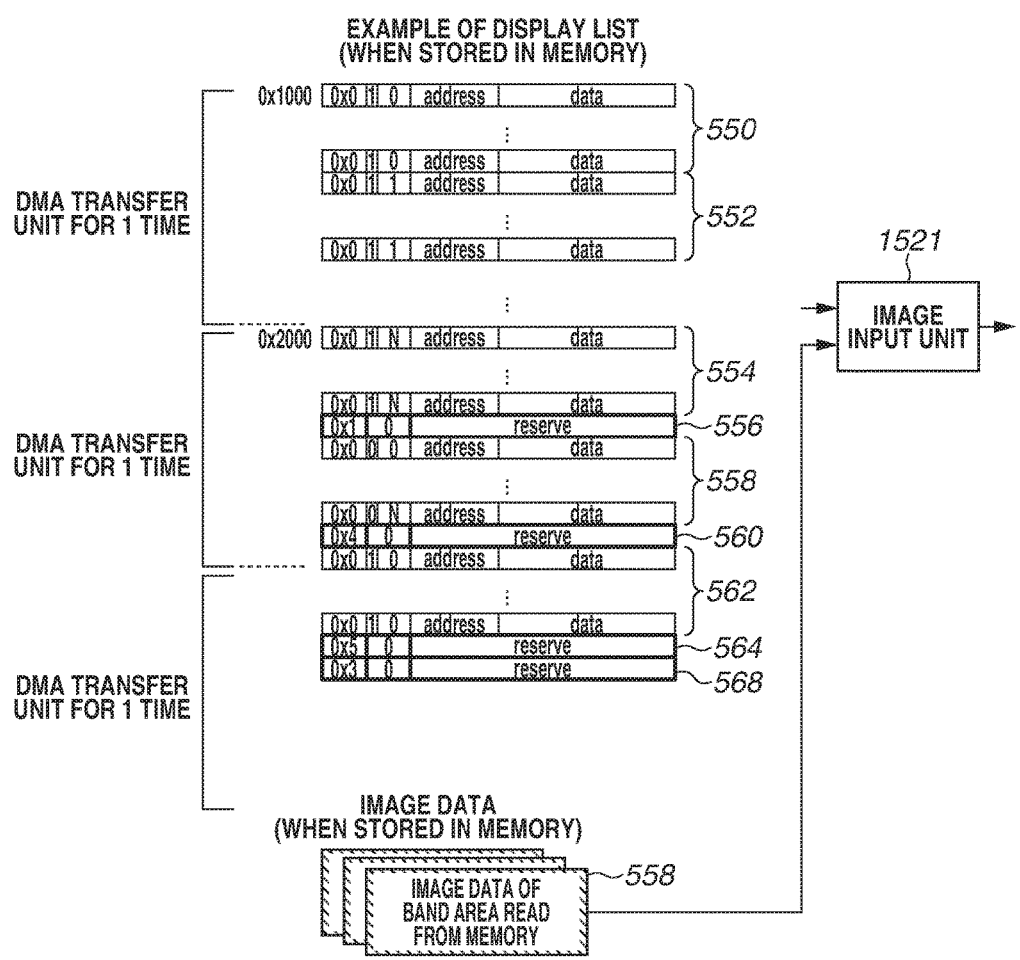
FIG. 8A illustrates an example of a command list (a display list) and image data.
Figure 8B:
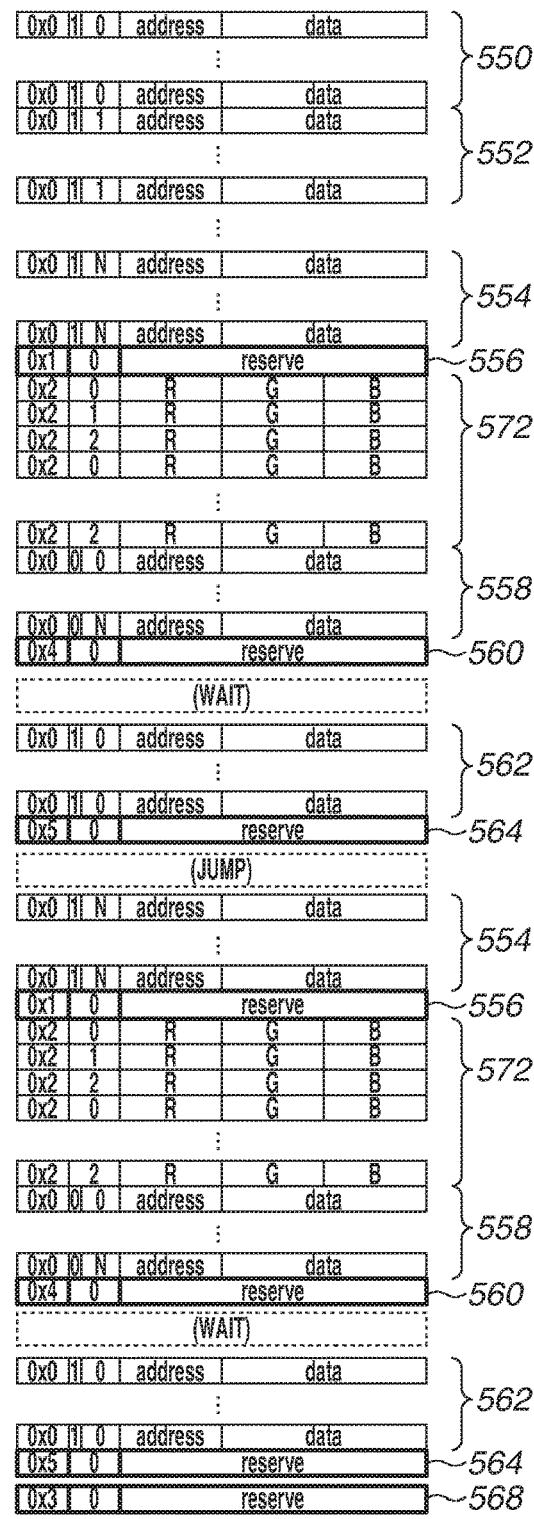
FIG. 8B illustrates an example of a command input to the image processing execution unit.

Upon receiving the input from the DMAC (Read) 194, the image input unit 1521 temporarily stores the read out digital image data in the intermediate buffer 232 of the image input output unit 152. Then, the image input unit 1521 retrieves the digital image data stored in the intermediate buffer 232 for a predetermined pixel number from the top, converts the retrieved data into a command format of the data processing command 544, and transmits to the subsequent image processing circuit. From a comparison of FIG. 8A when the command list (the display list) is input to the image input unit 1521 and FIG. 8B which is a command example output from the image input unit 1521, the following can be understood. In FIG. 8B, the data processing command 572 is inserted after the data obtainment command 556, and these commands are obtained by converting the digital image data 558 read out from the memory into the commands. In FIG. 8B, step=0, 1, and 2 are each information for distinguishing data types such as image data and reference (correction) data. Further, step=M of the data processing command 572 indicates a different type data command unrelated to the image processing to be performed, and a numerical value other than 0, 1, and 2 is used as M.

The subsequent image processing circuit (1) 1531 to the image processing circuit (P) 1537 perform the image processing according to the previously set register value, change the R, G, and B data pieces, and output the data to the image output unit 1523. The image output unit 1523 extracts the R, G, and B data pieces from the data processing command and performs packing in a predetermined format. When packing is completed, the image output unit 1523 performs register setting and starting of the DMAC (Write) 196 according to the previously set register value. Accordingly, the digital image data 598 (FIG. 8C) after the image processing is written into the RAM 106 by the DMAC 196.

As described above, various necessary data pieces can be obtained from the RAM 106 by the image input unit 1521 using the data obtainment command in the command list (the display list) as a trigger without intervention of the CPU 102. Further, the data is processed by the image processing circuit, and a processing result is written to the RAM 106 by the image output unit 1523. In FIGS. 8A and 8B, the DMAC (Read) and the DMAC (Write) are each started once for one data obtainment command for simplifying the description, however, the disclosure is not limited to this case. For example, a pixel number of the digital image data to be obtained at one time can be set to a smaller value by the register settings of the image input unit 1521 and the image output unit 1523. According to the setting, the DMACs 194 and 196 can be started for a plurality of times with respect to one data obtainment command and perform the data processing by dividing the digital image data in a small amount. In such a case, there is an advantage that buffer capacities of the image input unit 1521 and the image output unit 1523 can be reduced which is described in detail below.

Figure 8C:
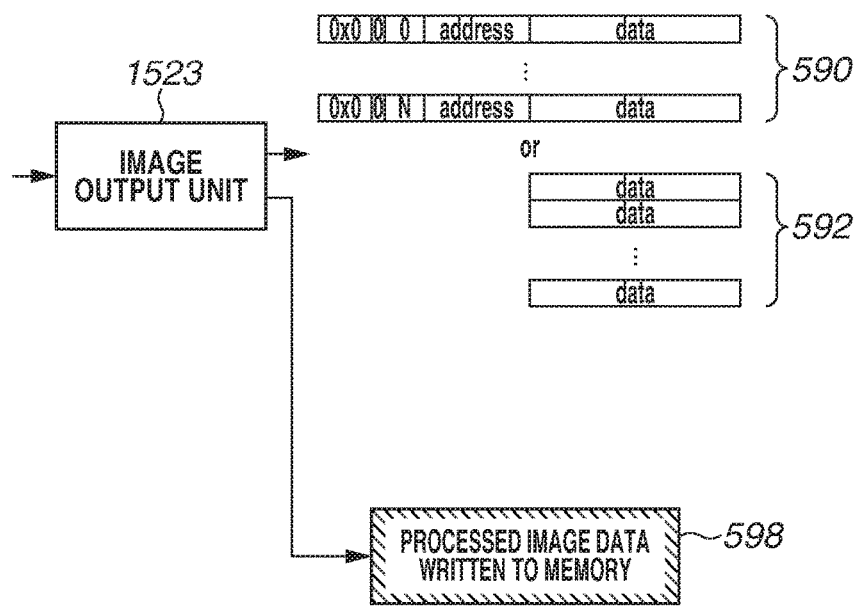
FIG. 8C illustrates an example of data retrieved from an image output unit.

When obtainment of various data pieces with respect to the data obtainment command is completed, suspended display list analysis is restarted. In the display list example in FIG. 8A, the data obtainment command 556 is followed by the register read command 558. These commands are used for reading out Status values of the image processing circuits (1) 1531 to (P) 1537 after the image processing. Regarding the register read command, the image output unit 1523 may save the register read command 590 in the format as it is in the RAM 106 or may save data 592 in a format in which only the read out register value is extracted in the RAM 106 (FIG. 8C). The CPU 102 can understand an operation state of the image processing unit 150 by referring to these data pieces in the RAM 106.

An end command is at the end of the display list example in FIG. 8A, and the image input unit 1521 transmits the end command to the subsequent image processing circuit. Each image processing circuit also transmits the end command to the subsequent circuit, and when receiving the end command, the image output unit 1523 notifies the CPU 102 of the end interrupt of the image processing. Upon receiving the end interrupt, the CPU 102 terminates the present processing. After performing the above-described series of autonomous operations according to the command list (the display list), the image processing unit 150 waits until it is started by the CPU 102 again.

When the data obtainment command is inserted for a plurality of times into one display list, it is needless to say that the image processing with respect to a plurality of band areas can be realized by repeating operations of the above-described data obtainment commands for the number of inserted times. In other words, in the usage of the simultaneous two-sided scanning, the data obtainment command is inserted for each of the front and rear surfaces. Further, in the register control command before or after the data obtainment command, a register value corresponding to the image processing on the front surface or the rear surface may be set.

In the above example, the data obtainment command for supplying data of the image processing is described. The method can be applied to register setting of a table constituted of a static random access memory (SRAM) of the image processing circuit and the like, and a table setting can be accelerated. For example, a register obtainment command is newly defined, and when the image input output unit 152 decodes the register obtainment command, a table value (table data) in an image data format is read out from the global buffer as in the case of the data obtainment command. Then, the image input output unit 152 generates a register command for each table value based on the circuit identification information "ip_id", "rw", and a register (not illustrated) indicating the top address of table of the image processing circuit. The image input output unit 152 transmits the generated register command for the number of the obtained table data pieces to the image processing execution unit 153 to perform table setting in the image processing circuit. The similar handling can be applied not only to the register write command but also to the register read command. For example, the table value is read out from the SRAM of the image processing circuit using the generated register read command, and the image input output unit 152 receives and converts the register read command into a table value (table data) in the image data format. Further, the image input output unit 152 can write the table data into the global buffer by synchronizing with the register obtainment command as in the case of the data obtainment command. The CPU 102 can refer the written register read value and the table value from the global buffer.

Input and Output of Image Data

Input and output processing of the image data from the RAM 106 to the image input output unit 152 or from the image input output unit 152 to the RAM 106 according to the present exemplary embodiment is described in detail below with reference to FIG. 2A. The image processing apparatus according to the present exemplary embodiment extracts the band area 301 (Bdl wide*Bdh high) from single image data 300 as illustrated in in FIG. 2A 2001 and 2002 and stores the extracted band area as input image data in the RAM 106. The input image data of the band area has the 32-byte unit data structure as illustrated in a portion 210 in FIG. 2A 2003 so as to be easily handled in the RAM 106 as described in FIG. 4A.

In FIG. 2A, the DMAC 194 is started by the above-described data obtainment command. Accordingly, the DMAC 194 reads out the input image data 210 of the band area from the RAM 106 via the shared bus 190 illustrated in FIG. 1A and inputs the read data to the image processing unit 150. The input image data 210 is segmented into M pieces of pixel areas (small areas) from an area (1) 211 to an area (M) 219 in a unit of processing of 32 bytes in width*Bdh_in in height according to the above-described data structure. Further, the DMAC 194 sequentially reads out the input image data pieces of the M pieces of the small areas from the small area (1) 211 to the small area (M) 219 and inputs the read data pieces to the image processing unit 150. The image processing unit 150 receives the input image data pieces of the small areas and performs the image processing in units of the small area. In this regard, read processing may be performed for each small area in the band or all pixel areas in the band may be read out at once according to a size of the unit of processing unit the image processing unit 150 as illustrated in FIG. 2A 2004.

DMA information for issuing an instruction to the DMAC 194 includes items of, for example, "top address of a read out destination", "continuous read amount (how many times data in a unit of 32 bytes is continuously read)", "increment address", and "repeat count". For example, in the case of the image data of the dot sequential system illustrated in FIG. 4A, a content of each item included in an instruction signal is as follows.

"top address": S5_IMG_STR_ADDR
"continuous read out amount": one time (32 bytes)
"increment address": a data amount of one line=32 bytes*M
"repeat count": a height of a band area=Bdh_in times Regarding the instruction signal, first, 32-byte data, namely a first line of the small area (1) 211 is read out from the top address S5_IMG_STR_ADDR. Then, the address is increased by 32 bytes*M for obtaining next data, and thus reading out of data pieces in the first lines of the small areas (2) to (M) are skipped, and 32-byte data in the second line of the small area (1) 211 is read. Then, data pieces are read out repeat count Bdh_in times, in other words, data pieces for Bdh_in lines in the small area (1) 211 are read out, so that all data pieces in the small area (1) 211 are read. When the input image data pieces in the small area (2) to the small area (M) are read out, the DMAC 194 is started by sequentially shifting the "top address" by 32 bytes. As described above, the image processing apparatus according to the present exemplary embodiment, the input image data in the desired small area is read out from the RAM 106 by the DMA transfer.

The image input unit 1521 of the image input output unit 152 receives the input image data from the DMAC 194 and transfers the received data to the intermediate buffer control unit 1522. The intermediate buffer control unit 1522 includes an intermediate buffer arbitration circuit 230 and the intermediate buffer 232 as illustrated in FIG. 2A 2005. The intermediate buffer 232 includes an input area 234 for storing the input image data and an output area 236 for storing output image data described below. The CPU 102 respectively sets top addresses of an input area and an output area of the intermediate buffer 232 as an input area top address and an output area top address in advance. The input image data input from the image input unit 1521 is first input to the intermediate buffer arbitration circuit 230.

The intermediate buffer arbitration circuit 230 temporarily stored the received input image data in the input area 234 of the intermediate buffer 232. Generally, the intermediate buffer 232 is realized by a storage device such as an SRAM. For example, when a bit length per word in the intermediate buffer 232 is 256 bits (32 bytes) length, the number of words to be stored in the input area 234 corresponds to the height of the band area which is the repeat count of the DMA transfer, Bdh_in words. Further, when a bit length per word in the intermediate buffer 232 is 64 bits (8 bytes) length, four words are required to receive 32-byte length data. Accordingly, in this case, the number of words to be stored in the input area 234 is obtained by multiplying the height of the band area (the repeat count of the DMA transfer) Bdh_in by four. In other words, the capacity of the input area 234 is an amount in which the input image data of the small area (the unit of processing) as a unit of a single DMA transfer can be stored. When the DMA transfer and/or transfer of the input image data of one band area is completed, the DMAC 194 may notify the CPU 102 of that fact using an interrupt signal 222.

Subsequently, the image input unit 1521 reads out the temporarily stored input image data of the small area via the intermediate buffer arbitration circuit 230, sequentially generates an input pixel value 155 one pixel each, and inputs the generated input pixel value to the image processing execution unit 153. The image input unit 1521 and the image output unit 1523 may be asynchronously operated, and, for example, a small area (1) 251 of the output image data may be generated and output using parts of the small area (1) 211 and the small area (2) of the input image data. The image input unit 1521 and the image output unit 1523 in FIG. 2B may be respectively provided with pointer management units 1542 and 1544 which are characteristic features of the present exemplary embodiment, and operations thereof are described below.

The image processing execution unit 153 performs the image processing on a pixel area including one or more input pixels. As specific image processing, for example, the image processing execution unit 153 multiplies a pixel area including a plurality of pixels by a predetermined weight coefficient, adds values of all pixel areas, and thus obtain one output pixel. Further, the image processing execution unit 153 proceeds the processing while sliding the pixel area in the height direction of the band area, outputs the pixel value for one line in the height direction, and then executes processing for outputting a pixel in the next line. The processed pixel value is output one pixel each to the image output unit 1523 of the image input output unit 152.

The image output unit 1523 generates output image data from the processed output pixel value 156 and stores the output image data in a unit of 32 bytes in the output area 236 of the intermediate buffer 232 via the intermediate buffer arbitration circuit 230. The data structure of the generated output image data is that of the dot sequential system without change as illustrated in FIG. 4A, however, the format may be changed in the output image data 250 as illustrated in FIG. 2A 2006. The image processing execution unit 153 executes various types of image processing in which a size of the input pixel area and a size of the output pixel area are different with each other, so that the number of pixels are different in the input image data 210 and the output image data 250. Therefore, a height and a width of the output band area of the output image data 250 are Bdh_out in height and 8*N in width which are different from those of the input image data 210. As described above, the input image data 210 and the output image data 250 are different in the height of the band area, and thus a capacity of the small area as a unit of processing is different with each other. In addition, the width of the band area is also different, and the number of the small areas also changes from M pieces to N pieces.

As described above, the input image data 210 and the output image data 250 are different in the height of the band area and the number of the small areas but are in the same data structure, so that a capacity of the output area 236 of the intermediate buffer 232 can be set similarly to the capacity of the input area 234. For example, when a bit length per word in the intermediate buffer 232 is 256 bits (32 bytes) length, the number of words to be stored in the output area 236 is Bdh_out words which is the same as the height of the output band. Further, when a bit length per word in the intermediate buffer 232 is 64 bits (8 bytes) length, the number of words to be stored in the output area 236 is obtained by multiplying the height of the preceding output band Bdh_out by four.

When, for example, Bdh_out pieces of pixels are input for four lines, and the output image data pieces of the small area (1) 251 are gathered in the output area 236 of the intermediate buffer 232, the image output unit 1523 stops reception of the output pixel value 156 from the image processing execution unit 153. Then, the image output unit 1523 sequentially reads out the output image data in the output area 236 and transmits the read data to the DMAC 196. The DMAC 196 writes the processed image data to the RAM 106 according to an instruction signal 225 from the CPU 102. The similar operations are sequentially executed from the small area (2) to the small area (N), and all of the output image data pieces in the output band area illustrated in FIG. 2A 2007 are written back to the RAM 106.

Synchronization Command

The data processing apparatus according to the present exemplary embodiment includes a synchronization control command (the wait command 548 and the Jump command 550) illustrated in FIG. 5B so as to be able to set a control point (a synchronization point) to a position appropriate for the image processing data flow. Operations of the synchronization control command are described below with reference to FIGS. 7A, 7B-1, and 7B-2.

The synchronization control command may be inserted into an arbitrary position at which control (synchronization) is intended to be performed in the above-described command list. For example, in the above-described command list (the display list) example in FIG. 8A, the wait command 560 is inserted. Basically, an insertion position of the command is not necessarily to be placed on the end of the unit of DMA transfer for one operation. The position is referred to a control point (a synchronization point) of the image processing data flow. The control point (the synchronization point) is determined based on a processing content of the image processing.

In step S701, as described above, the synchronization control command in the command list is decoded by the image input unit 1521 similarly to the other commands and then transmitted from the image input unit 1521 to the image processing execution unit 153. In step S710, when the image input unit 1521 decodes the synchronization control command and determines as the synchronization control command (YES in step S710), in step S715, the image input unit 1521 suspends readout and transmission of the command list. The image input unit 1521 is brought into a suspended (stall) state, and in step S718, notifies a synchronization unit 158 in FIG. 1B of the decode of the synchronization control command. In step S740, the image input unit 1521 waits in the suspended (stall) state, and readout of a command at a position next to the synchronization control command in the command list from the intermediate buffer 232 and transmission to the image processing execution unit 153 are stopped. In step S705, the synchronization control command initializes a pipeline of the image processing in a process of passing through the image processing circuit of the image processing execution unit 153. The synchronization control command may execute specific processing other than the initialization, for example, setting of a special value to a specific register, reading out of a status value, and the like, in the process of passing through the image processing circuit. Subsequently, in step S731, the synchronization control command is received from the image processing execution unit 153 to the image output unit 1523. According to the operations described above, the command being processed in the pipeline of the image processing execution unit 153 reaches the image output unit 1523, and a series of the image processing is completed. The image processing execution unit 153 is in a state in which a command does not exist therein and the image processing is not executed. This operation is referred to as an internal synchronization function or a barrier synchronization function of the image processing execution unit 153 according to the present exemplary embodiment. The image processing execution unit 153 is in the initialization state that is a state capable of operating without any difficulty if an image processing task of the image processing unit 150 is switched and a data control flow and an operation are changed. In step S708, the image output unit 1523 receives and decodes the synchronization control command, and, in step S730, when determining as the synchronization control command (YES in step S730), in step S738, the image output unit 1523 notifies the synchronization unit 158 of arrival of the synchronization control command at the image output unit 1523. In step S742, as with the above-described image input unit 1521, the image output unit 1523 waits in the suspended (stall) state.

The image input output unit of the image processing unit according to the present exemplary embodiment has a configuration in which the input unit and the output unit are integrated and thus can easily realize the barrier synchronization function at a high speed.

External Synchronization Function

In step S780, the synchronization unit 158 determines to notify the CPU, the video input unit (a camera), an image reading unit (a scanner), the video display apparatus (the display), and a print device (a printer) which are synchronization destinations of an synchronization interrupt, and, in step S781, notifies the synchronization destination of the synchronization interrupt.

In step S750, the synchronization unit 158 receives external synchronization from the synchronization destination. For example, when the CPU 102 is the synchronization destination, in step S752, the external synchronization is notified in such a manner that a predetermined value is written in a synchronization register 1582 of the image processing unit 150 via a register interface (I/F) 159 in FIG. 1B. Further, in the case of the other synchronization destinations, in step S752, the external synchronization is notified by writing a predetermined value in the synchronization register 1582 of the image processing unit 150 using the external synchronization signal 1301 and/or a synchronization signal 1201.

In step S755, the synchronization unit 158 determines whether the synchronization register 1582 becomes a predetermined value and the external synchronization is notified. When the external synchronization is not notified (NO in step S755), in step S750, reception of the external synchronization is continued.

When the external synchronization is notified (YES in step S755), in steps S760 and S762, the synchronization unit 158 instructs the image input unit 1521 and the image output unit 1523 to release the wait. Then, in step S770, the image input unit 1521 restarts transmission of the command in step S701. Further, in step S772, the image output unit 1523 restarts reception of the command in step S708. The synchronization unit 158 issues an instruction to release the wait and then initializes the synchronization register 1582.

In the above description, a case is described in which the external synchronization is notified in step S752 after the reception of the external synchronization in step S750. If the external synchronization is notified in step S752 before the reception of the external synchronization in step S750, the synchronization unit 158 executes writing of the predetermined value to the synchronization register 1582. When the processing is shifted to the reception of the external synchronization in step S750, then in steps S760 and S762, the synchronization unit 158 immediately executes release of the wait.

Effect of Present Exemplary Embodiment

As described above, the method according to the present exemplary embodiment has no need to start the DMA transfer for synchronization unlike the technique described in Japanese Patent Application Laid-Open No. 2011-101093. Further, when synchronization is completed, the image processing can be immediately restarted. More specifically, the stall of the pipeline of the image input output unit 152 is released, and readout and transmission of the command already stored in the intermediate buffer 232 can be immediately restarted.

<Modification>

The intermediate buffer 232 according to the present exemplary embodiment can be extended to a storage unit with a two-bank configuration. For example, as illustrated in FIG. 2A, the intermediate buffer control unit 1522 is configured in the two-bank configuration including a storage area A and a storage area B. Such a two-bank configuration enables the intermediate buffer control unit 1522 to store up to two small areas (the unit of processing) at a time. Further, the storage areas are switched to one another according to an operation state (a bank change). As described above, when the intermediate buffer control unit 1522 has a one-bank configuration, a readout (LOAD) operation of input image data and a transmission (SEND) operation for generating a pixel value from the input image data are performed in the time division manner. Further, a reception (RECV) operation for generating output image data from an output pixel value and a writing (STORE) operation of the output image data are also performed in the time division manner. According to the present exemplary embodiment, the intermediate buffer control unit 1522 has the two-bank configuration, and thus the input image data of the next small area (the unit of processing) can be received while the pixel value is generated from the input image data. Further, while the output image data is generated from the output pixel value, the generated output image data can be output. Therefore, processing in the DMAC 194 and in a transmission unit 1541 can be parallelized, and processing in the DMAC 196 and in a reception unit 1543 can be parallelized. In other words, the "readout (LOAD) operation" and the "transmission (SEND) operation" can be performed at the same time, and the "writing (STORE) operation" and the "reception (RECV) operation" can be performed at the same time. As described above, the intermediate buffer 232 includes a plurality of banks, and thus processing can be accelerated.

Jump Function

According to a second exemplary embodiment, a Jump function is described which is used for switching among a plurality of command lists (display lists). The above-described synchronization control command includes a Jump command 550 for realizing the Jump function. The Jump command 550 may be inserted into an arbitrary position at which control (synchronization) is intended to be performed in the command list as with the case of the above-described wait command. For example, in the above-described command list (the display list) example in FIG. 8A, a Jump command 564 is inserted. Basically, an insertion position of the command is also not necessarily to be placed on the end of the unit of DMA transfer for one operation as with the wait command.

Operations are described below with reference to FIGS. 8A and 8B. For example, by using the Jump function, the command list can be shifted from the insertion position of the Jump command in the DPL (2) to the top of the DPL (3) in FIG. 5A. However, in the following descriptions, the Jump function from an insertion position 564 of the Jump command in the DPL (2) to a predetermined address "0x2000" in the DPL (2) is described for simplifying the description.

In a synchronization register 1582 of the synchronization unit 158 in the image input output unit 152, a Jump destination address and a number of Jump times can be specified. For example, the CPU 102 may directly set the Jump destination address and the number of Jump times in advance based on the image processing data flow via the register I/F 159. Further, a value of the synchronization register 1582 may be rewritten before the Jump command using the register write command in the command list. In the example in FIGS. 8A and 8B, the Jump destination address is set to 0x2000, and the number of Jump times is set to once. First, the image input unit 1521 outputs commands 550 to 562 in FIG. 8B in response to commands 550 to 562 in FIG. 8A. When decoding the Jump command 564, the image input unit 1521 stops the pipeline as with the case of the above-described wait command and the image input unit 1521 shifts to the wait state. Then, an operation of the above-described internal synchronization function (the barrier synchronization function) is started. The image input unit 1521 also notifies the synchronization unit 158 of decode of the Jump command. The Jump command passes through the image processing execution unit 153, and the image output unit 1523 decodes the Jump command 564 and then notifies the synchronization unit 158 of decode of the Jump command.

When receiving the decode notifications of the Jump command from the image input unit 1521 and the image output unit 1523, the synchronization unit 158 determines whether to execute a Jump operation or not. More specifically, the synchronization unit 158 refers to the number of Jump times in the preceding synchronization register 1582, and permits execution of the Jump operation when the number of Jump times is a positive number and cancels the Jump operation when the number of Jump times is "0".

When the Jump operation is canceled, the synchronization unit 158 notifies the image input unit 1521 and the image output unit 1523 of the cancel. In the case of the cancel, the image input unit 1521 releases the wait and restarts the processing of a command next to the Jump command temporarily stored in the intermediate buffer 232. The image output unit 1523 also releases the wait and restarts the processing.

When the Jump operation is executed, the synchronization unit 158 notifies the image input unit 1521 and the image output unit 1523 of the execution. When the number of Jump times in the synchronization register 1582 is a positive value, the synchronization unit 158 decrements (−1) the value.

The image output unit 1523 writes back the command received and temporarily stored in the intermediate buffer 232 up until then to a predetermined address in the RAM 106. For example, when the temporarily stored command stores read data by the register read command, the relevant command must be written back without fail. On the other hand, when the temporarily stored command is not the read command, it is not necessarily for the temporarily stored command to be written back to the RAM 106. The above-described operation is referred to as "flash of the output command".

When the "flash operation of the output command" is completed, the image input unit 1521 initializes a program counter (a transmission counter), and the image output unit 1523 initializes a program counter (a reception counter). Subsequently, a start address of the command list (the display list) is changed to 0x2000 of the Jump destination address in the synchronization register 1582, and readout of the command list (the display list) is started. A command (a command which is not necessary to be written back to the RAM 106) temporarily stored in the intermediate buffer 232 before the Jump operation is overwritten and discarded by the readout.

After the Jump operation is performed by the Jump command 564 in FIG. 8A, the command processing is restarted from 0x2000 in FIG. 8A, and the processing of the commands 554 to 562 are executed again. Thus, in FIG. 8B, the commands 554 to 562 in FIG. 8A are expanded twice.

The Jump command 564 in FIG. 8A is decoded again by the image input unit 1521, and the operation of the above-described Jump command is performed again. However, the number of Jump times in the synchronization register 1582 is decremented (−1) from "1" to "0" by the previous Jump operation, and the number of Jump times is "0", so that the Jump operation is canceled. Then, the end command 568 in FIG. 8A is decoded, and the image processing is completed after asserting the end interrupt.

In the above-described example, the data obtainment command 556 and the wait command 560 in FIG. 8A are expanded twice in FIG. 8B by using the Jump function, and thus the band processing can be realized twice.

<Modification>

Figure 6A:
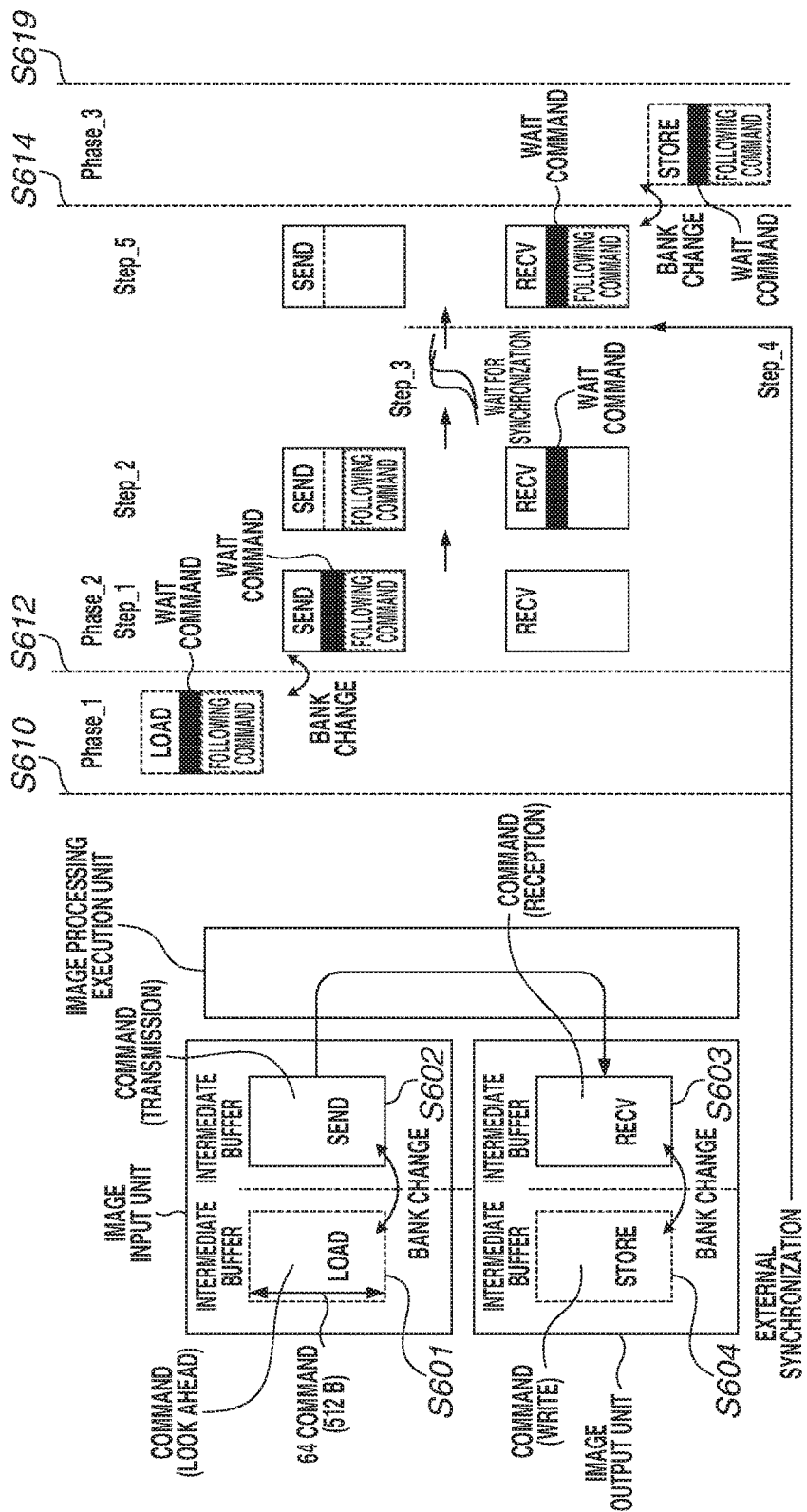
FIG. 6A illustrates a synchronization operation of a wait command.

An additional explanation regarding behavior of the intermediate buffer 232 is provided with reference to FIGS. 6A and 6B. FIGS. 6A and 6B illustrate the behavior when the above-described intermediate buffer 232 has the two-bank configuration. In the above-description, it is described that the read data is subjected to "flash of the output command", however, in the following description, a command other than the read data is also subjected to "flash of the output command" so as to provide a clear description of difference therebetween.

In the case of the wait command 548, a command at a position following to the wait command, namely a "following command" is written down (STORE) by the image output unit at a Phase_3 (time S614) in FIG. 6A after the release of the wait and written in the RAM 106 at time S619.

On the other hand, in the Jump command 550, whether to write down a command at a position following to the Jump command, namely a "following command" or not is changed according to presence or absence of the Jump operation. FIG. 6B illustrates operations of the command list in FIG. 8A. Time S620 to time S626 in FIG. 6B show the behavior of the intermediate buffer 232 in response to execution of the first Jump operation. Time S626 to time S629 show the behavior of the intermediate buffer 232 in response to cancellation of the second Jump operation. In the execution of the first Jump operation, a reading destination of the command is changed after the Jump operation, and thus the "following command" is not processed. More specifically, as in Step_2 of time S622, the "following command" is not transmitted (SEND). In addition, at the time point when the Jump command 550 is received (RECV), the intermediate buffer 232 performs the bank change, and the command is written back to the RAM 106 in Phase_3 of time S624.

In the cancellation of the second Jump operation, the processing is the same as that of the execution of the Jump operation until reception (RECV) of the Jump command 550, however, then the "following command" is also processed and received (RECV). After reception (RECV) of the "following command", the bank change is performed and the command including the "following command" is written back to the RAM 106 in Phase_6 of time S629.

Effect of Present Exemplary Embodiment

As described above, according to the method of the present exemplary embodiment, for example, readout of the image data by the external device such as the scanner and the image processing unit 150 can be operated in conjunction with each other for each band by using the synchronization command (the wait command 548 and the Jump command 550). In other words, after the readout of the image data, the image processing unit 150 executes the image processing for one band and waits for a response from the external device using the wait command 548. When the readout of the next image data is completed, the external device asserts the external synchronization signal 1201 and releases the wait of the image processing unit 150. The image processing unit 150 restarts the image processing from a necessary start point on the command list by the Jump command 550. Further, the image processing unit 150 executes the image processing by next data obtainment command 542 and waits for the response from the external device by the wait command 548. The CPU 102 can execute the band processing for the necessary times in conjunction with the external device by just specifying the short command list (the display list) in FIG. 8A and the number of Jump times in the synchronization register 1582. The start of the image processing unit 150 by the CPU 102 is only once. The image processing unit 150 performs autonomous operations including meeting with the external device, and thus the control load on the CPU 102 is reduced.

"Flash Operation of Output Command" Before External Synchronization

Figure 9A:
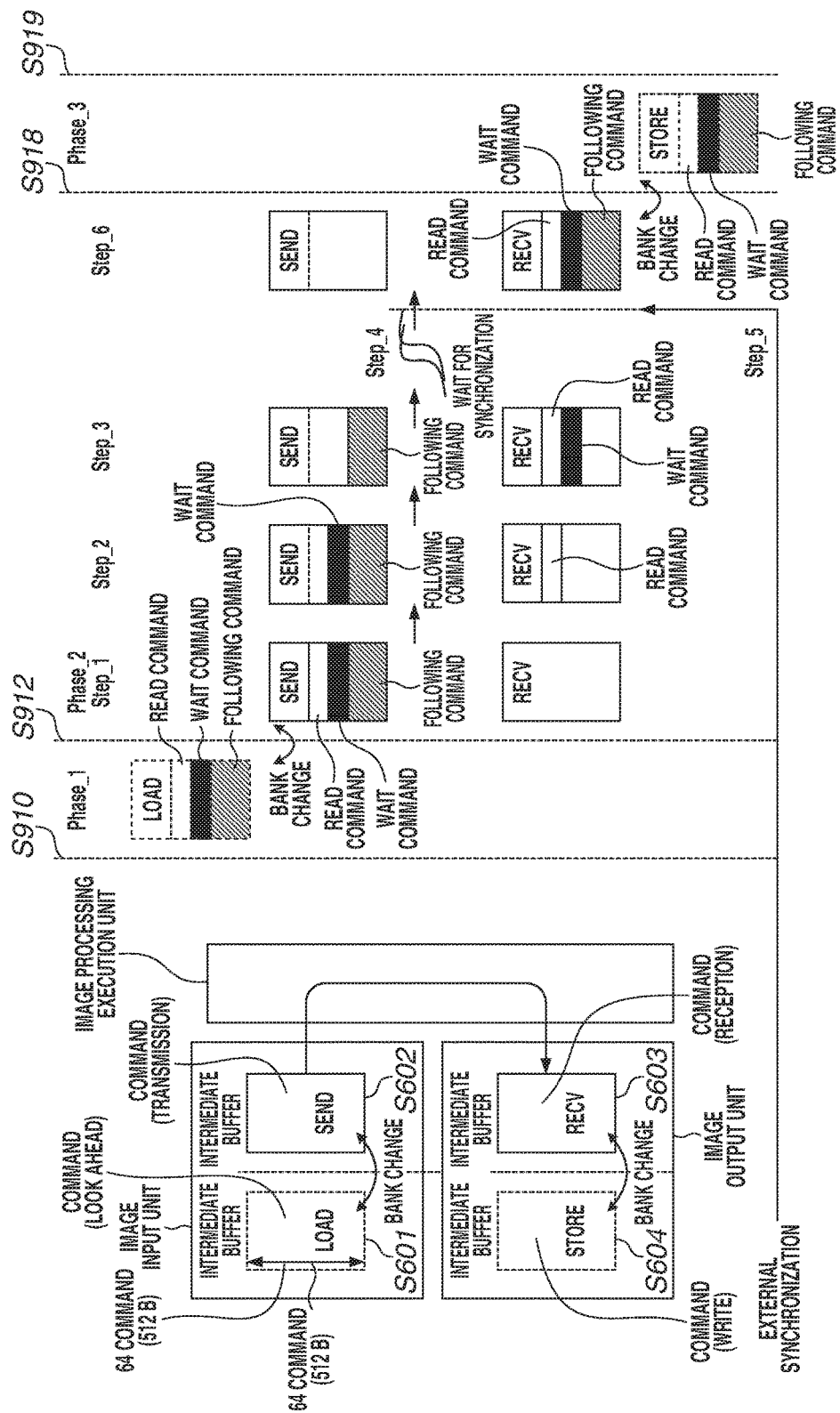
FIG. 9A illustrates an issue in a read command and a wait command.

A method according to a third exemplary embodiment for reading out a register value of the image processing unit 150 using the register read command during the external synchronization using the wait command 548 is described with reference to FIGS. 9A and 9B. The method is especially effective in the external synchronization with the CPU 102. In the example in FIG. 9A, the register read command is inserted before the wait command in the command list. For example, a command 558 in the command list in FIG. 8A is the register read command. FIGS. 9A and 9B illustrate the behavior when the above-described intermediate buffer 232 has the two-bank configuration.

As described above, the intermediate buffer 232 has the two-bank configuration and thus can operate look-ahead (LOAD) and transmission (SEND) in parallel, and write-down (STORE) and reception (RECV), however, it takes time to write back the processed command in the RAM 106. When the image output unit 1523 decodes the wait command 548 in Step_3 of time S912 in FIG. 9A, the register read command is already stored in the intermediate buffer 232. However, since the wait command 548 waits for the external synchronization (Step_4), the bank change of the intermediate buffer 232 does not occur. After assertion of the external synchronization (Step_5), the wait is released. After the "following command" is received (RECV) in Step_6, finally the bank change occurs, and the register read command is written back in time S918. Therefore, data corresponding to the register read command is stored in the RAM 106 of time S919. In other words, the CPU 102 cannot read out the data corresponding to the register read command before the wait command 548 during the external synchronization.

In order to cope with the above-described issue, a no operation (NOP) command is inserted between the register read command and the wait command 548 for the number of buffers. Further, before the external synchronization operation by the wait command 548, data corresponding to the register read command is flashed at the RAM 106. In the example according to the present exemplary embodiment, the intermediate buffer 232 has the two-bank configuration, and thus, the NOP commands are inserted for two banks as illustrated in FIG. 9B. As can be seen from the LOAD operation in Phase_1 to Phase_3, the NOP commands are inserted between the register read commands and the wait commands. In fact, the purpose is to change the intermediate buffer before the external synchronization operation, it does not have to be the NOP command, and the register write command for register setting may be used. As described above, the NOP command is inserted in response to the number of buffer frames such as double-buffer, triple-buffer, and quad-buffer. In Step_1 of time S926, the wait command is decoded, and in time S924 before entering an operation for the external synchronization, the register read command is written back to the RAM 106. Thus, the CPU 102 can confirm the read data (a Status value) of the image processing unit 150 which is written back to the RAM 106 during the wait for the external synchronization.

By using the above-described function, first, the CPU 102 synchronizes with the image processing unit 150 at the timing of synchronization and confirms the read data (the Status value) of the image processing unit 150. Further, the CPU 102 determines next control and selects or changes the command list (the display list). Then, the CPU 102 rewrites the synchronization register 1582 via the register I/F 159 and asserts the external synchronization. The image processing unit 150 releases the wait and restarts the processing of the command list (the display list).

As described above, another command (for example, the NOP command) is inserted between the synchronization control command and a preceding command thereof according to a size (a plurality of banks) of the intermediate buffer 232, and accordingly, write-down of the preceding command to the RAM 106 can be secured.

According to the present exemplary embodiment, an output buffer capacity of one bank can be changed by a setting of the intermediate buffer. When the capacity is changed, the number of the above-described NOP commands to be inserted is changed in response to the change of the output buffer capacity. The register read command is described above, however, the same can be applied to reading of the table data using the above-described register obtainment command. In other words, it is only necessary to insert the NOP command between the register obtainment command and the wait command.

Effect of Present Exemplary Embodiment

As described above, according to the method of the present exemplary embodiment, the CPU 102 can monitor the state of the image processing unit 150 at the timing of the synchronization with the wait command 548 and change contents of the image processing while reducing the control load on its own.

Dynamic Clock Stop Operation

Regarding a fourth exemplary embodiment, differences from the above-described exemplary embodiments and FIG. 1B are described with reference to FIG. 1D. With respect to the above-described image processing unit 150 in FIG. 1B, a clock supply circuit 1584 and an asynchronous I/F 1552 and an asynchronous I/F 1562 in the image processing execution unit 153 are added. To the clock supply circuit 1584, a clock of an operating frequency to be reference (referred to as a reference clock) is input from a clock generation unit (not illustrated) of the image processing apparatus. In addition, to the clock supply circuit 1584, clocks of operating frequencies of a ½ cycle, a ¼ cycle, and a ⅛ cycle (referred to as a ½ cycle clock, a ¼ cycle clock, and a ⅛ cycle clock) are also input with respect to the operating frequency of the reference clock. The CPU 102 can control the clock supply circuit 1584 by setting a value to a control register (not illustrated) regarding the clock supply circuit 1584 via a register I/F 159. For example, the CPU 102 can select a clock to be output from the clock supply circuit 1584 to the image input output unit 152 and the image processing execution unit 153 from the reference clock, the ½ cycle clock, the ¼ cycle clock, the ⅛ cycle clock, and the like. Further, the CPU 102 can stop any of clocks to be output from the clock supply circuit 1584 to the image input output unit 152 and the image processing execution unit 153.

Since the asynchronous I/F is inserted between the image input output unit 152 and the image processing execution unit 153, communication can be basically performed if clocks of the both units are switched to an arbitrary frequency ratio. The operation is described below using an example of the frequency ratio, such as the reference clock, the ½ cycle clock, the ¼ cycle clock, and the ⅛ cycle clock.

As described above, the data processing apparatus according to an embodiment can set a control point (a synchronization point) to a position appropriate for the image processing data flow and can control the image processing data flow based on the control point (the synchronization point). According to the present exemplary embodiment, an operation for temporarily stopping a clock supply to the image processing execution unit at the control point (the synchronization point) is described with reference to FIG. 7B (including FIGS. 7B-1 and 7B-2).

A basic operation is similar to the operation according to the first exemplary embodiment described with reference to FIG. 7A, and an operation according to the present exemplary embodiment is described below. In step S7710, when the image input unit 1521 decodes the synchronization control command and determines as the synchronization control command (YES in step S7710), in step S7715, the image input unit 1521 suspends readout and transmission of the command list. The image input unit 1521 is brought into a suspended (stall) state, and in step S7718, notifies the synchronization unit 158 in FIG. 1D of the decode of the synchronization control command. In step S7740, the image input unit 1521 waits in the suspended (stall) state, and readout of a command at a position next to the synchronization control command in the command list from the intermediate buffer 232 and transmission to the image processing execution unit 153 are stopped. In step S7705, the synchronization control command initializes a pipeline of the image processing in a process of passing through the image processing circuit of the image processing execution unit 153. Subsequently, in step S7731, the synchronization control command is received from the image processing execution unit 153 to the image output unit 1523. According to the operations described above, the command being processed in the pipeline of the image processing execution unit 153 reaches the image output unit 1523, and a series of the image processing is completed. The image processing execution unit 153 is in a state in which a command does not exist therein and the image processing is not executed. In step S7708, the image output unit 1523 receives and decodes the synchronization control command, and, in step S7730, when determining as the synchronization control command (YES in step S7730), in step S7738, the image output unit 1523 notifies the synchronization unit 158 of arrival of the synchronization control command at the image output unit 1523. In step S7742, as with the above-described image input unit 1521, the image output unit 1523 waits in the suspended (stall) state.

In step S7780, the synchronization unit 158 determines to notify the CPU, the video input unit (a camera), an image reading unit (a scanner), the video display apparatus (the display), and a print device (a printer) which are synchronization destinations of an synchronization interrupt, and, in step S7781, notifies the synchronization destination of the synchronization interrupt. Next, in step S7782, the synchronization unit 158 performs clock control based on a register (not illustrated) for the clock control. More specifically, in step S7783, the synchronization unit 158 notifies the clock supply circuit 1584 of a clock operation mode set in advance by a clock control signal 1585.

The clock supply circuit 1584 performs dynamic clock control according to the clock operation mode.

Figure 13A:
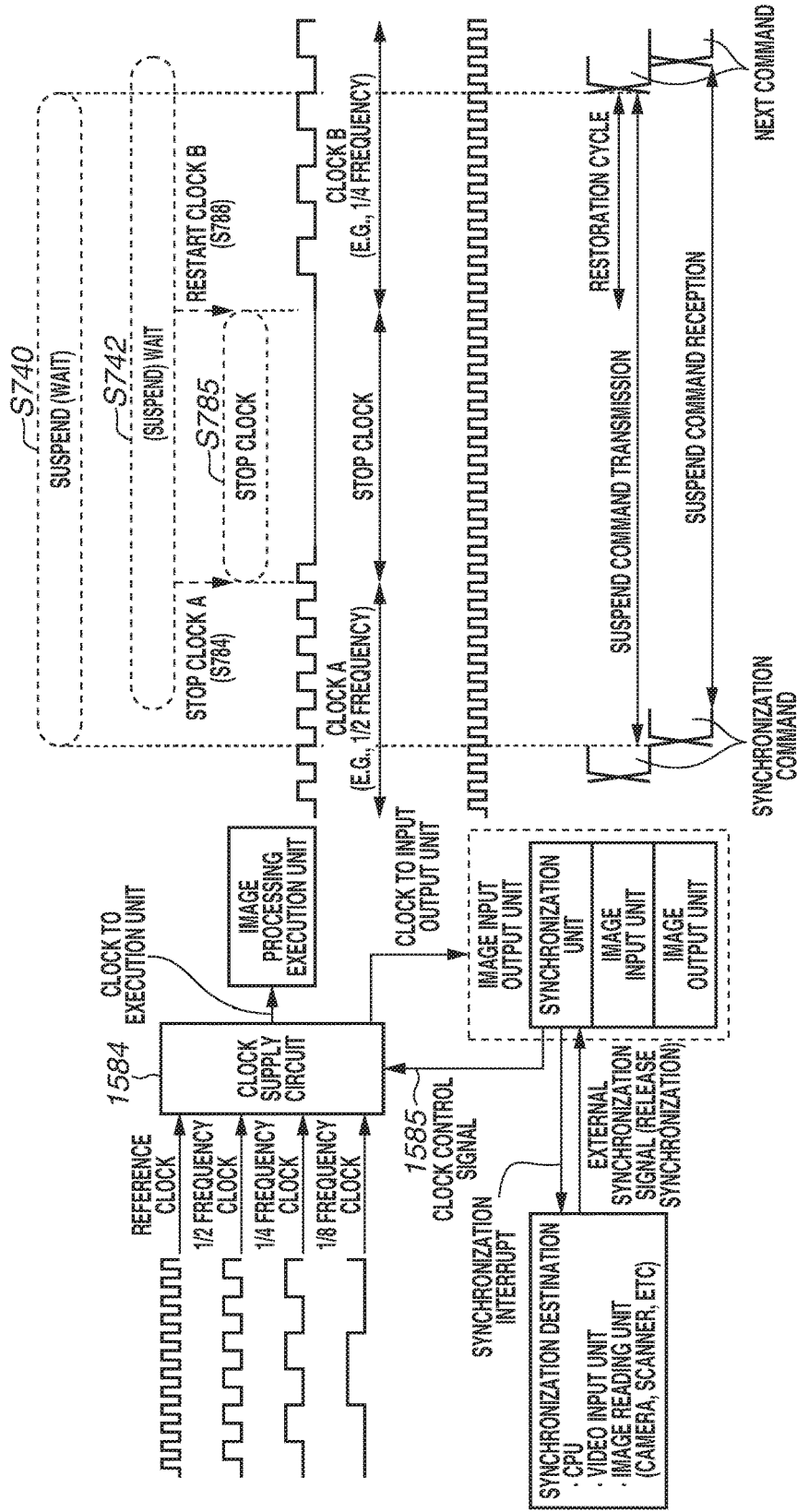
FIG. 13A illustrates an example of dynamic clock stop and switching of the data processing apparatus.

The specific dynamic clock control is described below with reference to FIG. 13A. First, to the clock supply circuit 1584, clocks of various frequencies as described above are input. The clock supply circuit 1584 can select and stop a clock to be input to the image processing execution unit 153 according to the clock operation mode of the clock control signal 1585. In this regard, an exemplary embodiment may be adopted in which only the reference clock is input to the clock supply circuit 1584, and the clock supply circuit 1584 generates clocks of ½ frequency, ¼ frequency, and ⅛ frequency by frequency dividing to select or stop the clock.

After input and output of the synchronization command to and from the image processing execution unit 153, in step S7784, the clock supply circuit 1584 stops a clock A. As illustrated in FIG. 13A, an effective clock is input to the image input output unit, and the image input output unit is operated, whereas the clock A to be input to the image processing execution unit is stopped, and the image processing execution unit 153 is not operated.

Then, the external synchronization in step S7752 is notified (assertion of the external synchronization signal and change in a value of the synchronization register) from the external synchronization destination, and in step S7750, the synchronization unit 158 receives the external synchronization. In step S7755, the synchronization unit 158 determines an instruction of the external synchronization, and when it is determined as the external synchronization (YES in step S7755), in step S7786, the synchronization unit 158 performs the clock control for restarting the clock supply. In step S7787, the synchronization unit 158 switches the clock operation mode of the clock control signal 1585 and notifies the clock supply circuit 1584 of that fact.

In step S7788, the clock supply circuit 1584 selects a clock (referred to as a clock B) of the operating frequency to be restarted next from the clock operation mode and restarts the clock supply to the image processing execution unit 153. As illustrated in FIG. 13A, the clock B to be input to the image processing execution unit is restarted, and thus the image processing execution unit 153 starts operation. In this regard, assuming a case in which the restarted clock B is unstable, the synchronization unit 158 can be provided with a restoration cycle register (not illustrated) and preliminarily delay the release of the wait after the restart of the clock supply. In step S7790, the synchronization unit 158 subtracts a value of the restoration cycle register from every cycle. In step S7792, when the value of the restoration cycle register becomes zero (0), the synchronization unit 158 determines that a time period corresponding the restoration cycle has elapsed and the clock becomes stable (YES in step S7792). Then, in steps S7760 and S7762, the synchronization unit 158 instructs the image input unit 1521 and the image output unit 1523 to release the wait. Then, in step S7770, the image input unit 1521 restarts transmission of the command in step S7701. Further, in step S7772, the image output unit 1523 restarts reception of the command in step S7708. The synchronization unit 158 issues an instruction to release the wait and then initializes the synchronization register 1582, the restoration cycle register, and the like.

According to the above-described dynamic clock control, for example, the image input output unit 152 selects an operating frequency of a clock used when starting the image processing unit 150. On the other hand, the image processing execution unit 153 can select an appropriate operating frequency in each case according to the processing content of the image processing at a break of the control point (the synchronization point) in the image processing data flow. The clock operation mode to be selected at this point may be specified by a predetermined register (not illustrated), and the clock operation mode may be switched by the synchronization unit 158 according to the register. Further, the clock operation mode to be selected may be defined in an empty bit area in the synchronization command and calculated a value thereof when the image input output unit decodes the command, and then the synchronization unit 158 may switch the clock operation mode.

Effect of Present Exemplary Embodiment

As described above, according to the method of the present exemplary embodiment, the clock supply to the image processing execution unit (the image processing pipeline) can be suspended with respect to a wait for synchronization with the external device which is generated in a period from when the image processing on a certain band area is finished to when the image processing on the next band area is started. For example, the CPU 102 executes various processing tasks in a multi-tasking manner in addition to the control of the image processing unit 150 according to an embodiment. Thus, if the image processing unit 150 issues the interrupt notification of the external synchronization to the CPU 102, an interrupt response to the external synchronization from the CPU 102 may be delayed due to the other processing task. Generally, the CPU 102 receives the interrupt notification of the external synchronization from the image processing unit 150, executes predetermined processing for controlling the image processing unit 150, writes a predetermined value in the synchronization register 1582 as the external synchronization, and asserts the external synchronization. However, when the interrupt response of the CPU 102 is delayed due to the other processing task, a time length to the assertion of the external synchronization is not always constant and varies. Therefore, to reduce needless power consumption by suspending the clock supply to the image processing execution unit (the image processing pipeline) during the wait for synchronization with the CPU 102 contributes to reduction of the power consumption caused by variation and has an effect to suppress the power consumption of the image processing apparatus below a certain value. Variation in the response to the external synchronization by the CPU 102 is caused by a competition operation of software, so that it is difficult to estimate a response time in advance at the time of designing an image processing large-scale integration (LSI). Thus, the method according to the present exemplary embodiment can provide a certain suppressive effect to a difficult issue in guaranteeing power saving quality of the image processing LSI.

Further, in general, the CPU 102 often realizes the dynamic clock supply via the register I/F 159, however, it is needless to say that the CPU 102 cannot cope with variation of a software operation.

In contrast, when the external synchronization destination is a hardware device, such as a camera input and a scanner input, the external synchronization destination can quickly respond to the external synchronization, and a wait time for the external synchronization is very short. When the CPU 102 performs the dynamic clock control with respect to such a short wait time, a synchronization overhead is large because of the above-described competition operation of software and the interrupt response, and speed of the image processing (as a whole) is rather decreased.

The image input output unit according to an embodiment dynamically performs the clock control at the control point (the synchronization point) in the data flow, and accordingly, the power consumption during the wait time on the data flow can be suppressed according to the data flow. Further, the image input output unit according to an embodiment can eliminate the processing load when the CPU 102 performs the dynamic clock control and cope with the variation of the response time of the CPU 102.

Dynamic Clock Switching Operation

According to the above-described fourth exemplary embodiment, the dynamic clock stop and the clock switching after the stop are described. According to a fifth exemplary embodiment, a method for switching a clock during the wait for the external synchronization is described with reference to FIG. 13B.

Figure 1C:
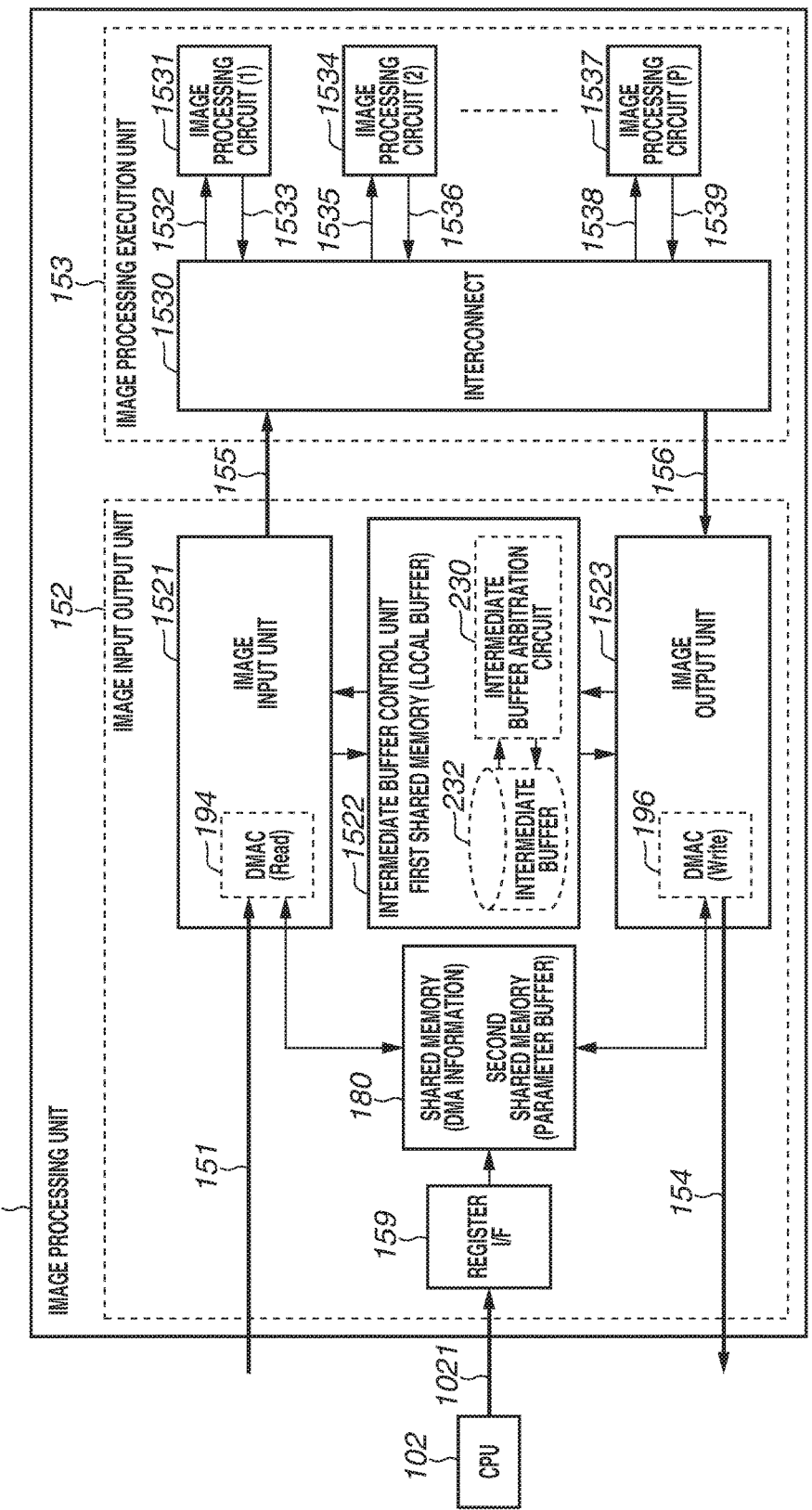
FIG. 1C is a block diagram illustrating the entire configuration of the data processing apparatus and a second configuration example of the image processing unit.
Figures 2, 7B:
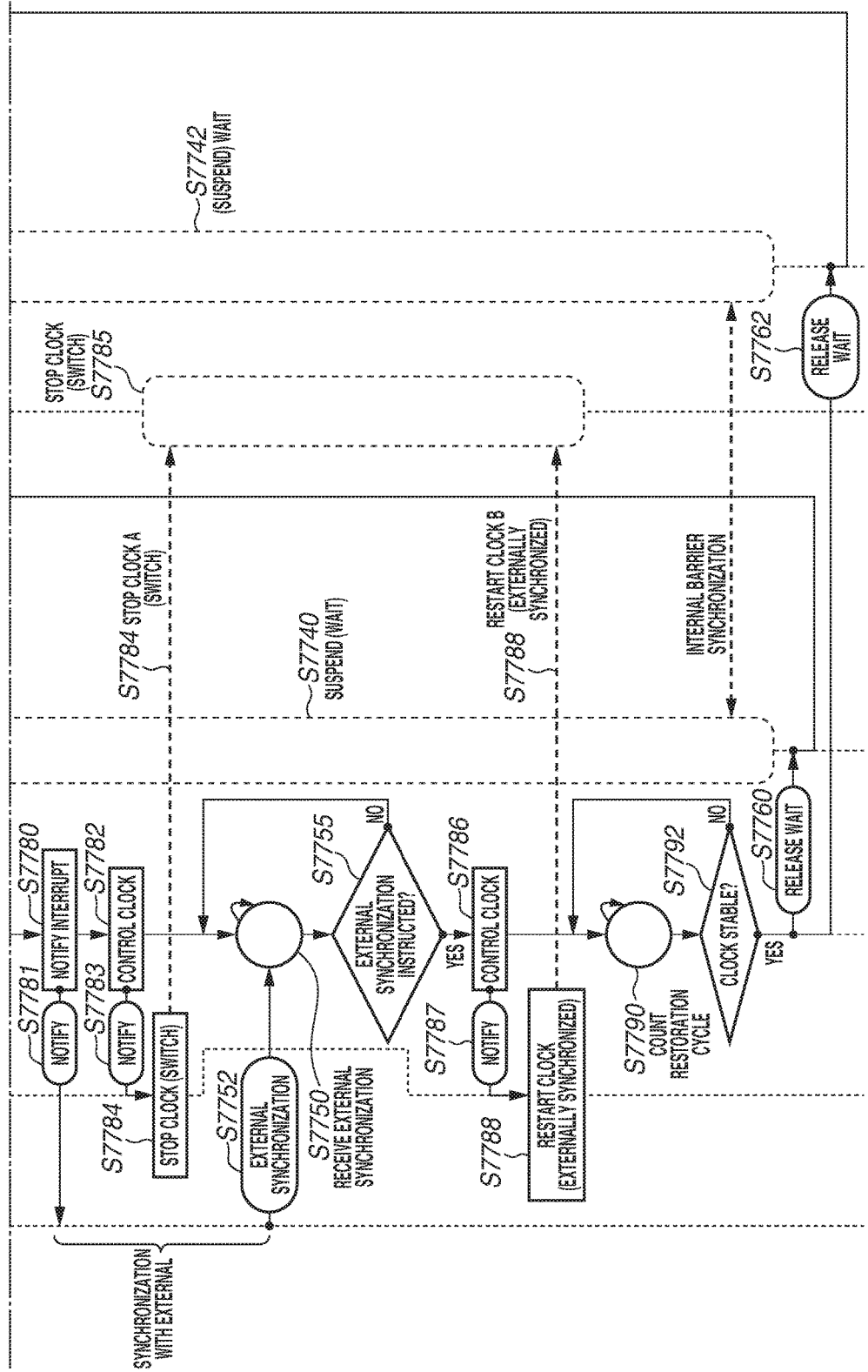
FIG. 7B (including FIGS. 7B-1 and 7B-2) illustrates an example of a clock control sequence of the data processing apparatus.
Figure 13B:
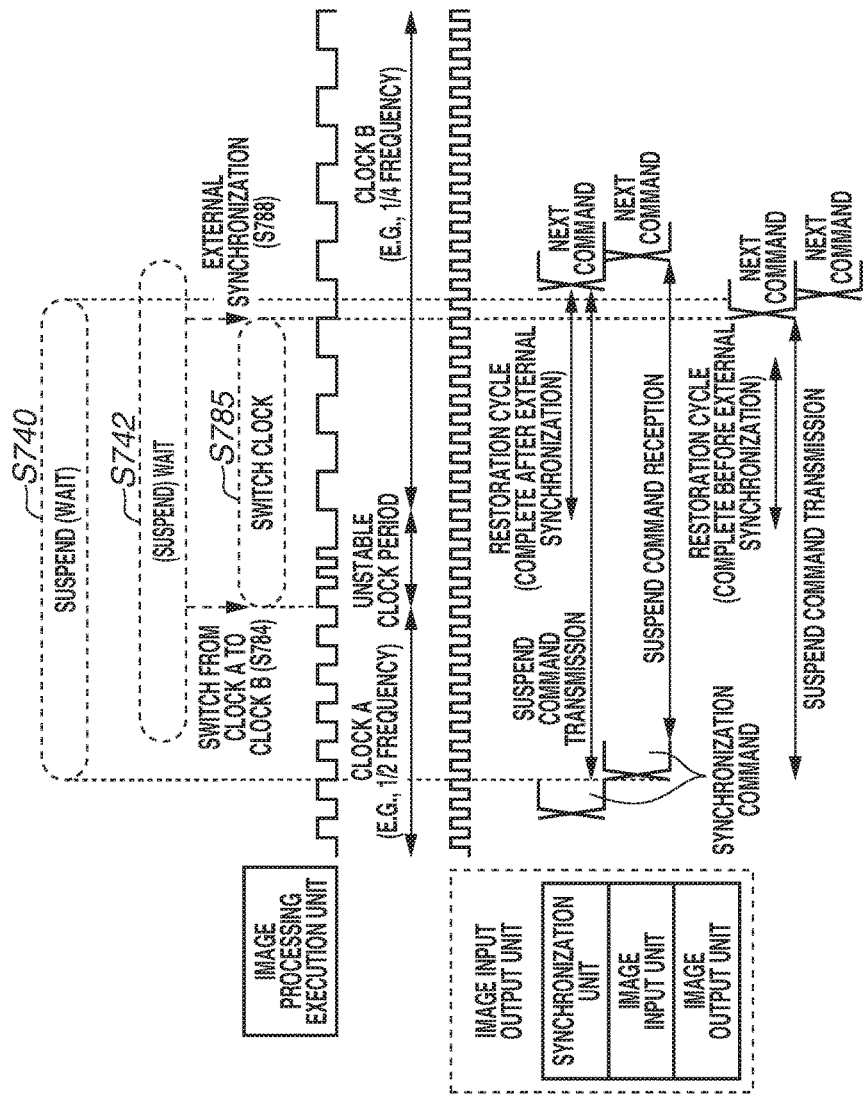
FIG. 13B illustrates an example of dynamic clock switching of the data processing apparatus.

Basic operations of the present exemplary embodiment are basically similar to the operations according to the fourth exemplary embodiment described above with reference to FIG. 7B (including FIGS. 7B-1 and 7B-2). According to the present exemplary embodiment, at a timing when the clock is stopped (in step S784), the synchronization unit 158 changes the clock operation mode and switches the operating frequency of the clock. After input and output of the synchronization command to and from the image processing execution unit 153, in step S784, the clock supply circuit 1584 switches the clock A to the clock B. As illustrated in FIG. 13B, the clock A input to the image processing execution unit is changed to the clock B. When the clock A is switched to the clock B, a clock period in which the frequency is unstable is temporarily generated. However, the input and output of the command to and from the image processing execution unit 153 is suspended, and an effective signal of the command is deasserted, so that no problem is caused. As with the above-described fourth exemplary embodiment, the release of the wait can be delayed after the restart of the clock supply in advance using the restoration cycle register (not illustrated) of the synchronization unit 158. At that time, if the external synchronization in step S752 is already notified from the external synchronization destination in step S750 before completion of the restoration cycle, in steps S760 and S762, the synchronization unit 158 instructs the image input unit 1521 and the image output unit 1523 to release the wait after completion of the restoration cycle. In contrast, if the external synchronization in step S752 is notified in step S750 after completion of the restoration cycle, the restoration cycle is already completed, so that, in steps S760 and S762, the synchronization unit 158 instructs the image input unit 1521 and the image output unit 1523 to release the wait as it is.

In addition, when the external synchronization destination is the CPU 102, the CPU 102 receives the synchronization interrupt notification in step S781 and changes the clock operation mode of the synchronization unit 158 to switch the operating frequency of the clock. Further, if the CPU 102 waits for a period for the clock to be stable and, in step S750, issues the notification of the external synchronization in step S752, the restoration cycle is not necessary. As described above, processing speed of the image processing (as a whole) is likely to be decreased, however, the CPU 102 can perform the dynamic clock control at the control point (the synchronization point) in the image processing data flow.

Effect of Present Exemplary Embodiment

According to the present exemplary embodiment, the image processing execution unit 153 can switch the operating frequency appropriately according to the processing content of the next image processing during the wait for synchronization with the external device at the control point (the synchronization point) in the image processing data flow. Therefore, according to the present exemplary embodiment, an effect for suppressing the power consumption by suspending the clock is less unlike the above-described fourth exemplary embodiment, however, the operating frequency of the clock can be quickly switched using the wait time for synchronization with the external device.

<Modification>

In the above descriptions, the dynamic clock stop operation and the dynamic clock switching operation to the clock in the image processing execution unit 153 performed by the image input output unit 152 are described. As described above, the image processing execution unit 153 includes the interconnect 1530, the image processing circuits (1) 1531 to (P) 1537, and the like. Configuration of these modules are broadly separated into a memory element such as the register and the SRAM set by the register command of the command list (the display list) and a calculation circuit for performing the image processing by the data processing command. The image processing circuit may be constituted of a processor, and a configuration of the processor is also broadly separated into a memory element such as a register array, a work RAM, and a cache and a calculation circuit.

Thus, when whether to stop or not is selected at each of these circuit elements in the above-described dynamic clock control, the power consumption can be further reduced. The image processing apparatus according to an embodiment controls the image processing data flow using the command list (the display list). Further, the image processing apparatus according to an embodiment realizes the image processing in the following processes using the command list (the display list).

A register write (write) process (A) using the register command

An SRAM write (write) process (B) using expansion of the register write command by the register obtainment command and the register write command A data processing process (C) using expansion of the data processing command by the data obtainment command and the data processing command A register read (readout) process (D) using the register read command for reading out the register after the data processing An SRAM read (readout) process (E) using expansion of the register read command by the register obtainment command and the register read command for reading out the data in the SRAM after the data processing For example, the calculation circuit of the image processing circuit is operated only during the data processing, so that the clock is supplied to the calculation circuit of the image processing circuit only in the process (C), and the clock of the calculation circuit is stopped in the other processes.

Further, the clock is only supplied to the SRAM as a target of reading and writing in the process (B) and the process (E), and the clock supply to the other SRAMs is stopped. The clock is supplied to the all SRAMs in the process (C).

Basically, the register command and the register read command can write and read values to and from both of the register and the SRAM in the image processing circuit. In contrast, when an access to the SRAM is limited to a principle that reading and writing must be performed by the process (B) and the process (E), the clock supply to the SRAM can be stopped in the process (A) and the process (D).

The image input output unit 152 exclusively executes the above-described processes expressed by the command list (the display list) and controls the image processing data flow. Therefore, when the image input output unit 152 for controlling start and completion of each process performs required minimum clock supply to each circuit element operating in each process by the detailed clock control as described above, the power consumption reduction can be realized more effectively.

Further, the image input output unit 152 can stop the clock supply to a SRAM bank which is not used among the intermediate buffer constituted of a plurality of SRAM banks therein. Furthermore, when there is no transfer to the DMAC included therein, the image input output unit 152 can stop the clock supply to the DMAC.

Issue of DMA Transfer in a Plurality of Band Processing

The image processing apparatus according to a sixth exemplary embodiment performs the data processing in a unit of band as described above. However, when the data processing is performed on a plurality of bands as described above, the following issue occurs in the DMA transfer. The issue of the DMA transfer which occurs when a plurality of bands is processed is described below using a case when the resolution conversion processing is performed as an example. In this regard, a DMA transfer destination is described below as the global buffer (the RAM 106 and the storage area in the external storage device 108 described above).

First, the image processing apparatus includes various types of image processing including spatial filtering, resolution conversion, trimming processing, end portion extension processing, and IP conversion. Further, the image processing apparatus selects and combines the including processing according to an application and realizes a desired high image quality in the entire apparatus. In the image processing execution unit 153 illustrated in FIG. 1B, these various types of image processing are implemented as the image processing circuit (1) 1531 to the image processing circuit (P-1) 1537. When complicated image processing is realized by the above-described region segmentation (the band processing) method by combining a plurality of these image processing circuits, it is necessary to pay attention to the following points.

When calculation is performed using a processing object pixel in the two-dimensional area as in the case the spatial filtering, it is necessary to input, to the image processing circuit, an image obtained by accumulating peripheral pixels corresponding to a filter diameter with respect to a processed image. Further, if the image processing referring to such two-dimensional area is performed for a plurality of times, it is necessary to accumulate the peripheral pixels and to input an image in a wider range obtained by accumulating all peripheral pixels in each case. The resolution conversion processing is one of such image processing which refers to the two-dimensional area, and in the case of the resolution conversion, a size of an image to be output varies before and after the processing. Further, when the resolution conversion by the band segmentation is performed by setting a band height of an input image constant, a band height of an output image is changed for each band according to the conversion magnification.

Further, when the image processing on front and rear surfaces of a sheet is realized by time division multiplex processing in a single image processing apparatus as in the case of the simultaneous two-sided scanning, it is necessary to perform processing alternately on segmented areas (for example, bands) corresponding to the image data pieces on the front and rear surfaces. In such usage, for a setting value of the above-described DMA function, it is necessary to calculate a setting value of a front area and a setting value of a rear area alternately. Especially, in the usage like the simultaneous two-sided scanning, an installation position of a scanner sensor with respect to a sheet surface is different between the front and rear surfaces of the sheet, and a reading start position of the image processing is different between the front and rear surfaces. Further, when designation of an image reading range is different between the front and rear surfaces of the sheet, the settings are also different. Furthermore, when the image data pieces on the front and rear surfaces are different as the image data of the dot sequential system and the image data of the frame sequential system, the setting values of the DMA function are required to be calculated in different calculation methods.

As described above, an output image of the resolution conversion is subjected to the DMA transfer for each small area and stored in the global buffer, however, settings (a "start address" and a "repeat count") for performing the DMA transfer are not constant for each band depending on the magnification of the resolution conversion. Thus, the setting of the DMA transfer is difficult, and, for example, the start address of the DMA transfer cannot be calculated by simple calculation such as adding a fixed value for every transfer.

Further, when the image processing on the front and rear surfaces of a sheet is performed by time division multiplex processing in a single image processing apparatus as in the case of the simultaneous two-sided scanning, settings of the DMA function corresponding to the front and rear segmented areas (for example, bands) must be calculated for the front and rear surfaces alternately.

In such a case, it is necessary to calculate the setting value of the DMA transfer for each band by firmware and to sequentially set a parameter to the input/output DMAC of the image processing for each band from the firmware. After the setting, the input/output DMAC is started to perform the image processing. Thus, the CPU 102 which operates the firmware is required to regularly perform calculation, setting, and starting of the image processing unit 150 in units of band area and to wait an interrupt of the image processing completion of the image processing unit 150. It depends on a system configuration, however, it is not uncommon to take several milliseconds for the CPU 102 to receive the interrupt of the image processing completion, check an interrupt factor, and return to a next operation. Accordingly, the CPU 102 is in a state in which a certain load is always applied thereto for controlling and synchronizing (meeting) with the image processing unit 150 and is not released during the image processing.

DMA Information Switching Function Corresponding to Command List

The image processing apparatus according to the present exemplary embodiment includes a shared memory 180 in the image input output unit 152 for storing and managing the DMA information as illustrated in FIG. 1B in order to solve the above-described issue in the DMA transfer.

Figure 11B:
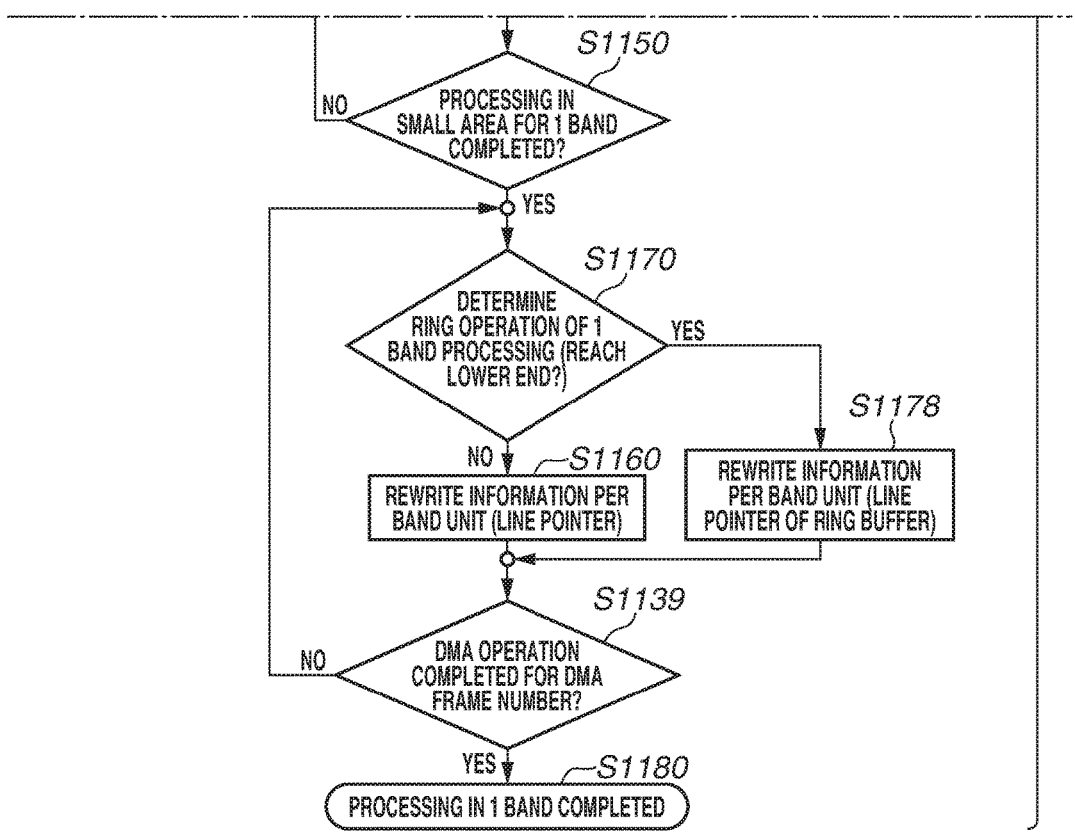
FIG. 11 (including FIGS. 11A and 11B) is a flowchart illustrating an example of a DMA operation when decoding a data obtainment command.

Hereinbelow, storing and managing of the DMA information are described in detail with reference to FIG. 1B, FIG. 11 (including FIGS. 11A and 11B), and FIG. 12 (including FIGS. 12A and 12B). First, in step S901, the CPU 102 performs initial setting of a parameter (the DMA information) used for the DMA transfer in the shared memory 180 of the image input output unit 152 via a register bus 1021 and the register I/F 159. For example, regarding the issue in the above-described simultaneous two-sided scanning, in step S902, the following initial values of the DMA information are set in the shared memory 180 (a second shared memory unit).

the DMA information with respect to the input image data of the front surface the DMA information with respect to the output image data of the front surface the DMA information with respect to the input image data of the rear surface the DMA information with respect to the output image data of the rear surface In the case of the simultaneous two-sided scanning, the above-mentioned four DMA information pieces are used, however, when the image data format is the frame sequential system, the DMA information pieces corresponding to the number of colors are required. Further, when the image processing is performed on the image data pieces of N sheets in a time division multiplexed manner, a total of N*2 pieces of the DMA information is required for input and output. The shared memory 180 may store these DMA information pieces in a DMA table format.

Next, in step S910, the CPU 102 starts the image processing by kicking the image input output unit 152. As described above, the image input output unit 152 obtains (LOAD) the command list (the display list) from the RAM 106 using the DMAC 194 and transmits (SEND) the command list in the command format to the image processing execution unit 153. Subsequently, in steps S920 and S1101, the image input output unit 152 receives (RECV) the processed command from the image processing execution unit 153, returns the processed command to the command list (the display list) by packing, and stores (STORE) the command list (the display list) in the RAM 106.

Figures 12, 12A:
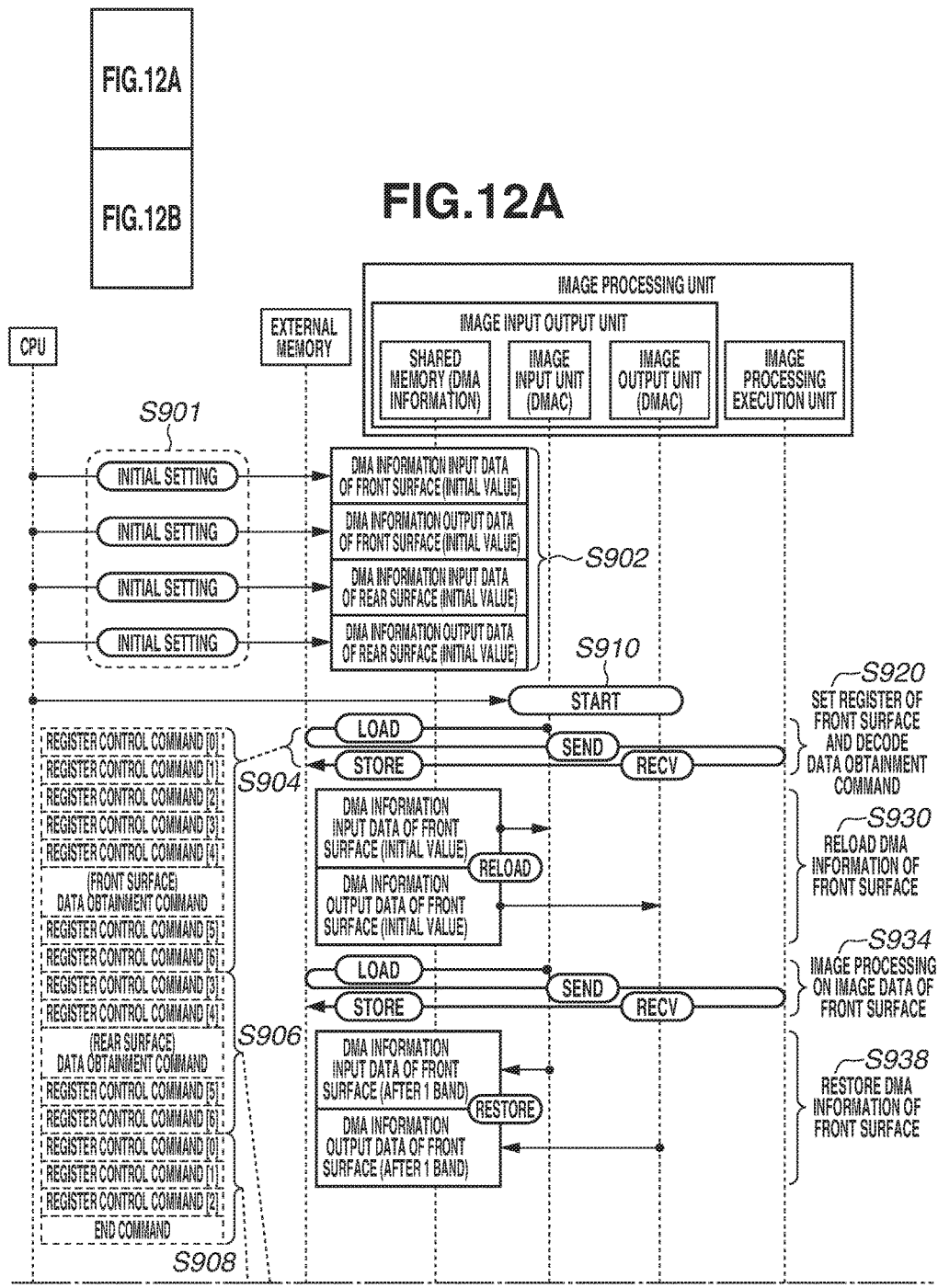
FIG. 12 (including FIGS. 12A and 12B) is a sequence chart illustrating a correspondence relationship between a command and a DMA operation.
Figure 12B:
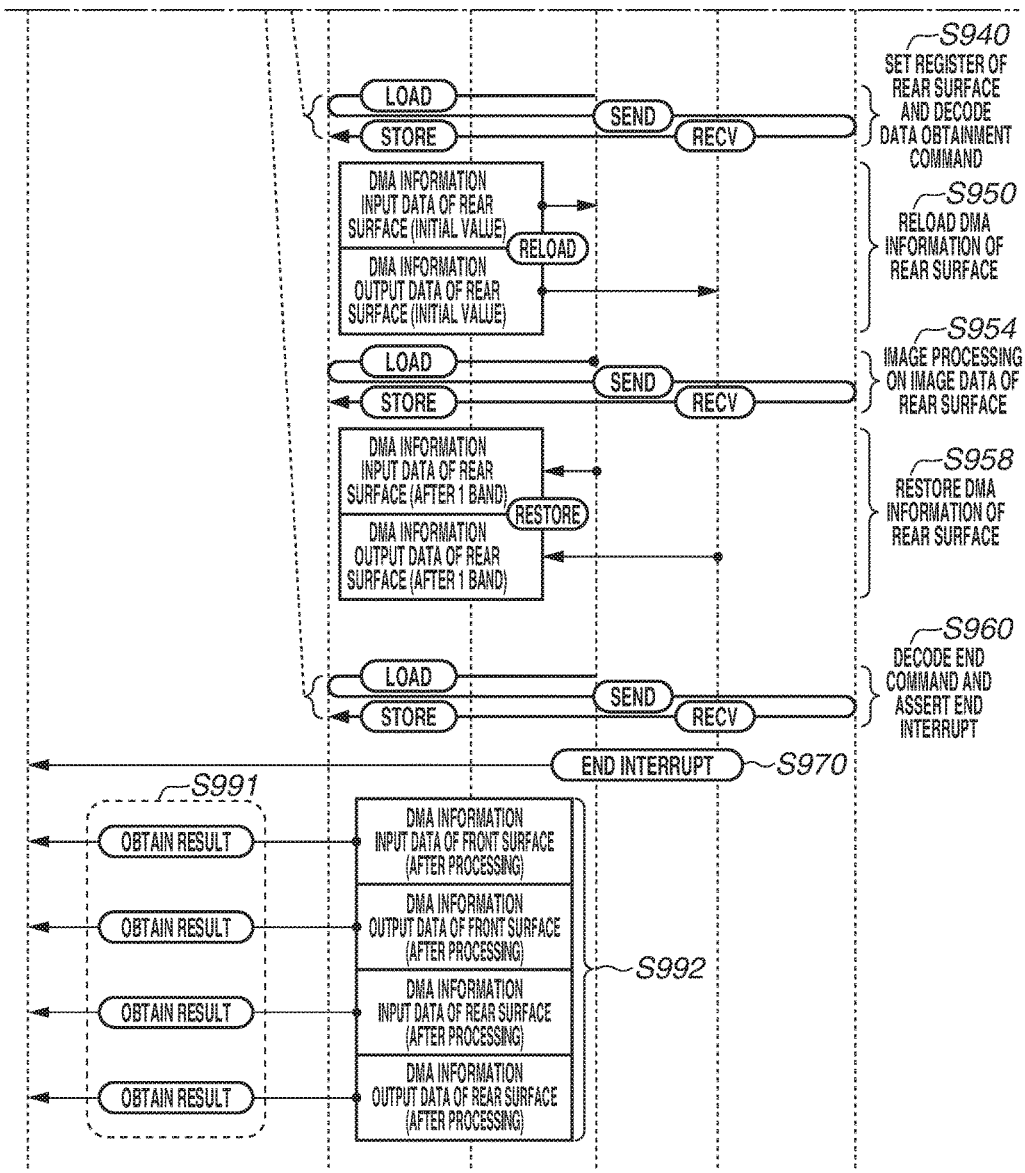

The command list (the display list) in step S904 in FIG. 12A includes commands for processing the image data of the front surfaces. As describe above, the register setting of the image processing on the front surface is performed by the register control commands [0] to [4].

The register setting set by the register control command includes the number of tables Ch of the DMA information and a table number of the shared memory 180 necessary for the image processing, and the table numbers T [0, 1, . . . , Ch−1] are specified for the number of tables Ch therein. For example, the register control commands [3] and [4] correspond to them.

In step S1102, the image input output unit 152 decodes the data obtainment command of the front surface (YES in step S1102). Then, in step S1103, according to the number of tables Ch and the table numbers [0, 1, . . . , Ch−1], in steps S930 and S1104, the image input output unit 152 reloads (RELOAD) the DMA information of the front surface from the shared memory 180.

The DMA information, which is described in detail below, includes a "start address", a "repeat count", a "line pointer", a "continuous read amount", an "increment address", and the like.

In steps S934 and S710, the image input output unit 152 performs the DMA transfer of the image data using the DMA function described below and performs the image processing on the image data of the front surface by the above-described operation.

When the image processing is completed, in steps S938 and S1190, the image input output unit 152 restores (RESTORE) the DMA information after the processing in a predetermined position in the shared memory 180. Especially, the information such as the line pointer described below is required when the image processing is performed on the continuation of the image data of the front surface next time.

When the image processing related to the data obtainment command is completed, processing of the command from the command list (the display list) is restarted as described above. The register control commands [5] and [6] in the command list (the display list) in step S904 are the register read commands of the front surface and read the Status value and the like after the image processing of the front surface, and the CPU 102 uses a result of the image processing on the front surface.

Subsequently, in step S940, the image input output unit 152 processes the command for the image processing on the rear surface described in the command list (the display list) in step S906. The register setting for the image processing on the rear surface is changed using the register control command. Especially, the number of tables Ch and the table numbers T [0, 1, . . . , Ch−1] thereof with respect to the DMA information necessary for the image processing on the rear surface are different from the setting values of the front surface. Thus, these register setting values must be changed without fail. For example, the register control commands [3] and [4] described in the command list (the display list) in step S906 correspond to them in step S1103.

In step S1102, the image input output unit 152 decodes the data obtainment command of the rear surface described in step S906 (YES in step S1102). Then, according to the changed number of tables Ch and the changed table numbers [0, 1, . . . , Ch−1] in step S1103, in step S950, the image input output unit 152 reloads (RELOAD) the DMA information of the rear surface from the shared memory 180.

In steps S954 and S1110, the image input output unit 152 performs the DMA transfer of the image data using the DMA function described below and performs the image processing on the image data of the rear surface by the above-described operation.

When the image processing is completed, in steps S958 and S1190, the image input output unit 152 restores (RESTORE) the DMA information after the processing in a predetermined position in the shared memory 180. Especially, the information such as the line pointer described below is required when the image processing is performed on the continuation of the image data of the rear surface next time.

When the image processing related to the data obtainment command is completed, processing of the command from the command list (the display list) is restarted as described above. The register control commands [5] and [6] in the command list (the display list) in step S906 are the register read commands of the rear surface and read the Status value and the like after the image processing on the rear surface, and the CPU 102 uses a result of the image processing on the rear surface.

Finally, the image input output unit 152 processes remaining commands described in the command list (the display list) in step S908, and in step S960, decodes the end command and completes all processing. Then, in step S970, the image input output unit 152 asserts the end interrupt to the CPU 102.

After receiving the end interrupt, in step S991, the CPU 102 may obtain the DMA information after the processing in the shared memory 180 in step S992 as a result of the image processing via the register bus 1021 and the register I/F 159.

The image processing apparatus according to the present exemplary embodiment adopts the line pointer for managing input/output image data so as to be able to restart the processing on the segmented areas of the front and rear surfaces from the respective continuations by the above-described reload and restoration of the DMA information. The line pointer indicates an upper end line position of the band area. According to the present exemplary embodiment, the DMA function dedicated to the image processing described below is provided by use of the line pointer.

First DMA Function (Automatic Calculation Function of "Start Address")

Figure 10:
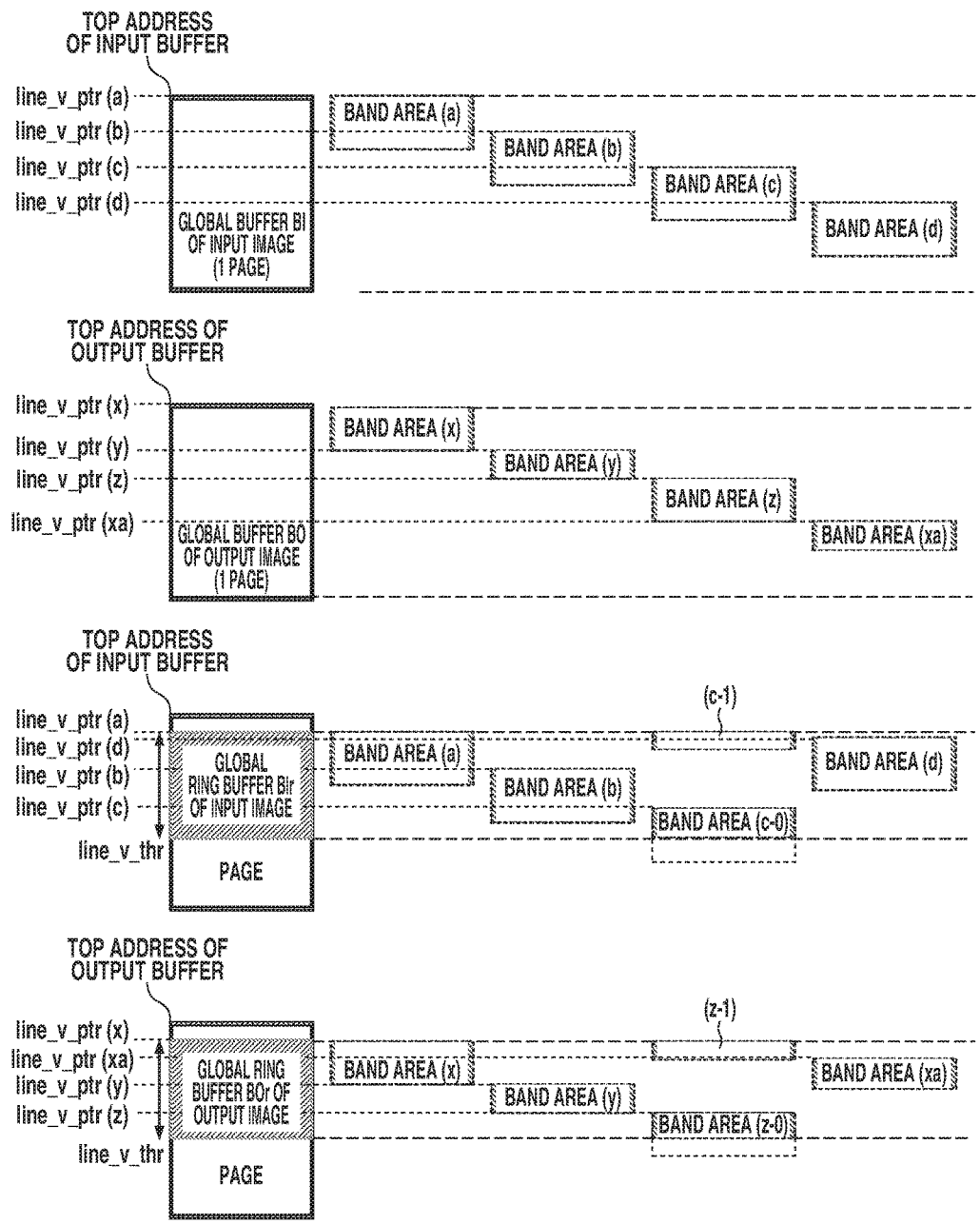
FIG. 10 illustrates line pointer management.

First, as the first DMA function, the present exemplary embodiment includes a function of automatically calculating a "start address" of the DMA transfer using the line pointer. Here, a relationship between the storage area of the image data in the global buffer and the line pointer is described with reference to FIG. 10. FIG. 10 (upper drawing) illustrates a case when the storage area corresponding to image data for one page (one screen) is assigned to the global buffer.

The top address of the storage area is set in advance to store the image data of an upper left of the page. In FIG. 10, an area BI for storing the input image data and an area BO for storing the output image data are separately prepared and secured in the global buffer so as not to overlap with each other. As described above, the image processing is sequentially repeated for each band area, and thus FIG. 10 illustrates that band areas (a) to (d) of the input image data and band areas (x) to (xa) of the output image data are shifted with the lapse of time. The image input unit 1521 and the image output unit 1523 illustrated in FIG. 2B are respectively provided with pointer management units 1542 and 1544 for temporarily storing a line position of an upper end of each band area. The pointer management units 1542 and 1544 include registers (not illustrated) for storing the line pointer.

When the DMA transfer is performed, it is necessary to calculate the start address of the DMA transfer. According to the present exemplary embodiment, the start address of the DMA transfer is calculated in accordance with the following equation using the temporarily stored line pointer.

Start address of DMA transfer=Top address+Increment address*Line pointer (1)

A series of the band processing is described with reference to FIG. 10 (upper drawing). First, a first band area (a) is input as the image data. A line pointer line_v_ptr (a) at that time is "0". Thus, the start address of the DMA transfer for inputting the image data is obtained as "the top address of the input buffer" in FIG. 10 from the equation (1). Further, the input image data is processed, and a first band area (x) is output as the image data. A line pointer line_v_ptr (x) at that time is also "0". The start address of the DMA transfer for outputting the image data is also obtained as "the top address of the output buffer" in FIG. 10 similar to the input.

Next, a second band area (b) is input as the image data. A line pointer line_v_ptr (b) at that time is a value obtained by adding a change amount (a transition amount) of the line pointer from the first band (a) to the second band (b). Thus, the start address of the DMA transfer for inputting the image data is obtained as "the top address of the input buffer+ "increment address"*the change amount (the transition amount)" from the equation (1).

On the other hand, a line pointer line_v_ptr (y) of a second band area (y) output after the image processing is a value obtained by adding a height of the output band area. Thus, the start address of the DMA transfer when outputting the second band area is obtained as "the top address of the output buffer+"increment address"*(the height of the output band)" from the equation (1).

Further, the image data pieces of a third band area (c)/(z) are input/output, however, regarding the input of the image data, operations are similar to those of the second band area, so that the descriptions thereof are omitted. As described above, the change amount (the transition amount) of the line pointer is not uniform due to variation in the height of the band area after the processing. Management of the line pointer is described in detail below, however, the start address of the DMA transfer at the time of output is automatically calculated from the equation (1) according to the line pointer.

Second DMA Function (Automatic Obtainment Function of "Repeat Count")

In the DMAC 194, the "repeat count" of the image data transfer is constant, and thus it may be left as an initial setting. On the other hand, in the DMAC 196, it cannot be said that the "repeat count" of the image data transfer is constant. In that case, for example, the image output unit 1523 may automatically obtain the number of lines (Bd-h_out) of the small area in the segmented area received from the image processing execution unit 153 and automatically set the number of lines as the "repeat count" of the DMAC 196.

Then, the image output unit 1523 starts the DMAC 196 and reads out (READ) the image data from the output area 236 of the intermediate buffer 232 via the intermediate buffer control unit 1522. The DMAC 196 automatically calculates the start address from the above-described initial setting and writes the image data of the output band area in the global buffer. When all of the image data pieces of the small area are written, the image processing is completed.

Third DMA Function (Line Pointer Management Function)

The image processing apparatus according to the present exemplary embodiment further has a management function of the line pointer as the third DMA function. The data transfer processing accompanying the line pointer management according to the present exemplary embodiment is described below with reference to FIG. 11 (including FIGS. 11A and 11B). The processing illustrated in FIGS. 11A and 11B is executed by each of the image input unit 1521 and the image output unit 1523, and here, the processing executed by the image output unit 1523 is mainly described in detail.

After the initial setting in step S902 is performed as illustrated in step S910 in FIG. 12A, in step S1112, processing of one band is started as decoding of the data obtainment command as a starting point. First, in step S1114, the start address is calculated using the equation (1) from the line pointer stored in the pointer management unit 1544. Then, in step S1120, the image processing on the small area is started. Each operation, namely, readout, transmission, reception, and write-down of an image in each small area (the unit of processing) is as described above, and in step S1130, information is rewritten in units of small area after reloading the DMAC information. After the information in small area unit is rewritten, in step S1134, the start address and the repeat count of the relevant small area are set to the DMAC. The relevant small area is scanned in the longitudinal direction (the sub-scanning direction) of the band, so that, first, the start address of the band area is calculated, and the start address of the small area is calculated from the "continuous read amount" in accordance with the position of the small area. Then, the calculated start address is reset to the DMAC 196. The repeat count is as described above. Then, in step S1136, the DMA operation is performed on the small area, and in step S1140, the image processing on the small area is completed.

According to completion of the image processing of the small area in step S1140, if the processing is completed on all of the small areas in one band (YES in step S1150), it is regarded that the processing on one band is completed. On the other hand, when the processing is not completed on all of the small areas in one band (NO in step S1150), the processing is returned to step S1120, and the processing is repeated on the next small area.

When the processing is completed on one band (YES in step S1150), then in step S1160, information is rewritten in units of one band. More specifically, the line pointers stored in the pointer management units 1542 and 1544 are updated. The pointer management unit 1542 of the image input unit 1521 updates the line pointer by adding the change amount set in advance in the initial setting to the value of the line pointer. The pointer management unit 1544 of the image output unit 1523 updates the line pointer by adding the number of received lines used for rewriting the information in small area unit in step S1130 to the value of the line pointer. Thus, in step S1180, the processing on one band is completed.

When the processing is performed on the next band, the line pointer has been appropriately updated by the predetermined change amount (the transition amount) or the number of received lines as in the case of step S1160. Then, in step S1190, the DMA information including the updated line pointer is restored and stored in the shared memory 180. When the relevant band processing on the front surface or the rear surface is restarted in the next time, in step S1114, the start address of the top of the band is calculated, and the band processing can be restarted from the appropriate start position.

As described above, the image processing apparatus according to the present exemplary embodiment has the automatic calculation function of the DMA transfer "start address" based on the line pointer, the automatic calculation function of the DMA transfer "repeat count", and the line pointer management function as the first to the third DMA functions. Accordingly, the image input unit 1521 can interlock the LOAD operation and the transmission operation via the intermediate buffer 232, and the image output unit 1523 can interlock the reception operation and the STORE operation via the intermediate buffer 232. By the interlock of these operations, the image processing of a plurality of bands can be continuously executed without intervention of the CPU 102 while interlocking with an operation state of the image processing.

Effect of Present Exemplary Embodiment

According to the conventional image processing apparatuses, the DMA is set by preliminary calculation by the firmware with respect to changes in pixel numbers of input/output images for each band due to the resolution conversion. In contrast, according to the present exemplary embodiment, the input/output DMAC of the image processing can be operated by following the result of the image processing, and thus the CPU is not required to perform control such as setting, starting, and synchronization of the image processing unit. In addition, when the segmented areas of the front and rear surfaces of a sheet are alternately processed in the time division multiplexed manner as in the case of the simultaneous two-sided scanning, intervention of the CPU is not necessary for the DMA setting. Accordingly, a meeting time of the CPU and the image processing unit can be reduced, and the entire image processing can be accelerated. Further, there is no need for the CPU to execute a series of the above-described control processing by the firmware for each band, and thus the control load on the CPU can be reduced.

As described above, according to the present exemplary embodiment, the entire image processing can be accelerated, and the processing load on the CPU can be reduced by improving efficiency of the image data transfer to the image processing unit.

<Modification>

The intermediate buffer 232 according to the present exemplary embodiment can be extended to the storage unit with the two-bank configuration. For example, as illustrated in FIG. 2B, the intermediate buffer control unit 1522 is configured in the two-bank configuration including a storage area A and a storage area B. Such a two-bank configuration enables the intermediate buffer control unit 1522 to store up to two small areas (the unit of processing) at a time. Further, the storage areas are switched to one another according to an operation state (the bank change). As described above, when the intermediate buffer control unit 1522 has the one-bank configuration, the readout (LOAD) operation of input image data and the transmission (SEND) operation for generating a pixel value from the input image data are performed in the time division manner. Further, the reception (RECV) operation for generating the output image data from the output pixel value and the writing (STORE) operation of the output image data are performed in the time division manner. According to the present exemplary embodiment, the intermediate buffer control unit 1522 has the two-bank configuration, and thus the input image data of the next small area (the unit of processing) can be received while the pixel value is generated from the input image data. Further, while the output image data is generated from the output pixel value, the generated output image data can be output. Therefore, processing in the DMAC 194 and in the transmission unit 1541 can be parallelized, and processing in the DMAC 196 and in the reception unit 1543 can be parallelized. In other words, the "readout (LOAD) operation" and the "transmission (SEND) operation" can be performed at the same time, and the "writing (STORE) operation" and the "reception (RECV) operation" can be performed at the same time.

According to the present modification, two types of the image data pieces before and after the processing are input and output at the same time, the input area and the output area of the intermediate buffer 232 are separated into respective banks (banks A and B). Therefore, the CPU 102 may set a top address to each of the input area and the output area in advance. In order to facilitate the processing, it is only necessary to prepare a set of the top addresses of the banks A and B. A capacity of each bank may be calculated based on maximum values of the input band height and the output band height before and after the processing.

As described above, according to the present modification, the image processing can be accelerated by assigning the intermediate buffer to each of a plurality types of image data pieces simultaneously handled in the image processing unit.

A seventh exemplary embodiment is described below. The configuration of the image processing apparatus according to the seventh exemplary embodiment is similar to that in the above-described sixth exemplary embodiment, and thus the description thereof is omitted. According to the above-described sixth exemplary embodiment, the global buffers in the RAM 106 and the external storage device 108 have a storage capacity for storing input/output image data for one page (one screen). However, in order to suppress a manufacturing cost of a product, the RAM 106 and/or the external storage device 108 may not be provided with the global buffer having a storage capacity sufficient for storing the image data for one page. According to the seventh exemplary embodiment, when the capacity of the global buffer is smaller than the capacity for one page, the image processing for one page can be realized by using the global buffer as a ring type buffer (hereinbelow, referred to as a ring buffer).

FIG. 10 (lower drawing) illustrates an example of the band processing using the ring buffer. It is necessary to control the processing to circulate in such a manner that when the line position of the image data being processed reaches a lower end (line_v_thr) of the buffer, the line position is returned to an upper end ("0") of the buffer. Performing such circulation control can suppress the storage capacity necessary to process the image data for one page less than a capacity for an entire one page. In the example in FIG. 10, an area BIr for storing the input image data and an area BOr for storing the output image data are secured in the global buffer as the storage areas (the ring buffers) which do not overlap with each other. In FIG. 10, the image processing is sequentially repeated for each band area, and the band areas (a) to (d) of the input image data and the band area (x) to (xa) of the output image data are shifted with the lapse of time as with the example of the global buffer. As with the case of the sixth exemplary embodiment, the image input unit 1521 and the image output unit 1523 manage the line pointers by the respective pointer management units 1542 and 1544 for temporarily storing the line position of the upper end of each band area.

In FIG. 10, the band area (c) of the input image data and the band area (z) of the output image data run out of the storage capacity of the ring buffer in the middle of the processing. When a certain band area reaches the ring buffer lower end, data of a subsequent band area is stored from the ring buffer upper end, thus the band area (c) is divided into the band areas (c-0) and (c-1), and the band area (z) is divided into the band areas (z-0) and (z-1). Therefore, according to the seventh exemplary embodiment, a procedure of the data transfer processing is changed from that in the sixth exemplary embodiment.

Line Pointer Management Function

The data transfer processing accompanying the line pointer management using the ring buffer according to the seventh exemplary embodiment is described below with reference to FIG. 11 (including FIGS. 11A and 11B). Hereinbelow, only changed points from the sixth exemplary embodiment due to the use of the ring buffer are described, and descriptions of the processing similar to those in the sixth exemplary embodiment are omitted.

In FIG. 11A, in step S1130, the information in small area unit is rewritten, and then in step S1132, it is determined whether the line pointer reaches the lower end of the ring buffer prior to setting of the start address of the relevant small area and the repeat count to the DMAC. In other words, the "repeat count" of the DMA transfer represents the band height (a line length in the sub-scanning direction) of the small area, and thus it is determined whether the line position obtained by adding the band height to the line pointer is larger than the line position (line_v_thr) of the lower end of the ring buffer. When the added line position is equal to or smaller than the ring buffer lower end (NO in step S1132), in steps S1134 and S1136, the processing similar to that in the sixth exemplary embodiment is performed. On the other hand, when the added line position is larger than the ring buffer lower end (YES in step S1132), the DMA transfer is started twice.

In step S1172, in the first DMA transfer, the "start address" is set similar to that in the sixth exemplary embodiment, however, the "repeat count" is set as a value from the line pointer to the line position (line_v_thr) of the ring buffer lower end. Then, in step S1173, the first DMA transfer is performed. By the first DMA transfer, an upper part (the band areas (C-0) and (z-0)) of the divided small area is transferred.

Next, in step S1174, in the second DMA transfer, the "start address" is calculated by setting the line pointer to "0" indicating the line position of the ring buffer upper end. Further, the "repeat count" is set to a remainder obtained by subtracting the "repeat count" of the first DMA transfer from the band height. Then, in step S1175, the second DMA transfer is performed. By the second DMA transfer, a lower part (the band areas (C-1) and (z-1)) of the divided small area is transferred. As described above, according to the seventh exemplary embodiment, the DMA transfer is not divided when being performed across a boundary of the ring buffer.

When the processing on one band is completed (YES in step S1150), in step S1170, it is determined whether the line pointer reaches the ring buffer lower end prior to updating of the line pointers stored in the pointer management units 1542 and 1544. The determination is similar to that in step S1132. More specifically, when the line position obtained by adding the band height to the line pointer is equal to or smaller than the ring buffer lower end (NO in step S1170), in step S1160, the line pointer is updated similarly to that in the sixth exemplary embodiment. On the other hand, when the added line position is larger than the ring buffer lower end (YES in step S1170), in step S1178, the line pointer is updated with a value obtained by subtracting one from the "repeat count" which is set when the second DMA transfer is performed from the ring buffer upper end (the line position "0"). Then, in step S1180, the processing on one band is completed.

As described above, the line pointer is appropriately updated according to the predetermined change amount (the transition amount) or the number of received lines with respect to the ring buffer, and in step S1114, the start address of the top of the band is calculated, and the band processing can be restarted from the appropriate start position.

As described above, the seventh exemplary embodiment has the line pointer management function corresponding to the ring buffer and thus can reduce the storage capacity of the global buffer for storing the input/output image data pieces. When the image processing is performed on each of a plurality of image data pieces as in the case of the simultaneous two-sided scanning, each processing requires a buffer, and thus reduction of the storage capacity is very important.

An eighth exemplary embodiment is described below. The configuration of the image processing apparatus according to the eighth exemplary embodiment is similar to that in the above-described sixth exemplary embodiment, and thus the description thereof is omitted. According to the above-described sixth and seventh exemplary embodiments, the example is described in which the image data as the processing target is in the dot sequential system illustrated in the FIG. 4A. According to the eighth exemplary embodiment, an example for processing image data in a different data format is described.

Figure 4B:
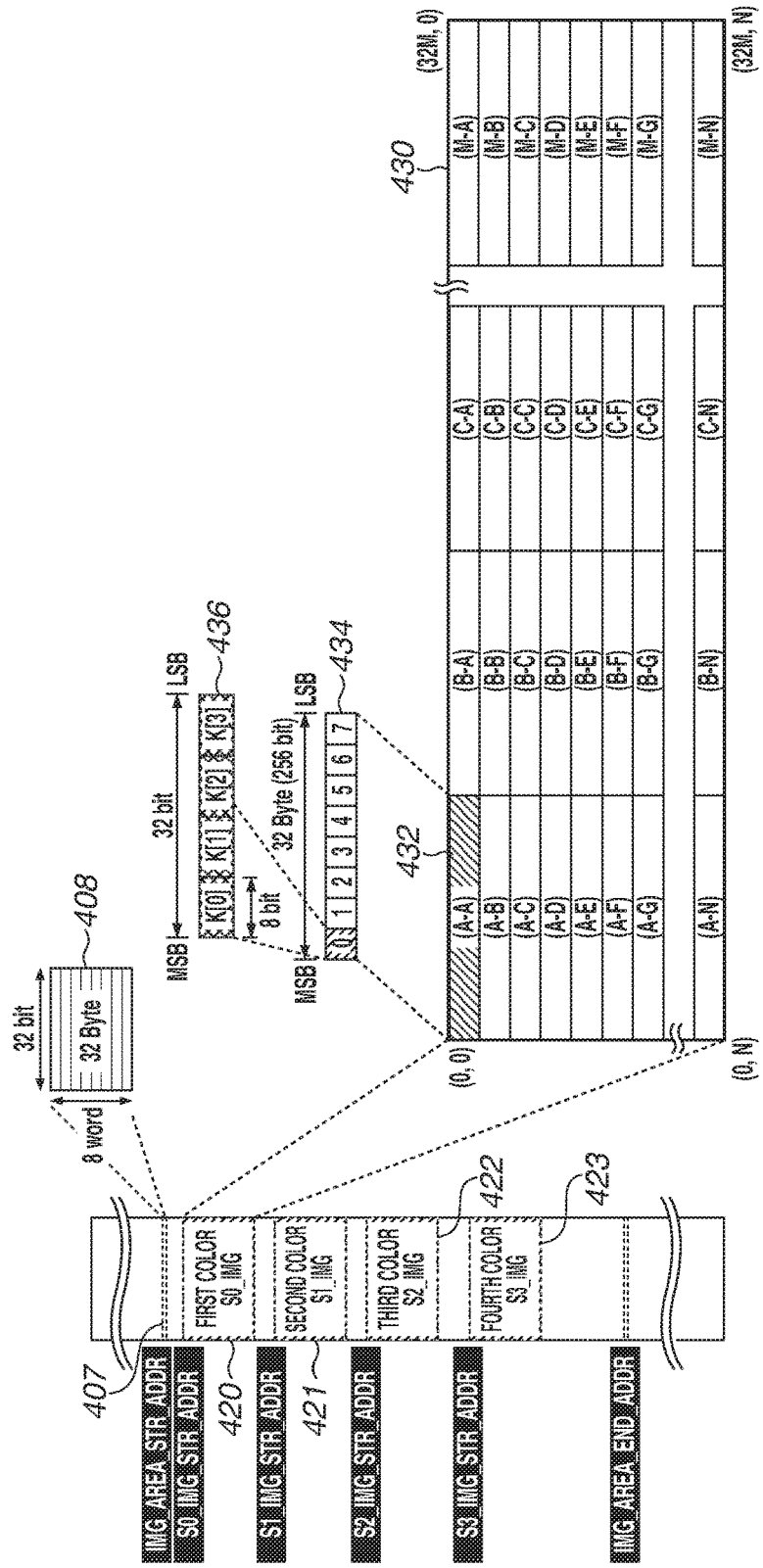
FIG. 4B illustrates a storage method of image data and an example of a data structure.

FIG. 4B illustrates the image data structure and a storage example according to the eighth exemplary embodiment. FIG. 4B illustrates an example in which four types of image data pieces from S0_IMG 420 to S3_IMG 423 are stored in the data area of the RAM (DRAM) 106 as the storage example of the image data in the frame sequential system. These four types of data pieces are obtained by performing the color space conversion and the density correction processing on the image data read by the image reading unit 120 and then converting into data pieces of a first color K (Black), a second color M (Magenta), a third color C (Cyan), and a fourth color Y (Yellow). A smallest unit of each image data capacity to be stored is set to 32 bytes, i.e., 32 bits*8 words as shown in the portion 408 so that the image data can be read and written without deteriorating the performance of the DRAM as similar to that in the sixth exemplary embodiment. In other words, storage capacities of the image data pieces from S0_IMG 420 to S3_IMG 423 are integer multiples of 32 bytes.

Next, the image data structure is described in detail. Image data 430 represents image data (S0_IMG 420) of the first color K (Black) and has a size of 32M*N bits. The image data 430 includes area data pieces in a unit of 32 bytes, and a plurality of pieces (eight pieces in this example) of 32-bit length is packed in each area (for example, an area 432) as illustrated in a portion 434. Further, in a piece of the 32-bit length data, a plurality of pieces (four pieces in this example) of color elements of K (Black) each having 8-bit length is packed as illustrated in a portion 436. Remaining image data pieces of the second color M to the fourth color Y have the similar structures.

Input and Output Method of Image Data

An input and output method of the image data from the global buffer to the image input output unit 152 or from the image input output unit 152 to the RAM 106 according to the eighth exemplary embodiment is described in detail below similarly to that in the sixth exemplary embodiment with reference to FIGS. 2A and 2B. According to the eighth exemplary embodiment, when the image data in the frame sequential system illustrated in FIG. 4B is processed, the four types of image data pieces from the first color K to the fourth color Y are read out from the global buffer for each small area (the unit of processing) described in the sixth exemplary embodiment. For example, regarding the image data corresponding to the small area (1) 211 illustrated in FIGS. 2A and 2B, the following four addresses indicated in FIG. 4B are set as the top address of the DMAC 194 by being sequentially switched, and the DMA transfer is executed four times. Accordingly, the DMA transfer is performed for each color of the first color K to the fourth color Y.

the top address [first time]: S0_IMG_STR_ADDR
the top address [second time]: S1_IMG_STR_ADDR
the top address [third time]: S2_IMG_STR_ADDR
the top address [fourth time]: S3_IMG_STR_ADDR All of the four types (four colors) of image data pieces read out according to the above-described four types of addresses are once stored in the intermediate buffer 232. Subsequently, four color elements at predetermined positions (coordinates) of the four types of image data pieces are read out and input to the image processing execution unit 153 by being gathered into one piece as a pixel value (C, M, Y, and K) in the dot sequential system. Further, four color elements are extracted from the pixel value (C, M, Y, and K) in the dot sequential system after the processing by the image processing execution unit 153 and stored in each area of four types of output image data in the output area. Needless to say, the DMA transfer is required to be performed four times for writing down the output image data to the global buffer.

Thus, the DMA information to be stored in the shared memory 180 is also required for four pieces. Accordingly, the number of tables Ch=4 and four pieces of the table numbers T [0, 1, . . . , 3] corresponding thereto are appropriately set to the image input output unit 152.

Line Pointer Management Function

According to the eighth exemplary embodiment, it is necessary to perform the DMA transfer for the number of frames corresponding to the image data in the frame sequential system, namely four times when the image data is input to and output from the global buffer, so that the number of the DMA operations is changed with respect to the processing procedures according to the above-described sixth and seventh exemplary embodiments.

The data transfer processing accompanying the line pointer management when the image data in the frame sequential system is processed according to the eighth exemplary embodiment is described below with reference to FIG. 11 (including FIGS. 11A and 11B). In FIG. 11A, processing (in steps S1138 and S1139) specific to the eighth exemplary embodiment which handles the image data in the frame sequential system is added to the processing procedures according to the seventh exemplary embodiment illustrated in FIG. 11. Hereinbelow, only changed points from the seventh exemplary embodiment are described, and descriptions of the processing similar to that in the sixth and the seventh exemplary embodiments are omitted.

In FIG. 11A, in step S1136, the DMA operation is performed in units of small area, and then in step S1138, the DMA operation is performed for the number of times corresponding to the number of frames (colors) in the frame sequential system (hereinbelow, referred to as the number of DMA frames). The above-described example is the four types (four colors) of the image data pieces, therefore, when the DMA operation is performed less than four times (NO in step S1138), the DMA operation is repeated up to the predetermined times, and when the DMA operation is performed four times, it is regarded as the DMA operation is completed (YES in step S1138).

The pointer management units 1542 and 1544 include the line pointers for the number of DMA frames in advance, and in step S1139, the line pointers for the number of DMA frames are updated according to the completion of the processing on the small areas for one band.

As described above, the eighth exemplary embodiment has the line pointer management function corresponding to the number of frames of the input/output image data pieces and thus can flexibly realize the image processing in response to various image data formats.

According to the above-described sixth to eighth exemplary embodiments, the data obtainment command is provided as the synchronization command at the control point (the synchronization point) of the image processing data flow. Further, the image processing is performed by reloading the necessary DMA information at the control point (the synchronization point) of the image processing, and the DMA information to which a processing result is reflected is restored after completion of the image processing. Since the DMA transfer is controlled using the control point (the synchronization point) of the data flow as a starting point, various types of image processing, such as the dot sequential, the frame sequential, the ring buffer, simultaneous two-sided, and a plurality of sides can be flexibly performed. According to the conventional technique, a predetermined DMA transfer pattern is defined, and the image processing is performed in the unit of processing of DMA transfer by divisionally starting the DMA transfer in each time. According to the exemplary embodiments, the value of the DMA information is updated for each control point (the synchronization point) of the image processing, and a series of the image processing itself is continuously operated.

Further, the method of the external synchronization with the CPU 102 described according to the first to the fourth exemplary embodiments can be applied to the sixth to the eighth exemplary embodiments. In other words, the CPU 102 reads and writes the DMA information in the shared memory using the data obtainment command which is the control point (the synchronization point) of the data flow according to the sixth to the eighth exemplary embodiments as a trigger. Accordingly, the CPU 102 can rewrite the DMA information in conjunction with the software of its own and switch the reading destination of the DMA transfer of the image processing according to the processing result by the CPU 102. Further, the CPU 102 can read the DMA information and monitor progress of execution of the image processing from the value of the line pointer.

Other Embodiments

The disclosure can cope with further various types of image processing by applying the above-described first to eighth exemplary embodiments.

(Regarding an image format and a synchronization method) In the image format of the dot sequential system as illustrated in FIG. 4A or in the image format of the frame sequential system as illustrated in FIG. 4B, only the number of the DMA transfer times of the image data corresponding to the data obtainment command is changed. The synchronization method can flexibly cope with this change. A general image processing apparatus synchronizes with the external devices (the CPU, the scanner, and the video input device) using the DMA transfer as a starting point, therefore, when the number of the DMA transfer times is changed by the image format, it is necessary to change the control method with respect to the external devices (the CPU, the scanner, and the video input device). The synchronization method can reduce the influence of the change in the image format on the control change.

(Regarding other DMA transfer unit) In order to accelerate operations of the image processing apparatus, it is necessary for the image processing unit to be provided with a high-capacity buffer to increase the unit of DMA transfer of the image data for one operation. In the synchronization method, synchronization with the external devices (the CPU, the scanner, and the video input device) is not performed using the DMA transfer as a starting point, so that the control point (the synchronization point) does not depend on a unit of transfer. Accordingly, the synchronization method can flexibly cope with a change in the unit of DMA transfer for one operation.

Further, the disclosure can be applied to the IP conversion used in the video processing and the like. The IP conversion is processing for compositing a progressive image in which pixels in one frame are not thinned out using a plurality of frames of an interlace image in which pixels in the sub-scanning direction are thinned out in a time axis direction. For example, when one frame of the progressive image is composited from two frames of the interlace image, a total number of pixels of the input images is the same as the number of pixels in the output image. However, in the case of the high definition IP conversion, one frame of a progressive image is composited from three to five frames of an interlace image, and thus the number of pixels are less in the output image than in the input image. For example, in the IP conversion, a relationship of pixels between an input image and an output image is changed according to an operation mode (an image quality mode) selected by a user, so that the number of DMA frames in the input image data may be set to the number of frames in the interlace image and the number of DMA frames in the output image data may be set to one frame. In other words, a combination of the sixth exemplary embodiment and the eighth exemplary embodiment can cope with this operation.

As described above, a recent image processing apparatuses includes various types of image processing including spatial filtering, resolution conversion, trimming processing, end portion extension processing, and IP conversion. Further, the image processing apparatus often uses the processing by selecting and combining according to an application so as to realize a desired high image quality in the entire apparatus. When such an image processing apparatus adopts the method according to the disclosure, the image processing apparatus can automatically set (change) the DMAC information of the output image data by following a size of the processed image data while maintaining a constant change amount (a transition amount) of the line pointer of the input image data. The DMAC information pieces of the input image and the output image are stored in the shared memory by a required number and reloaded and restored at a required timing, so that a plurality of numbers of the image processing can be realized at the same time.

In the examples above, it is described that the image processing is alternately performed on the front and rear surfaces, however, if the necessary DMA information can be appropriately reloaded and restored, the image processing does not have to be performed alternately. According to the disclosure, the image processing apparatus can perform a plurality of types of image processing in an arbitrary order as needed and temporarily store progress to easily realize restart. In addition, the above-described various types of image processing can be controlled by just rewriting the command list (the display list). Accordingly, even in the case where the various types of the image processing are performed by combining with each other, the DMAC information can be set to each segmented area, the DMAC can be started, and the load on the CPU 102 synchronizing (meeting) with the DMAC can be reduced by applying an embodiment of the disclosure.

Further, according to the above-described sixth to eighth exemplary embodiments, the example is described in which the band processing is performed as a region segmentation method with respect to the image data. The disclosure can be similarly applied to block (tile) processing which is another region segmentation method. In the block processing, image data is two-dimensionally segmented into tile areas along the main scanning direction and the sub-scanning direction. The small area (the unit of processing) in each of the above-described exemplary embodiments corresponds to the two-dimensionally segmented tile area, and the method for sequentially reading out a plurality of small areas is exactly the block processing. According to each of the above-described exemplary embodiments, the example is described in which a threshold value (the lower end the line position) of the line pointer and the ring buffer is provided along the band height direction. In addition to that, a threshold value (for example, a right end position) of a column pointer and the ring buffer is provided along a band longitudinal direction. When one-dimensional pointer management is extended two dimensionally, the method according to the disclosure can be extended from the band processing to the tile processing.

According to each of the above-described exemplary embodiments, a unit of reading and writing of image data is described as 32 bytes. The unit can be changed according to a configuration of the global buffer, a type of a storage device (a DRAM, a flash ROM, a hard disk, a solid state disk (SSD), and the like) for realizing the global buffer, and a type of image processing to be executed. If the unit of reading and writing is changed, only the number of pixels to be stored in the local buffer (the intermediate buffer 232) for storing the image data is changed, and thus the disclosure can be applied as it is.

In addition, the data structure in the unit of 32 bytes of the image data may be combined in a different image format in the image input unit 1521 and the image output unit 1523. For example, the image input unit 1521 and the image output unit 1523 can be operated in a desired combination of the dot sequential system (FIG. 4A) and the frame sequential system (FIG. 4B).

It is describe above that the DMA information of the shared memory (the second shared memory unit) is switched according to the data obtainment command instructing the control point (the synchronization point) of the data flow, however, the above-described exemplary embodiments can be applied to applications other than the above-described one. For example, the shared memory (the second shared memory unit) may be regarded as a parameter buffer, and the CPU 102 stores a parameter of the image processing in the shared memory, reads out the parameter in the shared memory by the register obtainment command instructing the control point (the synchronization point) of the data flow, and changes a setting value of the image processing circuit by generating the register write command. Further, the data processing command specific to the data obtainment command may be generated from the parameter in the shared memory, branch execution to a branch destination of the Jump command from the parameter in the shared memory may be performed or forcible suppressed, and a wait condition of the wait command may be changed. According to these applications, operations and the data flow control can be switched by selecting a context (the DMA information, an image processing parameter, a branch destination address, a control parameter, and the like) stored in the shared memory according to the command at the control point (the synchronization point) of the data flow.

According to the above-described processing, the control point (the synchronization point) can be flexibly set with respect to a complicated data flow for the advanced image processing.

Further, the dynamic clock control can be performed on the image processing execution unit according to the set control point (the synchronization point) of the data flow. Accordingly, the clock of the image processing execution unit can be temporarily stopped even in a wait time which is too short for the firmware to control, and the power consumption during the wait time of the image processing can be suppressed. In addition, at the time of the dynamic clock control, the speed of the image processing is not decreased since there is no intervention of the firmware.

Even when settings (the number of pixels, a processing range, and an image format) of the image processing is changed before and after the image processing, efficiency of data transfer can be improved. For example, when settings of successive segmented areas are irrespectively switched on the front and rear surfaces as in the case of the simultaneous two-sided scanning, the efficiency of data transfer can be improved.

The power consumption of the image processing apparatus can be suppressed by dynamically controlling the clock at the control point (the synchronization point) according to the image processing data flow.

Even when the number of pixels is changed before and after the image processing, the efficiency of data transfer can be improved. Further, the image processing method can be provided. For example, even when settings of segmented areas to be processed are switched on the front and rear surfaces as in the case of the simultaneous two-sided scanning, the efficiency of data transfer can be improved.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2015-110206, filed May 29, 2015, and No. 2015-110208, filed May 29, 2015, which are hereby incorporated by reference herein in their entirety.

What is claimed is:

1. A data processing apparatus comprising:
a processor; and
a memory storing instructions that, when executed by the processor, cause the processor to perform operations comprising:
reading out data of a first area of image data to be subjected to image processing from an external memory, sequentially interpreting a plurality of commands included in a command list obtained from the external memory, and transmitting the data of the first area to an image processing circuit according to the command; and
receiving data obtained by performing the image processing on the data of the first area from the image processing circuit and writing the received data in the external memory according to the command,
wherein, based on a control signal indicating that data of a second area following to the data of the first area can be read out from the external memory,
reading out data comprises controlling readout of a following command to a command indicating suspension from the external memory and continuation, suspension, or restart of transmission of the data of the second area, and
based on a control signal indicating that the data of the second area following to the data of the first area can be read out from the external memory,
receiving data comprises controlling, in a case that the command indicating suspension is received, continuation, suspension, or restart of writing of the data of the second area to the external memory.

2. The data processing apparatus according to claim 1, wherein a barrier synchronization is realized by suspension of transmission of a command and reception of the control signal.

3. The data processing apparatus according to claim 1, wherein, in a case that the command indicating suspension instructs external synchronization, reading out data comprises releasing suspension of transmission of the following command according to a register setting from external.

4. The data processing apparatus according to claim 1, wherein, in a case that the command indicating suspension instructs a Jump, reading out data comprises releasing suspension of transmission of the following command according to a number of Jump times set from external.

5. The data processing apparatus according to claim 1, wherein, in a case that the command indicating suspension instructs a Jump, reading out data comprises determining whether a Jump operation is executed or not according to the number of Jump times set from external.

6. The data processing apparatus according to claim 5, wherein whether processing on a following command to the command indicating suspension is performed or not is determined according to whether the Jump operation is executed or not.

7. The data processing apparatus according to claim 1, wherein reading out data comprises including a temporary storage unit of a plurality of banks and in parallel performing obtainment and transmission of the command list, and receiving data comprises including a temporary storage unit of the plurality of banks and in parallel performing reception and write-down of the data.

8. The data processing apparatus according to claim 7, wherein a different command is inserted between the command indicating suspension and a preceding command in response to a size of the temporary storage unit, and the preceding command is written down to a memory.

9. The data processing apparatus according to claim 1, wherein reading out data comprises reading out data by a direct memory access controller (DMAC).

10. The data processing apparatus according to claim 1, wherein receiving data comprises receiving data by a DMAC.

11. The data processing apparatus according to claim 1, wherein the image data is image data read by a scanner.

12. The data processing apparatus according to claim 1, wherein reading out data comprises obtaining the command list from the external memory at a data amount in a predetermined unit.

13. The data processing apparatus according to claim 1, wherein clock supply is suppressed based on the command indicating suspension and the control signal.

14. The data processing apparatus according to claim 1, wherein a clock of a frequency selected from a plurality of frequencies is supplied based on the command indicating suspension and the control signal.

15. The data processing apparatus according to claim 13, wherein suppression of the clock supply is released based on the control signal.

16. The data processing apparatus according to claim 13, wherein suppression of the clock supply is released based on the control signal after a lapse of a specified restoration cycle.

17. An image processing method for causing a computer to perform operations included in a data processing apparatus according to claim 1.

18. A non-transitory computer-readable storage medium storing therein a program for causing a computer to perform operations included in a data processing apparatus according to claim 1.

* * * * *